US012640905B2

(12) United States Patent
Nanjo et al.

(10) Patent No.: US 12,640,905 B2
(45) Date of Patent: May 26, 2026

(54) SECRET CALCULATION DEVICE, SECRET CALCULATION SYSTEM, SECRET CALCULATION METHOD, AND COMPUTER PROGRAM PRODUCT

(71) Applicant: KABUSHIKI KAISHA TOSHIBA, Tokyo (JP)

(72) Inventors: Yuki Nanjo, Kawasaki (JP); Tomoko Yonemura, Kawasaki (JP); Yoshikazu Hanatani, Komae (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 13 days.

(21) Appl. No.: 18/777,222

(22) Filed: Jul. 18, 2024

(65) Prior Publication Data

US 2025/0167979 A1 May 22, 2025

(30) Foreign Application Priority Data

Nov. 21, 2023 (JP) ................................. 2023-197402

(51) Int. Cl.
H04L 9/06 (2006.01)
H04L 9/00 (2022.01)

(52) U.S. Cl.
CPC ............ H04L 9/0618 (2013.01); H04L 9/008 (2013.01)

(58) Field of Classification Search
CPC .... H04L 9/0618; H04L 9/008; H04L 2209/46
See application file for complete search history.

(56) References Cited

U.S. PATENT DOCUMENTS 11,087,223 B2 * 8/2021 Nandakumar .......... H04L 9/008
11,233,659 B2 * 1/2022 Georgieva .............. H04L 9/008
2019/0394039 A1 * 12/2019 Higo ..................... H04L 9/3236

FOREIGN PATENT DOCUMENTS

WO WO2022/201277 A1 9/2022

OTHER PUBLICATIONS

Wenjie Lu, et al. "Privacy-preserving genome-wide association studies on cloud environment using fully homomorphic encryption", BMC Medical Informatics and Decision Making, vol. 15 (Suppl 5):S1, 2015, 8 pages.

(Continued)

*Primary Examiner* — Pramila Parthasarathy
(74) *Attorney, Agent, or Firm* — Oblon, McClelland, Maier & Neustadt, L.L.P.

(57) ABSTRACT

A secret calculation device includes a memory and one or more processors coupled to the memory. The one or more processors are configured to: perform a first secret calculation operation on a first ciphertext obtained by encrypting input data according to a first homomorphic encryption method by using first homomorphic computation based on the first homomorphic encryption method to calculate a second ciphertext; convert, by using a ciphertext conversion method defined between the first homomorphic encryption method and a second homomorphic encryption method, the second ciphertext into a third ciphertext encrypted by the second homomorphic encryption method without decrypting the second ciphertext; and perform a second secret calculation operation on the third ciphertext by using second homomorphic computation based on the second homomorphic encryption method to calculate a fourth ciphertext.

15 Claims, 12 Drawing Sheets

(56) References Cited

OTHER PUBLICATIONS

Masaya Yasuda, et al., "New packing method in somewhat homomorphic encryption and its applications", Security and Communication Networks 8, 2015, 20 pages.

Hao Chen, et al., "Efficient Homomorphic Conversion Between (Ring) LWE Ciphertexts", International Conference on Applied Cryptography and Network Security, 2021, 19 pages.

* cited by examiner 100 (100B, 100C, 100D, 100E, 100F, 100G, 100H)

1 (1B, 1C, 1D, 1E, 1F, 1G, 1H)          5          4 (4B, 4C, 4D, 4E, 4F, 4G, 4H)

FIRST TERMINAL DEVICE          SECRET CALCULATION DEVICE

SECRET CALCULATION DEVICE 41 (41I)

Figure 3:
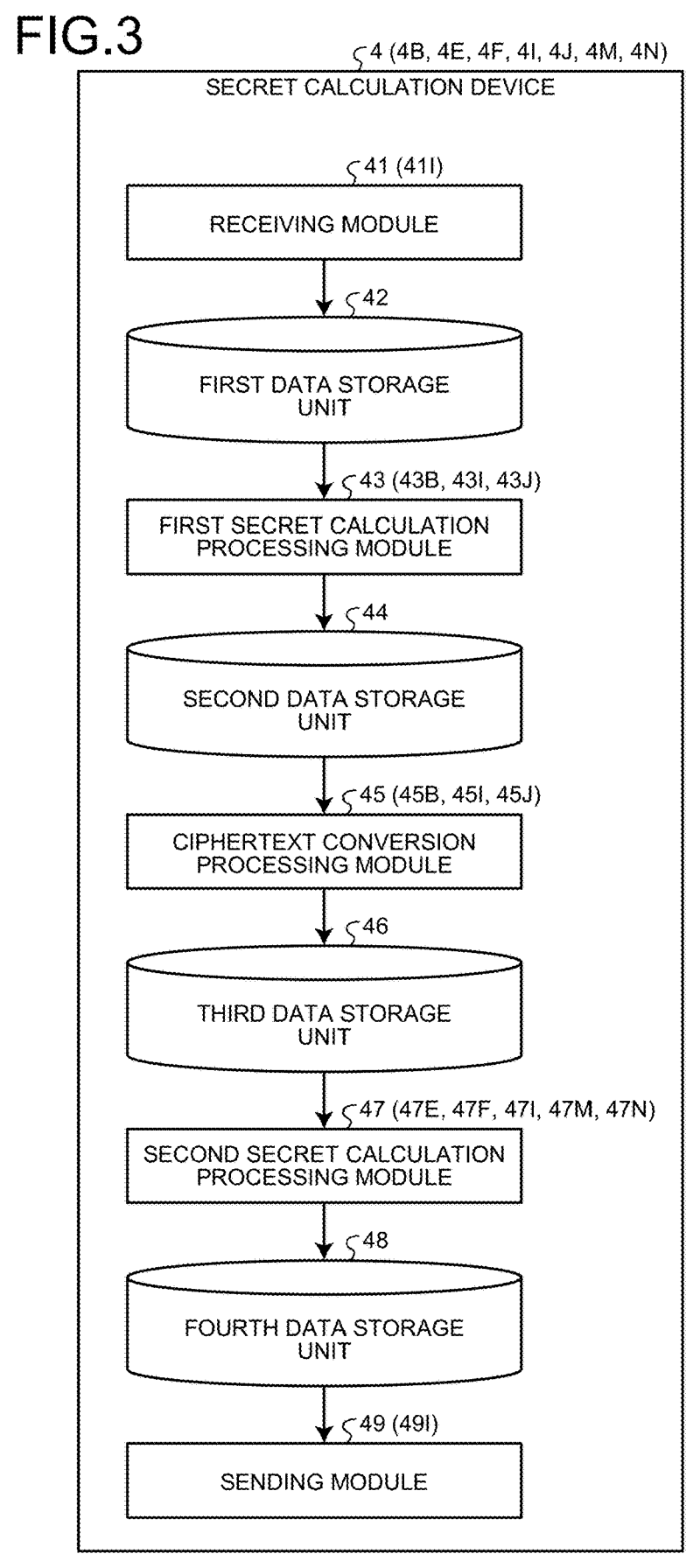

RECEIVING MODULE

42

FIRST DATA STORAGE
UNIT 43 (43B, 43I, 43J)

FIRST SECRET CALCULATION
PROCESSING MODULE

44

SECOND DATA STORAGE
UNIT 45 (45B, 45I, 45J)

CIPHERTEXT CONVERSION
PROCESSING MODULE

46

THIRD DATA STORAGE
UNIT 47 (47E, 47F, 47I, 47M, 47N)

SECOND SECRET CALCULATION
PROCESSING MODULE

48

FOURTH DATA STORAGE
UNIT 49 (49I)

SENDING MODULE

FIRST TERMINAL DEVICE 11C (11D, 11K, 11L)

Figure 6:
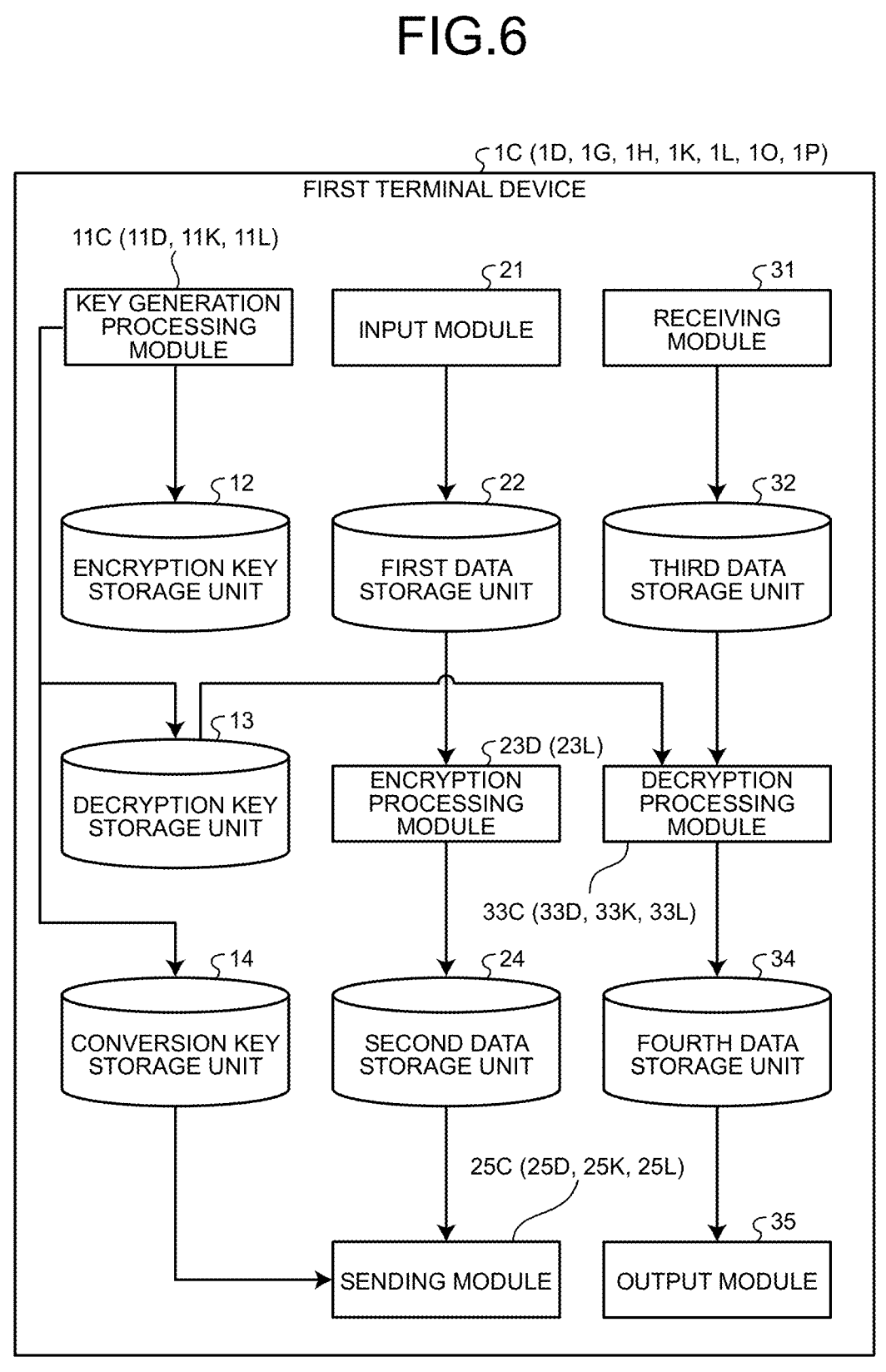

| KEY GENERATION PROCESSING MODULE | INPUT MODULE (21) | RECEIVING MODULE (31) |

ENCRYPTION KEY STORAGE UNIT (12) | FIRST DATA STORAGE UNIT (22) | THIRD DATA STORAGE UNIT (32)

DECRYPTION KEY STORAGE UNIT (13) | ENCRYPTION PROCESSING MODULE 23D (23L) | DECRYPTION PROCESSING MODULE 33C (33D, 33K, 33L)

CONVERSION KEY STORAGE UNIT (14) | SECOND DATA STORAGE UNIT (24) | FOURTH DATA STORAGE UNIT (34)

25C (25D, 25K, 25L)

SENDING MODULE | OUTPUT MODULE (35)

100I (100J, 100K, 100L, 100M, 100N, 100O, 100P)

SECRET CALCULATION DEVICE, SECRET CALCULATION SYSTEM, SECRET CALCULATION METHOD, AND COMPUTER PROGRAM PRODUCT

CROSS-REFERENCE TO RELATED APPLICATIONS

This application is based upon and claims the benefit of priority from Japanese Patent Application No. 2023-197402, filed on Nov. 21, 2023; the entire contents of which are incorporated herein by reference.

FIELD

Embodiments described herein relate generally to a secret calculation device, a secret calculation system, a secret calculation method, and a computer program product.

BACKGROUND

In recent years, data containing classified information such as individual information is being increasingly utilized in various fields. At the time of utilizing such data between a plurality of organizations, there is a concern about the risks such as information leakage, unauthorized use, and data breach. For that reason, the attention has been focused on such a technology which is capable of performing analysis while the classified information remains confidential.

For example, a technology has been disclosed that performs encryption according to a homomorphic encryption method in which Ring-LWE is adapted (LWE stands for Learning-with-errors) (for example, refer to Patent Literature 1 and refer to Non Patent Literature 1 to Non Patent Literature 3). In the conventional technology, there is a limitation on the types of secret computation that can be adapted in many homomorphic encryption methods. Hence, it is not always the case that secret calculation can be performed for an entire calculation operation; and there are times when an intermediate result of the calculation operation needs to be decrypted and further calculation needs to be carried out in the plaintext form. Thus, there are times when the secret of the data undergoes a decline.

BRIEF DESCRIPTION OF THE DRAWINGS

FIG. 3 is a functional block diagram illustrating an example of a secret calculation device;

FIG. 6 is a functional block diagram illustrating a first terminal device;

DETAILED DESCRIPTION

Figure 1:
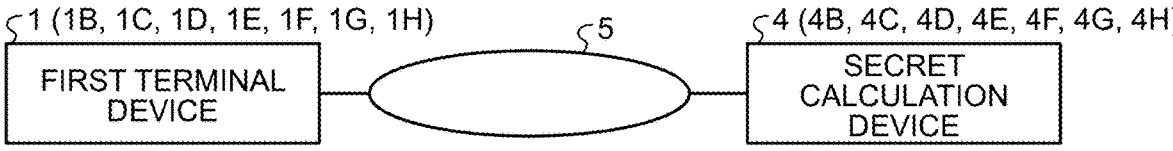
FIG. 1 is a schematic diagram illustrating a secret calculation system.

In general, according to one embodiment, a secret calculation device includes a memory and one or more processors coupled to the memory. The one or more processors are configured to: perform a first secret calculation operation on a first ciphertext obtained by encrypting input data according to a first homomorphic encryption method by using first homomorphic computation based on the first homomorphic encryption method to calculate a second ciphertext; convert, by using a ciphertext conversion method defined between the first homomorphic encryption method and a second homomorphic encryption method, the second ciphertext into a third ciphertext encrypted by the second homomorphic encryption method without decrypting the second ciphertext; and perform a second secret calculation operation on the third ciphertext by using second homomorphic computation based on the second homomorphic encryption method to calculate a fourth ciphertext.

Exemplary embodiments of a secret calculation device, a secret calculation system, a secret calculation method, and a computer program product will be explained below in detail with reference to the accompanying drawings. In the embodiments and modification examples described below, the same function units are referred to by the same reference numerals, and their detailed explanation is not given repeatedly.

First Embodiment

FIG. 1 is a schematic diagram illustrating an example of a secret calculation system 100 according to a first embodiment.

The secret calculation system 100 includes a first terminal device 1 and a secret calculation device 4. The first terminal device 1 and the secret calculation device 4 are communicably connected to each other via a network 5.

As long as the secret calculation system 100 includes one or more first terminal devices 1, it serves the purpose. That is, the configuration is not limited to include only a single first terminal device 1. Moreover, as long as the secret calculation system 100 includes one or more secret calculation devices 4, it serves the purpose. Thus, the configuration is not limited to include only a single secret calculation device 4.

The first terminal device 1 and the secret calculation device 4 are computers that perform a variety of information processing. In the first embodiment, the first terminal device 1 performs processing such as generating encryption keys, encrypting input data, and decrypting ciphertexts that are generated by the secret calculation device 4. Herein, in the secret calculation device 4, without decrypting a received ciphertext, a first secret calculation operation and a second secret calculation operation are performed with respect to the received ciphertext, and the processed ciphertext is then output to the first terminal device 1.

The network 5 is a wide area network such as the Internet.

Herein, input data implies the target data for processing and contains information to be kept confidential, such as classified information. For example, the classified information represents individual information. However, that is not the only possible case. For example, in the medical/wellness field, input data implies the health diagnosis data, the receipt data, or the genome data that is in possession of a medical institution, a research institution, or a business enterprise.

The first secret calculation operation is a secret calculation operation in which first homomorphic computation based on a first homomorphic encryption method is performed with respect to a ciphertext that is obtained as a result of encrypting the input data according to the first homomorphic encryption method. The first secret calculation operation includes calculating the inner product or calculating the summation. For example, the first secret calculation operation includes calculating the inner product or the summation of the vectors at least once.

The second secret calculation operation is a secret calculation operation in which second homomorphic computation based a second homomorphic encryption method is performed with respect to ciphertexts. The second homomorphic calculation includes addition, multiplication, or identity operation. For example, the second secret calculation operation includes performing addition or multiplication of scalar values at least once.

The homomorphic encryption method represents the encryption technology used in secret calculation. In the homomorphic encryption method, if two ciphertexts obtained as a result of encrypting two plaintexts are provided; then, without decrypting those ciphertexts, it is possible to calculate of the ciphertext of the result of a binary operation performed with respect to the plaintexts. Herein, the binary operation represents, for example, addition or multiplication. From a practical perspective, there are times when homomorphic encryption having homomorphy regarding addition and multiplication for a finite number of times is used. Examples of such homomorphic encryption include a homomorphic encryption method in which Ring-LWE is adapted (LWE stands for Learning-with-errors). In the homomorphic encryption method in which Ring-LWE is adapted, it is possible to encrypt polynomials and it is possible to perform homomorphic multiplication and homomorphic addition of polynomials. Meanwhile, Module-LWE is also available as a homomorphic encryption method. Herein, Module-LWE represents the homomorphic encryption method that is designed by generalizing the homomorphic encryption method in which Ring-LWE is adapted.

As long as the second homomorphic encryption method is different than the first homomorphic encryption method, it serves the purpose. Moreover, as long as the second homomorphic computation is different than the first homomorphic computation, it serves the purpose. In the first homomorphic computation and the second homomorphic computation, multiplication and addition is included at least once.

In the first embodiment, the explanation is given about an example in which the first homomorphic encryption method is a homomorphic encryption method in which Ring-LWE is adapted, and the second homomorphic encryption method is a homomorphic encryption method in which LWE is adapted.

Moreover, in the first embodiment, the explanation is given about an example in which the input data contains two polynomials, and each coefficient in the polynomials is a vector element.

Furthermore, in the first embodiment, the explanation is given about an example in which the first secret calculation operation includes calculating the inner product of two vectors, and the second secret calculation operation includes calculating the square of the inner product result.

Meanwhile, the first embodiment represents the most fundamental embodiment for explaining the fundamental concept of the application concerned.

Explanation about Details of Secret Calculation Operations

Firstly, the explanation is given about the details of secret calculation operations including the first secret calculation operation and the second secret calculation operation according to the first embodiment.

In the secret calculation device 4 according to the first embodiment, as the first secret calculation operation, the inner product of a first vector $u=(u_0, u_1, \ldots, u_{l-1})$ having a length "l" and a second vector $v=(v_0, v_1, \ldots, v_{l-1})$ having the length "l" is calculated, and a first scalar value $s1=<u, v>$ is output. Herein, $<u, v>$ is a symbol representing the inner product of "u" and "v", and $<u, v>=u_0v_0+u_1v_1+\ldots+u_{l-1}v_{l-1}$ holds true. Moreover, in the secret calculation device 4, as the second secret calculation operation, the square of the first scalar value s1 is calculated and a second scalar value s2 $(=s1^2)$ is output. In the secret calculation device 4 according to the first embodiment, the data to be input to the first secret calculation operation and the second secret calculation operation is calculated in the confidential state, that is, in the form of ciphertexts.

Meanwhile, the first secret calculation operation and the second secret calculation operation represent the calculation operations that are convenient for explaining the concept of the application concerned. Thus, in those calculation operations, it is also possible to perform more generalized calculation operations.

More particularly, as the first secret calculation operation, it is possible to perform a calculation operation in which at least a single vector is treated as the input and at least a single scalar value is output. Moreover, as the second secret calculation operation, it is possible to perform a calculation operation in which at least a single scalar value, which represents the output data of the first secret calculation operation, is treated as the input; and at least a single scalar value is output.

Explanation about Homomorphic Encryption Method and Ciphertext Conversion Method In the secret calculation device 4 according to the first embodiment, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4 according to the first embodiment, in the first secret calculation operation, the first homomorphic computation based on the first homomorphic encryption method is performed with respect to a first ciphertext that is obtained as a result of encrypting the input data according to the first homomorphic encryption method, and a second ciphertext is calculated. Then, the ciphertext conversion method defined between the first homomorphic encryption method and the second homomorphic encryption method is implemented; and, without decrypting the second ciphertext, the second ciphertext is converted into a third ciphertext encrypted by the second homomorphic encryption method. Subsequently, in the second secret calculation operation, the second homomorphic computation based on the second homomorphic encryption method is performed with respect to the third ciphertext, and a fourth ciphertext is calculated.

For example, the first homomorphic encryption method is a homomorphic encryption method in which Ring-LWE or Module-LWE is adapted, and the second homomorphic encryption method is a homomorphic encryption method in which either LWE is adapted or LWE not dependent on the ring dimensionality of the first homomorphic encryption method is adapted. In that case, the ciphertext conversion method is implemented between the second ciphertext encrypted by the first homomorphic encryption method in which Ring-LWE or Module-LWE is adapted, and the third ciphertext encrypted by the second homomorphic encryption method in which either LWE is adapted or LWE not dependent on the ring dimensionality of the first homomorphic encryption method is adapted.

Then, in the ciphertext conversion performed according to the ciphertext conversion method, some of the numerical values constituting the polynomial second ciphertexts are extracted; and, without decrypting the second ciphertexts, the second ciphertext is converted into the third ciphertexts in which plaintexts expressed as the scalar values of the constant terms of the polynomials are encrypted.

Meanwhile, in the ciphertext conversion based on the ciphertext conversion method that is meant for the conversion for the second homomorphic encryption method in which LWE not dependent on the ring dimensionality of the first homomorphic encryption method is adapted; in addition to performing the operation of extracting some of the numerical values constituting the second ciphertexts, a calculation operation is performed using an encryption key and a conversion key, and, without decrypting the second ciphertexts, the second ciphertexts are converted into the third ciphertexts in which plaintexts expressed as the scalar values of the constant terms of polynomials are encrypted.

As explained above, in the first embodiment, the explanation is given about an example in which the first homomorphic encryption method is a homomorphic encryption method in which Ring-LWE is adapted, and the second homomorphic encryption method is a homomorphic encryption method in which LWE is adapted. Hence, in the first embodiment, the explanation is given for an example in which, the ciphertext conversion method to be implemented is defined between a second ciphertext encrypted by the first homomorphic encryption method in which Ring-LWE is adapted, and a third ciphertext encrypted by the second homomorphic encryption method in which LWE is adapted.

In the homomorphic encryption method in which Ring-LWE is adapted, a parameter "n" is included that represents the dimensionality of the polynomial ring, and an $(n-1)$-th-order polynomial "m" can be encrypted as the plaintext.

Herein, a secret key $sk_{RLWE}$ to be used in the encryption is provided using an $(n-1)$-th-order polynomial, and a public key $pk_{RLWE}$ is provided using a pair of two $(n-1)$-th-order polynomials. Hence, a ciphertext in which the $(n-1)$-th-order polynomial "m" represents the plaintext is provided using a pair (b, a) of two $(n-1)$-th-order polynomials "b" and "a", and the relationship $m=a \times sk_{RLWE}+b$ holds true.

In the homomorphic encryption method in which Ring-LWE is adapted, it is possible to perform homomorphic multiplication and homomorphic addition of polynomials at least once. If the method explained in "Masaya Yasuda et al. "New packing method in somewhat homomorphic encryption and its applications", Security and Communication Networks 8.13 (2015): 2194-2213" is implemented, in the homomorphic encryption method in which Ring-LWE is adapted, a vector is converted into a polynomial according to a predetermined method and then the polynomial is encrypted. Thus, the homomorphic multiplication functions as homomorphic inner product computation.

More particularly, in the secret calculation device 4, two vectors $u=(u_0, u_1, \ldots, u_{l-1})$ and $v=(v_0, v_1, \ldots, v_{l-1})$ having the length "l" $(\leq n)$ are converted into polynomials $fw(u)= u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, using a first conversion function fw and a second conversion function bw, respectively. The first conversion function $fw(u)$ is a polynomial in which the vector elements $u_0, u_1, \ldots, u_{l-1}$ are assigned in ascending order from the zero-order coefficient. The second conversion function $bw(v)$ is a polynomial in which the vector element $v_0$ is assigned to the zero-order coefficient, and the sign-inverted values of the vector elements $v_1, v_2, \ldots, v_{l-1}$ are assigned in descending order from the $(n-1)$-order coefficient.

If the polynomials given above are encrypted, homomorphic multiplication $EvalMult_{RLWE}$ can be defined as homomorphic inner product computation as given below in Equation (1).

$$EvalMult_{RLWE}(Enc_{RLWE}(fw(u)), Enc_{RLWE}(bw(v))) = Enc_{RLWE}(\langle u, v \rangle + \quad (1)$$

$$r_1 x + r_2 x^2 + \ldots + x_{n-1} x^{n-1})$$

In Equation (1), $Enc_{RLWE}$ represents an encryption function used in the homomorphic encryption method in which Ring-LWE is adapted, and $r_i$ represents a scalar value.

In the homomorphic encryption method in which LWE is adapted, a parameter "d" representing the vector dimensionality is used, and the scalar value "m" can be encrypted as the plaintext.

A secret key $sk_{LWE}$ is provided using a d-order vector, and a public key $pk_{LWE}$ is provided using the pair of a scalar and the d-order vector. The ciphertext in which the scalar value "m" is the plaintext is provided using the pair (b, a) of the d-order vector "a" and the scalar "b", and the relationship $m=\langle a, sk_{LWE}\rangle+b$ holds true.

In the homomorphic encryption method in which LWE is adapted, it is possible to perform homomorphic multiplication and homomorphic addition of scalar values at least once. According to "Hao Chen et al. "Efficient homomorphic conversion between (ring) LWE ciphertexts", International Conference on Applied Cryptography and Network Security. Cham: Springer International Publishing, 2021", the ciphertext of a $(n-1)$-order polynomial $m=m_0+ m_1x+ \ldots +m_{n-1}x^{n-1}$ encrypted by the homomorphic encryption method in which Ring-LWE is adapted, can be converted, without decrypting the ciphertext, into the ciphertext of the constant term $m_0$ encrypted by the homomorphic encryption method in which LWE having the vector dimensionality equal to "d" $(=n)$ is adapted.

Herein, $Enc_{RLWE}(m)=(b, a_0)$ represents the ciphertext of the polynomial "m". Moreover, $a_0=a_0$, of $a_{0, 1}x+ \ldots + a_{0, n-1}x^{n-1}$ holds true. In that case, the ciphertext of the constant term $m_0$ of the polynomial "m" encrypted by the homomorphic encryption method in which LWE having the vector dimensionality equal to "d" $(=n)$ is adapted, can be calculated using ciphertext conversion $Extract_{RLWEtoLWE}$ given below in Equation (2).

$$Enc_{LWE}(m_0) = \text{Extract}_{RLWEtoLWE}(Enc_{RLWE}(m)) = (b_0, a_0, -a_{n-1}, -a_{n-2}, \quad (2)$$

$$\dots, -a_1)$$

Regarding a ciphertext obtained as a result of performing encryption according to the homomorphic encryption method in which LWE is adapted, when the secret key in the Ring-LWE homomorphic encryption is set to $sk_{RLWE}=sk_0+sk_1x+\dots+sk_{n-1}x^{n-1}$, the ciphertext given in Equation (2) is decryptable if the secret key of LWE homomorphic encryption is set to $sk_{LWE}=(sk_0, sk_1, \dots, sk_{n-1})$.

Meanwhile, the first homomorphic encryption method and the second homomorphic encryption method are only exemplary. Thus, alternatively, as the first homomorphic encryption method, it is possible to implement a homomorphic encryption method in which polynomial plaintexts can be encrypted and homomorphic computation related to polynomial multiplication and polynomial addition can be defined. Herein, in the polynomials, the coefficients represent vector elements. Moreover, as the second homomorphic encryption method, it is possible to use a homomorphic encryption method in which scalar values can be encrypted, homomorphic multiplication and homomorphic addition can be performed, and ciphertext conversion can be defined with the first homomorphic encryption method.

Explanation about Secret Calculation Method

In the secret calculation device 4 according to the first embodiment, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1, the secret key $sk_{RLWE}$ and the public key $pK_{RLWE}$ are generated for use in the first homomorphic encryption method. Moreover, when the secret key to be used in the first homomorphic encryption method is set to $sk_{RLWE}=sk_0+sk_1x+\dots+sk_{n-1}x^{n-1}$, the secret key to be used in the second homomorphic encryption method is set to $sk_{LWE}=(sk_0, sk_1, \dots, sk_{n-1})$. Thus, the secret key $sk_{LWE}$ is a vector which has the length "n" and in which the coefficients of the (n−1)-order polynomials of the secret key $sk_{RLWE}$ are treated as elements in order from the zero-order coefficient. The public key $pk_{RLWE}$ to be used in the first homomorphic encryption method is treated as a first encryption key, and the secret key $sk_{LWE}$ to be used in the second homomorphic encryption method is treated as a first decryption key. Alternatively, the secret key $sk_{RLWE}$ that is to be used in the first homomorphic encryption method can be used as the first encryption key.

In the first terminal device 1, using the first homomorphic encryption method, the first vector $u=(u_0, u_1, \dots, u_{l-1})$ and the second vector $v=(v_0, v_1, \dots, v_{l-1})$, which have the length "l" and which represent the input to the first secret calculation operation, are converted into the polynomials $fw(u)=u_0+u_1x+\dots+u_{l-1}x^{l-1}$ and $bw(v)=v_0-v_1x^{n-1}-v_2x^{n-2}-\dots-v_{l-1}x^{n-(l-1)}$, respectively, according to the first conversion function fw and the second conversion function bw, respectively. Alternatively, at the time of conversion, the functions $fw(v)$ and $bw(u)$ can also be used. Then, in the first terminal device 1, the abovementioned polynomials are encrypted using the first encryption key $pK_{RLWE}$, and two first ciphertexts $ct_u$ and $ct_v$ are generated. Thus, the first ciphertexts are obtained as a result of encrypting plaintexts that include vectors.

In the secret calculation device 4, the first ciphertexts $ct_u$ and $ct_v$, which are obtained as a result of performing encryption according to the first homomorphic encryption method, are subjected to the first secret calculation operation in which the homomorphic multiplication $EvalMult_{RLWE}$ is performed, and a polynomial second ciphertext $ct_{s1+}=EvalMult_{RLWE}(ct_u, ct_v)$ is calculated in which the first scalar value $s1=<u, v>$ represents the constant term. Thus, the second ciphertext is obtained as a result of encrypting plaintexts that include scalar values. The homomorphic multiplication $EvalMult_{RLWE}$ functions as the homomorphic inner product computation that can be used in the first homomorphic encryption method. Thus, the second ciphertext is obtained as a result of performing encryption according to the first homomorphic encryption method.

Subsequently, in the secret calculation device 4, the ciphertext conversion Extract RLWEtoLWE is performed and, without decrypting the second ciphertext $ct_{s1+}$ that represents the output data of the first secret calculation operation, the second ciphertext $ct_{s1+}$ is converted into a third ciphertext $ct_{s1}=Extract_{RLWEtoLWE}(ct_{s1+})$ of the first scalar value s1. Thus, the third ciphertext is obtained as a result of encrypting the plaintext of a scalar value. More specifically, the third ciphertext is obtained as a result of performing encryption according to the second homomorphic encryption method.

Moreover, in the secret calculation device 4, the third ciphertext $ct_{s1}$ encrypted by the second homomorphic encryption method is subjected to the second secret calculation operation using homomorphic multiplication $EvalMult_{LWE}$, and a fourth ciphertext $ct_{s2}$ ($=EvalMult_{LWE}(ct_{s1}, ct_{s1})$) of the second scalar value s2 ($=s1^2$) is calculated. Thus, the fourth ciphertext is obtained as a result of encrypting the plaintext of a scalar value. In other words, the fourth ciphertext is obtained as a result of performing encryption according to the second homomorphic encryption method. The homomorphic multiplication $EvalMult_{LWE}$ represents the homomorphic multiplication that can be used in the second homomorphic encryption method.

In the first terminal device 1, the fourth ciphertext $ct_{s2}$ of the second scalar value s2 is decrypted using the first decryption key $sk_{LWE}$, and the second scalar value s2 is calculated.

Explanation about System Configuration/Functions

Given below is the specific explanation about the secret calculation system 100 according to the first embodiment.

Figure 2:
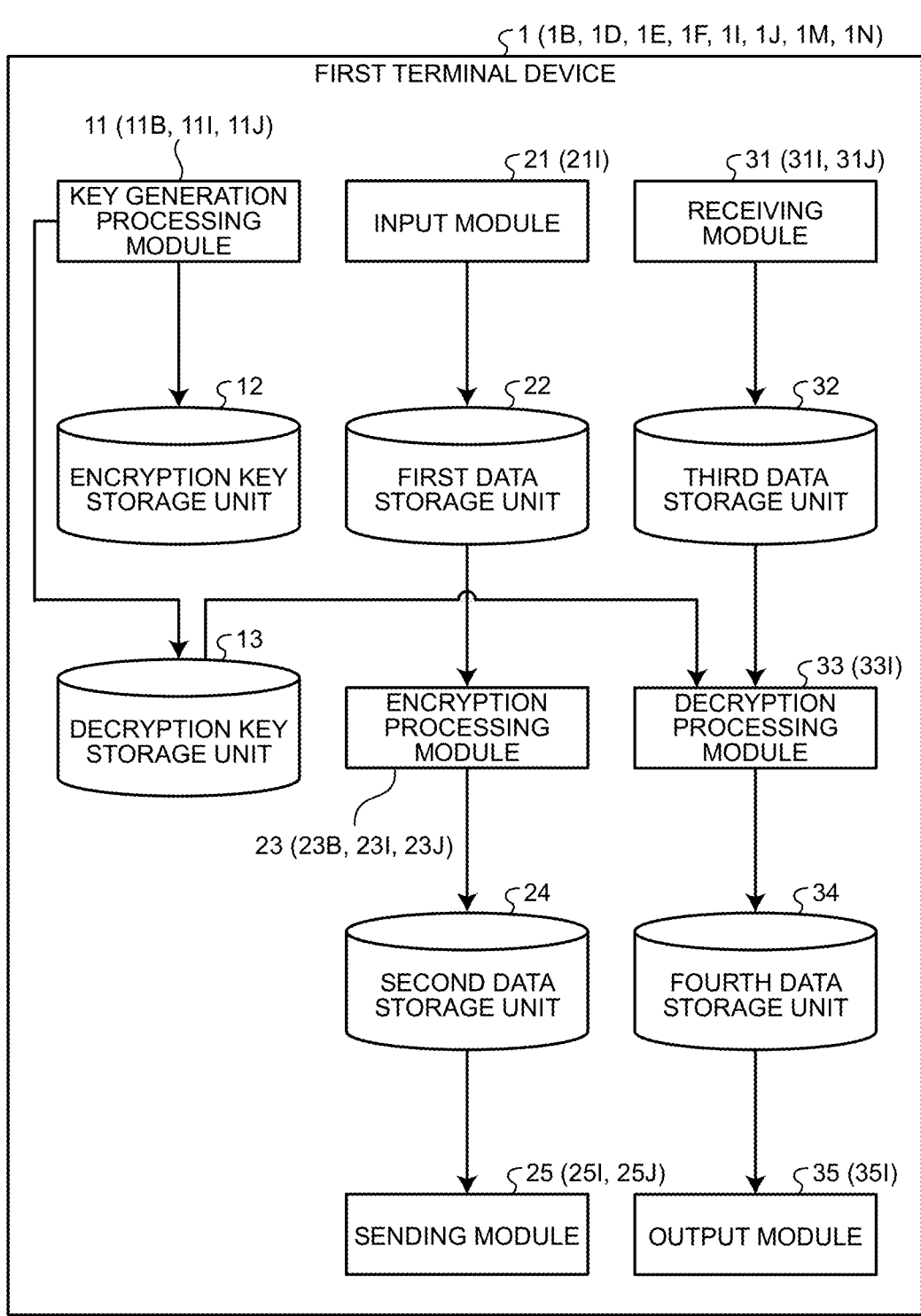
FIG. 2 is a functional block diagram illustrating a first terminal device.

FIG. 2 is a functional block diagram illustrating an example of the first terminal device 1 according to the first embodiment.

The first terminal device 1 includes a key generation processing module 11, an encryption key storage unit 12, a decryption key storage unit 13, an input module 21, a first data storage unit 22, an encryption processing module 23, a second data storage unit 24, a sending module 25, a receiving module 31, a third data storage unit 32, a decryption processing module 33, a fourth data storage unit 34, and an output module 35.

The key generation processing module 11, the input module 21, the encryption processing module 23, the sending module 25, the receiving module 31, the decryption processing module 33, and the output module 35 are implemented using, for example, one or more processors. For example, the abovementioned units can be implemented by causing a processor such as a central processing unit (CPU) to execute computer programs, that is, can be implemented using software. Alternatively, the abovementioned units can be implemented using a processor such as a dedicated IC, that is, can be implemented using hardware. Still alternatively, the abovementioned units can be implemented using a combination of software and hardware. In the case of using a plurality of processors, each processor can implement one of the units or can implement two or more units.

Still alternatively, the abovementioned units can be implemented using, for example, one or more CPUs, or a microprocessor, or a graphics processing unit (GPU), or a processing circuit such as an application specific integrated circuit (ASIC) or a field-programmable gate array (FPGA); or can be implemented using an electronic circuit that includes such circuits.

The key generation processing module 11 generates the encryption key for the first homomorphic encryption method and generates the decryption key for the second homomorphic encryption method. In the first embodiment, the key generation processing module 11 generates the public key $pk_{RLWE}$, which is to be used in the first homomorphic encryption method, as the encryption key (first encryption key) and generates the secret key $sk_{RLWE}$ as the decryption key.

When the secret key to be used in the first homomorphic encryption method is set to $sk_{RLWE}=sk_0+sk_1x+ \ldots + sk_{n-1}x^{n-1}$, the secret key to be used in the second homomorphic encryption method becomes $sk_{LWE}=(sk_0, sk_1, \ldots, sk_{n-1})$. That is, in the first embodiment, the public key $pk_{RLWE}$ to be used in the first homomorphic encryption method is implemented as the first encryption key, and the secret key $sk_{LWE}$ to be used in the second homomorphic encryption method is implemented as the first decryption key. Meanwhile, the secret key $sk_{RLWE}$ to be used in the first homomorphic encryption method can alternatively be used as the first encryption key.

Then, the key generation processing module 11 stores the first encryption key in the encryption key storage unit 12, and stores the first decryption key in the decryption key storage unit 13.

The input module 21 obtains, from the computer connected to the first terminal device 1, the input data to be used in the first secret calculation operation. In the first embodiment, the input module 21 obtains, as the input data, the first vector $u=(u_0, u_1, \ldots, u_{l-1})$ and the second vector $v=(v_0, v_1, \ldots, v_{l-1})$. Then, the input module 21 stores the first vector "u" and the second vector "y" in the first data storage unit 22.

The encryption processing module 23 uses the encryption key and calculates first ciphertexts in which the input data is encrypted. More specifically, the encryption processing module 23 converts the first vector "u" and the second vector "v", which are stored in the first data storage unit 22, into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, using the first conversion function fw and the second conversion function bw, respectively. Then, the encryption processing module 23 encrypts the polynomials fw(u) and bw(v) using the first encryption key $pk_{RLWE}$ that is stored in the encryption key storage unit 12, and calculates the first ciphertexts $ct_u$ and $ct_v$ that are obtained as a result of performing encryption according to the first homomorphic encryption method. Then, the encryption processing module 23 stores the first ciphertexts in the second data storage unit 24.

The sending module 25 sends the first ciphertexts $ct_u$ and $ct_v$, which are stored in the second data storage unit 24, to the secret calculation device 4.

The receiving module 31 receives, from the secret calculation device 4, the fourth ciphertext $ct_{s2}$ of the second scalar value S2, which represents the data encrypted using the second homomorphic encryption method and which is output as a result of performing the second secret calculation operation. Then, the receiving module 31 stores the received fourth ciphertext in the third data storage unit 32.

The decryption processing module 33 calculates output data in which the fourth ciphertext $ct_{s2}$, which is stored in the third data storage unit 32, is decrypted using the decryption key. More specifically, the decryption processing module 33 decrypts the fourth ciphertext $ct_{s2}$ using the first decryption key $sk_{LWE}$ that is stored in the decryption key storage unit 13, and calculates the second scalar value s2. Then, the decryption processing module 33 stores the second scalar value s2 in the fourth data storage unit 34.

The output module 35 outputs the second scalar value s2, which is stored in the fourth data storage unit 34, to an external device such as a computer that is connected to the first terminal device 1.

Meanwhile, the input module 21 can obtain the polynomials fw(u) and bw(u) from the computer connected to the first terminal device 1, and store them in the first data storage unit 22. Then, the encryption processing module 23 can encrypt the polynomials, which are stored in the first data storage unit 22, using the first encryption key $pk_{RLWE}$ that is stored in the encryption key storage unit 12. Subsequently, the encryption processing module 23 can calculate the first ciphertexts $ct_u$ and $ct_v$ that are obtained as a result of performing encryption according to the first homomorphic encryption method, and store the first ciphertexts $ct_u$ and $ct_v$ in the second data storage unit 24.

FIG. 3 is a functional block diagram illustrating an example of the secret calculation device 4 according to the first embodiment.

The secret calculation device 4 includes a receiving module 41, a first data storage unit 42, a first secret calculation processing module 43, a second data storage unit 44, a ciphertext conversion processing module 45, a third data storage unit 46, a second secret calculation processing module 47, a fourth data storage unit 48, and a sending module 49.

The receiving module 41, the first secret calculation processing module 43, the ciphertext conversion processing module 45, the second secret calculation processing module 47, and the sending module 49 are implemented using, for example, one or more processors. For example, the abovementioned units can be implemented by causing a processor such as a CPU to execute computer programs, that is, can be implemented using software. Alternatively, the abovementioned units can be implemented using a processor such as a dedicated IC, that is, can be implemented using hardware. Still alternatively, the abovementioned units can be implemented using a combination of software and hardware. In the case of using a plurality of processors, each processor can implement one of the units or can implement two or more units.

Still alternatively, the abovementioned units can be implemented using, for example, one or more CPUs, or a microprocessor, or a GPU, or a processing circuit such as an ASIC or an FPGA; or can be implemented using an electronic circuit that includes such circuits.

The receiving module 41 receives the first ciphertexts $ct_u$ and $ct_v$ from the first terminal device 1, and stores them in the first data storage unit 42.

The first secret calculation processing module 43 performs the first secret calculation operation with respect to the first ciphertexts $ct_u$ and $ct_v$, which are obtained as a result of encrypting the input data according to the first homomorphic encryption method, using the first homomorphic computation based on the first homomorphic encryption method; and calculates a second ciphertext. More specifically, the first secret calculation processing module 43 performs the first secret calculation operation with respect to the first ciphertexts that are obtained as a result of encrypting plaintexts including vectors, and calculates a second ciphertext in which a plaintext including a scalar value is encrypted. Still more specifically, the first secret calculation processing module 43 performs the first secret calculation operation in which the first homomorphic computation representing the homomorphic inner product computation based on the first homomorphic encryption method is implemented with respect to two first ciphertexts that are obtained as a result of encrypting two polynomials in which the coefficients represent vector elements, and calculates a second ciphertext of a polynomial plaintext in which the scalar value of the inner product result is stored in the constant term.

In the first embodiment, the first secret calculation processing module 43 performs the first secret calculation operation with respect to the first ciphertexts $ct_u$ and $ct_v$, which are stored in the first data storage unit 42, using the homomorphic multiplication $EvalMult_{RLWE}$. As a result of performing the first secret calculation operation, the first secret calculation processing module 43 calculates the second ciphertext $ct_{s1+}$ encrypted by the first homomorphic encryption method. The second ciphertext $ct_{s1+}$ is a polynomial ciphertext having the first scalar value s1 as the constant term. Then, the first secret calculation processing module 43 stores the second ciphertext $ct_{s1+}$ in the second data storage unit 44.

The ciphertext conversion processing module 45 implements the ciphertext conversion method that is defined between the first homomorphic encryption method and the second homomorphic encryption method; and, without decrypting the second ciphertexts, converts the second ciphertexts into third ciphertexts that are obtained as a result of performing encryption according to the second homomorphic encryption method. More specifically, the ciphertext conversion processing module 45 converts a second ciphertext, in which the plaintext of a scalar value is encrypted, according to the second homomorphic encryption method. Still more specifically, without decrypting a second ciphertext, the ciphertext conversion processing module 45 converts the second ciphertext into a third ciphertext in which the plaintext of a scalar value representing the constant term of a polynomial is obtained as a result of performing encryption according to the second homomorphic encryption method.

More particularly, the ciphertext conversion processing module 45 uses the ciphertext conversion $Extract_{RLWEtoLWE}$ and, without decrypting the second ciphertext $ct_{s1+}$ that is stored in the second data storage unit 44, converts the second ciphertext $ct_{s1+}$ into the third ciphertext $ct_{s1}$ of the first scalar value s1 as obtained as a result of performing encryption according to the second homomorphic encryption method. Then, the ciphertext conversion processing module 45 stores the third ciphertext $ct_{s1}$ in the third data storage unit 46.

The second secret calculation processing module 47 performs the second secret calculation operation in which the second homomorphic computation based on the second homomorphic encryption method is implemented with respect to a third ciphertext, and calculates a fourth ciphertext. More specifically, the second secret calculation processing module 47 performs the second secret calculation operation with respect to a third ciphertext, and calculates a fourth ciphertext in which the plaintext of a scalar value is encrypted. Still more specifically, the second secret calculation processing module 47 performs the second secret calculation operation, in which the second homomorphic computation is performed that includes at least one instance of homomorphic multiplication and includes homomorphic addition, with respect to the third ciphertext; and calculates a fourth ciphertext.

More particularly, the second secret calculation processing module 47 performs the second secret calculation operation with respect to the ciphertext $ct_{s1}$, which is stored in the third data storage unit 46, using the homomorphic multiplication $EvalMult_{LWE}$; and calculates the fourth ciphertext $ct_{s2}$. The fourth ciphertext $ct_{s2}$ is a ciphertext obtained as a result of performing the second secret calculation operation using the second homomorphic encryption method, and represents the ciphertext of the second scalar value s2.

The second secret calculation processing module 47 stores the fourth ciphertext $ct_{s2}$ in the fourth data storage unit 48.

The sending module 49 sends the fourth ciphertext, which is stored in the fourth data storage unit 48, to the first terminal device 1.

Explanation about Flow

Given below is the explanation of an exemplary flow of information processing performed in the first terminal device 1 and the secret calculation device 4 according to the first embodiment.

Figure 4:
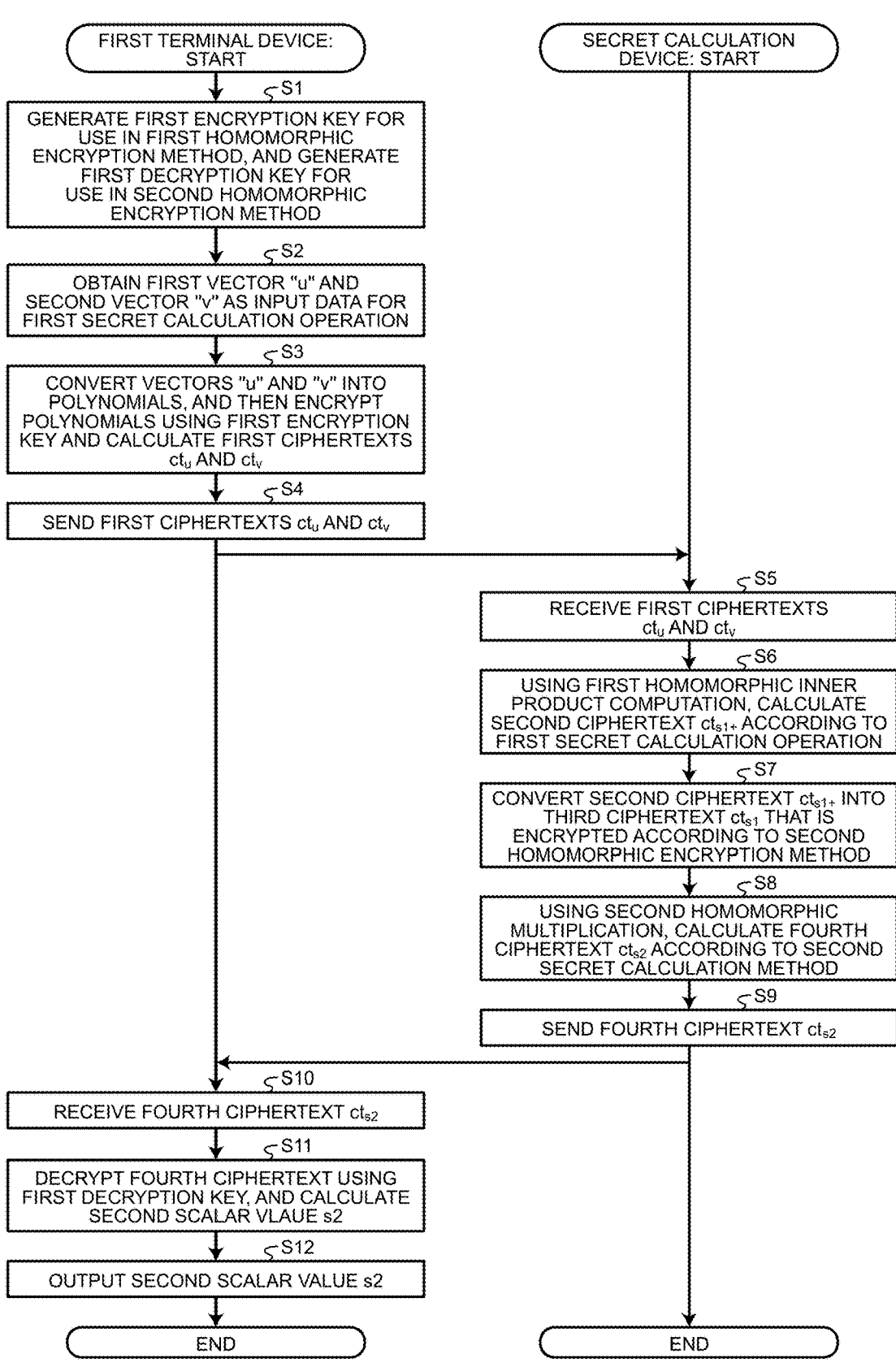
FIG. 4 is a flowchart for explaining an exemplary flow of information processing performed in the first terminal device and the secret calculation device.

FIG. 4 is a flowchart for explaining an exemplary flow of information processing performed in the first terminal device 1 and the secret calculation device 4 according to the first embodiment.

The key generation processing module 11 of the first terminal device 1 generates the public key $pk_{RLWE}$ as the first encryption key to be used in the first homomorphic encryption method. Moreover, the key generation processing module 11 generates the secret key $sk_{RLWE}$ for use in the first homomorphic encryption method; and, from the secret key $sk_{RLWE}$, generates the secret key $sk_{LWE}$ as the first decryption key to be used in the second homomorphic encryption method (Step S1).

Alternatively, as explained earlier, the key generation processing module 11 can use the secret key $sk_{RLWE}$ as the first encryption key to be used in the first homomorphic encryption method. Then, the key generation processing module 11 stores the first encryption key, which is generated at Step S1, in the encryption key storage unit 12; and stores the first decryption key, which is generated at Step S1, in the decryption key storage unit 13.

The input module 21 of the first terminal device 1 obtains, from the computer that is communicably connected to the first terminal device 1, the input data containing the first vector $u = (u_0, u_1, \ldots, u_{l-1})$ and a second vector $V = (v_0, v_1, \ldots, v_{l-1})$ (Step S2). Then, the input module 21 stores the input data, which contains the first vector and the second vector, in the first data storage unit 22.

The encryption processing module 23 of the first terminal device 1 converts the first vector "u" and the second vector "v", which are stored in the first data storage unit 22, into the polynomials $fw(u) = u_0 + u_1 x + \ldots + u_{l-1} x^{l-1}$ and $bw(v) = v_0 - v_1 x^{n-1} - v_2 x^{n-2} - \ldots - v_{l-1} x^{n-(l-1)}$, respectively, using the first conversion function fw and the second conversion function bw, respectively. Then, the encryption processing module 23 encrypts the polynomials fw(u) and bw(v) using the first encryption key $pk_{RLWE}$ that is stored in the encryption key storage unit 12, and calculates the first ciphertexts $ct_u$ and $ct_v$ that are obtained as a result of performing encryption according to the first homomorphic encryption method (Step S3). Subsequently, the encryption processing module 23 stores the calculated first ciphertexts in the second data storage unit 24.

The sending module 25 of the first terminal device 1 sends the first ciphertexts $ct_u$ and $ct_v$, which are stored in the second data storage unit 24, to the secret calculation device 4 (Step S4).

The receiving module 41 of the secret calculation device 4 receives the first ciphertexts $ct_u$ and $ct_v$ from the first terminal device 1, and stores them in the first data storage unit 42 (Step S5).

The first secret calculation processing module 43 of the secret calculation device 4 performs the first secret calculation operation with respect to the first ciphertexts $ct_u$ and $ct_v$, which are stored in the first data storage unit 42, using the homomorphic multiplication $EvalMult_{RLWE}$, and calculates the second ciphertext $ct_{s1+}$ (Step S6). Then, the first secret calculation processing module 43 stores the second ciphertext in the second data storage unit 44.

Subsequently, without decrypting the second ciphertext $ct_{s1+}$ that is stored in the second data storage unit 44, the ciphertext conversion processing module 45 of the secret calculation device 4 converts the second ciphertext $ct_{s1+}$ into the third ciphertext $ct_{s1}$ of the first scalar value s1 using the ciphertext conversion $Extract_{RLWEtoLWE}$ (Step S7). Then, the ciphertext conversion processing module 45 stores the third ciphertext in the third data storage unit 46.

The second secret calculation processing module 47 of the secret calculation device 4 performs the second secret calculation operation with respect to the third ciphertext $ct_{s1}$, which is stored in the third data storage unit 46, using the homomorphic multiplication $EvalMult_{LWE}$, and calculates the fourth ciphertext $ct_{s2}$ of the second scalar value s2 (Step S8). Then, the second secret calculation processing module 47 stores the fourth ciphertext in the fourth data storage unit 34.

The fourth data storage unit 48 of the secret calculation device 4 sends the fourth ciphertext $ct_{s2}$, which is stored in the fourth data storage unit 34, to the first terminal device 1 (Step S9).

The receiving module 31 of the first terminal device 1 receives the fourth ciphertext $ct_{s2}$ from the secret calculation device 4, and stores it in the third data storage unit 32 (Step S10).

The decryption processing module 33 of the first terminal device 1 decrypts the fourth ciphertext $ct_{s2}$, which is stored in the third data storage unit 32, using the first decryption key $sk_{LWE}$ stored in the decryption key storage unit 13; and calculates the second scalar value s2 (Step S11). Then, the decryption processing module 33 stores the second scalar value in the fourth data storage unit 34.

The output module 35 of the first terminal device 1 outputs the second scalar value s2, which is stored in the fourth data storage unit 34, to the computer connected to the first terminal device 1 (Step S12). That marks the end of the present routine.

As explained above, the secret calculation device 4 according to the first embodiment includes the first secret calculation processing module 43, the ciphertext conversion processing module 45, and the second secret calculation processing module 47. The first secret calculation processing module 43 performs the first secret calculation operation with respect to a first ciphertext, which is obtained as a result of encrypting the input data according to the first homomorphic encryption method, using the first homomorphic computation based on the first homomorphic encryption method, and calculates a second ciphertext. The ciphertext conversion processing module 45 implements the ciphertext conversion method that is defined between the first homomorphic encryption method and the second homomorphic encryption method; and, without decrypting the second ciphertext, converts the second ciphertext into a third ciphertext encrypted by the second homomorphic encryption method. The second secret calculation processing module 47 performs the second secret calculation operation in which the second homomorphic computation based on the second homomorphic encryption method is implemented with respect to the third ciphertext, and calculates a fourth ciphertext.

In the conventional technology, only limited types of homomorphic computation are available for implementation in a large number of homomorphic encryption methods. Hence, it is not always the case that secret calculation can be performed for an entire calculation operation; and there are times when an intermediate result of the calculation operation needs to be decrypted and further calculation needs to be carried out in the plaintext form. Thus, there are times when the secret of the data undergoes a decline.

More specifically, examples of the application of the homomorphic encryption include genome-wide association analysis (GWAS) representing one of the statistical analysis methods of genome data. The genome data is utilized in disease risk prevention or in drug development. The GWAS is used in: performing statistical analysis with respect to single nucleotide polymorphism (SNP) data of a plurality of individuals and with respect to trait data indicating the presence or absence or a particular disorder; establishing the presence or absence of a relationship between the SNP data and the trait data; and identifying the genetic factor of the disorder. If the homomorphic encryption is applied to the GWAS, then the SNP data and the trait data can be analyzed in their confidential form, thereby enabling prevention of information leakage. For example, in "Wenjie Lu, Yoshiji Yamada, and Jun Sakuma. "Privacy-preserving genome-wide association studies on cloud environment using fully homomorphic encryption", BMC medical informatics and decision making. Vol. 15. BioMed Central, 2015", the explanation is given about the method for implementing a homomorphic encryption method, in which Ring-LWE is adapted, with respect to the GWAS.

In the genome data analysis according to the GWAS explained in "Wenjie Lu, Yoshiji Yamada, and Jun Sakuma. "Privacy-preserving genome-wide association studies on cloud environment using fully homomorphic encryption", BMC medical informatics and decision making. Vol. 15. BioMed Central, 2015", since the operation of calculating the inner product of vectors is included, the homomorphic encryption method is implemented in which Ring-LWE is adapted and in which homomorphic inner product computation can be used. According to "Masaya Yasuda et al. "New packing method in somewhat homomorphic encryption and its applications", Security and Communication Networks 8.13 (2015): 2194-2213", in the homomorphic encryption method in which Ring-LWE is adapted, since the encryption is performed by treating vectors as polynomials, homomorphic multiplication can be used as homomorphic inner product computation. More particularly, from a ciphertext that is obtained as a result of performing encryption after the conversion of two vectors according to a predetermined method, a polynomial ciphertext can be calculated in which the inner product result of the vectors represents the constant term. In the homomorphic encryption method in which Ring-LWE is adapted and in which the method according to the above second document is implemented, although homomorphic inner product computation can be performed in an efficient manner, the method for performing homomorphic multiplication of vector elements is not established. Hence, for example, in the case in which the inner product is calculated in the first secret calculation operation and the multiplication is performed in the second secret calculation operation, there are times when the ciphertext of the result of the first secret calculation operation needs to be decrypted before handing it over to the second secret calculation operation.

In actuality, in the genome data analysis based on the GWAS explained in the above first document, since calculation operations such as the first secret calculation operation and the second secret calculation operation are included, the ciphertext of the inner product result that is equivalent to the intermediate data of the GWAS is decrypted, and the allele frequency table representing the intermediate data of the GWAS cannot be kept confidential. Moreover, at the time of decrypting the ciphertext of the result of homomorphic inner product computation, there is a possibility that the information gets leaked from the non-constant terms. Hence, it becomes necessary to perform a masking operation with respect to the ciphertext as explained in "International Laid-open Pamphlet No. 2022/201277". However, that requires time and efforts. These issues are not limited to a homomorphic encryption method in which Ring-LWE is adapted. That is, the same issues are applicable to a homomorphic encryption method in which Module-LWE is adapted, which represents the homomorphic encryption method that is designed by generalizing a homomorphic encryption method in which Ring-LWE is adapted.

In this way, in the conventional technology, at the time of handing over the ciphertext of the result of the first secret calculation operation to the second secret calculation operation, there are times when the ciphertext needs to be decrypted. Hence, there are times when the secret undergoes a decline.

In contrast, in the secret calculation device 4 according to the first embodiment, the ciphertext conversion processing module 45 implements the ciphertext conversion method that is defined between the first homomorphic encryption method and the second homomorphic encryption method; and, without decrypting the second ciphertext, converts the second ciphertext into a third ciphertext encrypted by the second homomorphic encryption method. The second secret calculation processing module 47 performs the second secret calculation operation in which the second homomorphic computation based on the second homomorphic encryption method is implemented with respect to the third ciphertext; and calculates a fourth ciphertext.

For that reason, in the secret calculation device 4 according to the first embodiment, the secret calculation operation can be performed without having to decrypt the ciphertext, thereby enabling achieving enhancement in the secret.

Thus, the secret calculation device 4 and the secret calculation system 100 according to the first embodiment enables achieving enhancement in the secret of the data.

With reference to FIG. 2, as an exemplary configuration, the first terminal device 1 includes the key generation processing module 11, the encryption key storage unit 12, the decryption key storage unit 13, the input module 21, the first data storage unit 22, the encryption processing module 23, the second data storage unit 24, the sending module 25, the receiving module 31, the third data storage unit 32, the decryption processing module 33, the fourth data storage unit 34, and the output module 35. Alternatively, the first terminal device 1 can be configured to include only some of those constituent elements. For example, the first terminal device 1 can be configured to include at least either the key generation processing module 11, or the encryption processing module 23, and or the decryption processing module 33.

More particularly, the first terminal device 1 can be configured to not include the key generation processing module 11. For example, the key generation processing module 11 can be included in some other external terminal device other than the first terminal device 1, and that external terminal device can be configured to generate the first encryption key for use in the first homomorphic encryption method and to generate the first decryption key for use in the second homomorphic encryption method. In that case, the external terminal device can send the first encryption key and the first decryption key to the first terminal device 1. Meanwhile, the first terminal device 1 can be configured to not include the encryption processing module 23 too. When the first terminal device 1 does not include the encryption processing module 23, the external terminal device need not send the first encryption key to the first terminal device 1. In the first terminal device 1, when the receiving module 31 receives the first encryption key and the first decryption key from the external terminal device, they can be respectively stored in the encryption key storage unit 12 and the decryption key storage unit 13.

Meanwhile, the first terminal device 1 can be configured to include the key generation processing module 11, the encryption key storage unit 12, the decryption key storage unit 13, and the sending module 25; and to generate a first encryption key and a first decryption key for use in other terminal devices. In that case, for example, the sending module 25 of the first terminal device 1 can send the first encryption key to an external terminal device that includes the encryption processing module 23, and can send the first decryption key to an external terminal device that includes the decryption processing module 33. After sending the keys, the first terminal device 1 can delete the first encryption key and the first decryption key.

Moreover, the first terminal device 1 can be configured to not include the input module 21. For example, the input module 21 and the first data storage unit 22 can be included in some other external terminal device other than the first terminal device 1. In that case, the external terminal device sends the input data, which is received by the input module 21, to the first terminal device 1. In the first terminal device 1, when the receiving module 31 receives the input data from the external terminal device, the input data can be stored in the first data storage unit 22 of the first terminal device 1.

Furthermore, the first terminal device 1 can be configured to not include the first data storage unit 22 and the encryption processing module 23. Moreover, an external terminal device for the first terminal device 1 can be configured to further include the encryption processing module 23 and the second data storage unit 24. In that case, the first terminal device 1 can be configured to not include the encryption key storage unit 12. Furthermore, in that case, the external terminal device sends a first ciphertext, which is stored in the second data storage unit 24, to the first terminal device 1. In The first terminal device 1, when the receiving module 31 receives the first ciphertext from the external terminal device, the first ciphertext can be stored in the second data storage unit 24.

Moreover, the first terminal device 1 can be configured to not include the second data storage unit 24 and the sending module 25. For example, the sending module 25 can be included in an external terminal device for the first terminal device 1. Moreover, in the case in which the first terminal device 1 does not include the key generation processing module 11 and in which, for example, the first decryption key is received from the external terminal device, the first terminal device 1 can include the receiving module 31. Furthermore, in the case in which the first terminal device 1 does not include the output module 35 or the decryption processing module 33 and in which a ciphertext or a decryption result is to be sent to the external terminal device, the first terminal device 1 can include the sending module 25.

The first terminal device 1 can be configured to include the encryption key storage unit 12, the input module 21, the first data storage unit 22, the encryption processing module 23, the second data storage unit 24, the sending module 25, and the receiving module 31. In that case, in the first terminal device 1, the receiving module 31 can receive the first encryption key from a terminal device that includes the key generation processing module 11, and can store the first encryption key in the encryption key storage unit 12.

Meanwhile, the first terminal device 1 can be configured to not include the output module 35. For example, some other terminal device other than the first terminal device 1 can be configured to include the fourth data storage unit 34 and the output module 35, and that external terminal device can output the decryption result stored in the fourth data storage unit 34. In that case, the sending module 25 of the first terminal device 1 sends the decryption result, which is stored in the corresponding fourth data storage unit 34, to the external terminal device. When the decryption result is received from the first terminal device 1, the external terminal device can store the decryption result in the corresponding fourth data storage unit 34.

Moreover, the first terminal device 1 can be configured to further not include the decryption processing module 33 and the fourth data storage unit 34. For example, the external terminal device can be configured to further include the third data storage unit 32 and the decryption processing module 33, and to decrypt the ciphertext stored in the third data storage unit 32. In that case, the first terminal device 1 need not include the decryption key storage unit 13 too. Moreover, in that case, the sending module 25 of the first terminal device 1 sends the fourth ciphertext, which is stored in the corresponding third data storage unit 32, to the external terminal device. When the ciphertext is received from the first terminal device 1, the receiving module 31 of the external terminal device can store the ciphertext in the corresponding third data storage unit 32.

Furthermore, the first terminal device 1 can be configured to further not include the receiving module 31 and the third data storage unit 32. For example, the external terminal device can be configured to further include the receiving module 31 and to receive ciphertexts from the secret calculation device 4. In the case in which the first terminal device 1 does not include the key generation processing module 11 and in which the first encryption key is received from the external terminal device, the first terminal device 1 can include the receiving module 31. Moreover, in the case in which the first terminal device 1 does not include the input module 21 or the encryption processing module 23 and in which data or ciphertexts are received from the external terminal device, the first terminal device 1 can include the receiving module 31.

The first terminal device 1 can include the decryption key storage unit 13, the receiving module 31, the third data storage unit 32, the decryption processing module 33, the fourth data storage unit 34, and the output module 35. In that case, for example, the receiving module 31 of the first terminal device 1 can receive the first decryption key from an external terminal device that includes the key generation processing module 11, and can store the first decryption key in the decryption key storage unit 13.

Exemplary Hardware Configuration

Given below is the explanation of an exemplary hardware configuration of the first terminal device 1 and the secret calculation device 4 according to the first embodiment.

Figure 5:
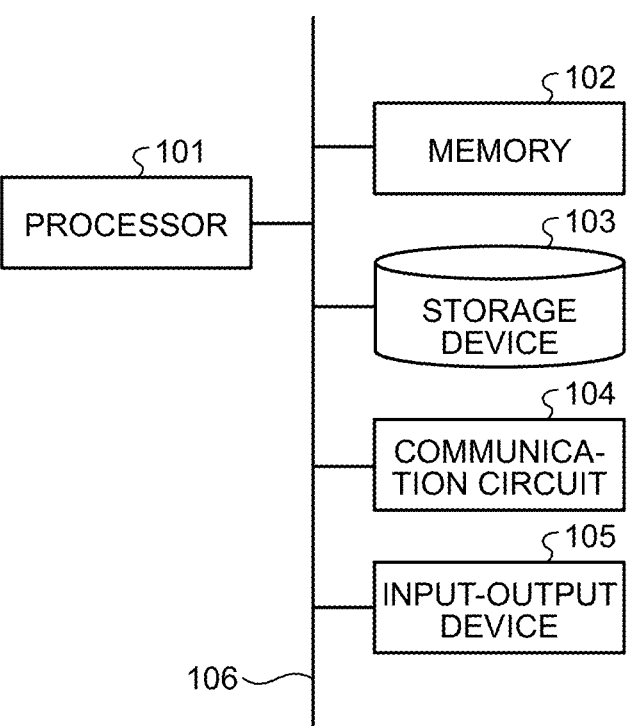
FIG. 5 is a schematic diagram illustrating a hardware configuration.

FIG. 5 is a schematic diagram illustrating an exemplary hardware configuration of the first terminal device 1 and the secret calculation device 4 according to the first embodiment.

The first terminal device 1 as well as the secret calculation device 4 is a computer that includes a processor 101, a memory 102, a storage device 103, a communication circuit 104, and an input-output device 105. Moreover, those constituent elements are connected to each other by a bus 106.

The processor 101 is configured using, for example, a central processing unit (CPU). The processor 101 operates according to a computer program that is stored in the storage device 103 and that controls the secret calculation system 100 for performing various operations explained earlier. According to the processing details of the computer program, the processor 101 controls the memory 102, the storage device 103, the communication circuit 104, and the input-output device 105; and causes them to perform predetermined operations.

The computer program and the data generated during the execution of the computer program are temporarily stored in the memory 102. The memory 102 is configured using, for example, a random access memory (RAM) and a read only memory (ROM). The RAM serves as, for example, the work memory used during the execution of the computer program; and the ROM is used to store, for example, the computer program in advance. The data generated during the execution of the computer program can alternatively be stored in the storage device 103. The storage device 103 is configured using, for example, a hard disk drive (HDD) or a solid state drive (SSD). According to the execution of the computer program as controlled by the processor 101, sometimes the data is stored in the storage device 103 via the input-output device 105, and sometimes the data stored in the storage device 103 is output. Moreover, according to the execution of the computer program, sometimes the data is sent to a network to which the computer is connected via the communication circuit 104.

In the first terminal device 1 as well as the secret calculation device 4, the CPU reads the computer program, which is meant for performing the operations explained earlier, from the ROM into the RAM and executes it. As a result, the constituent elements explained earlier are implemented in the computer.

Herein, the computer program can be stored in advance in the ROM. Alternatively, the computer program can be stored as an installable file or an executable file in a computer-readable memory medium such as a compact disc read only memory (CD-ROM), a compact disc recordable (CD-R), a memory card, a digital versatile disc (DVD), or a flexible disk (FD); and can be provided as a computer program product. Still alternatively, the computer program can be stored in a downloadable manner in a computer connected to a network such as the Internet. Still alternatively, the computer program can be distributed via a network such as the Internet.

First Modification Example of First Embodiment

In a first modification example, the explanation is given about an example in which the first homomorphic encryption method is a homomorphic encryption method in which Module-LWE is adapted, and the second homomorphic encryption method is a homomorphic encryption method in which LWE is adapted.

Moreover, in the first modification example, in an identical manner to the first embodiment, the explanation is given about an example in which the input data contains two polynomials and the coefficients of those polynomials represent vector elements. Furthermore, in the first modification example, in an identical manner to the first embodiment, the explanation is given about an example in which the first secret calculation operation includes calculating the inner product of two vectors, and the second secret calculation operation includes calculating the square of the inner product result.

FIG. 1 is a schematic diagram illustrating an example of a secret calculation system 100B according to the first modification example.

The secret calculation system 100B includes a first terminal device 1B and a secret calculation device 4B. The first terminal device 1B and the secret calculation device 4B are communicably connected to each other via the network 5.

Explanation about Details of Secret Calculation Operations

Firstly, the explanation is given about the details of secret calculation operations including the first secret calculation operation and the second secret calculation operation according to the first modification example.

In the secret calculation device 4B according to the first modification example, in an identical manner to the secret calculation device 4 according to the first embodiment described above, the following is performed as the first secret calculation operation: the inner product of the first vector $u=(u_0, u_1, \ldots, u_{l-1})$ having the length "l" and the second vector $v=(v_0, v_1, \ldots, v_{l-1})$ having the length "l" is calculated, and the first scalar value $s1=<u, v>$ is output. Moreover, in the secret calculation device 4B according to the first modification example, in an identical manner to the secret calculation device 4 according to the first embodiment described above, as the second secret calculation operation, the square of the first scalar value s1 is calculated and a second scalar value $s2 (=s12)$ is output. Furthermore, in the secret calculation device 4B according to the first modification example, in an identical manner to the secret calculation device 4 according to the first embodiment described above, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4B according to the first modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4B according to the first modification example, the first homomorphic encryption method is a homomorphic encryption method in which Module-LWE is adapted. Herein, Module-LWE represents a homomorphic encryption method obtained as a result of generalizing a homomorphic encryption method in which Ring-LWE is adapted. Moreover, in the secret calculation device 4B, the second homomorphic encryption method is a homomorphic encryption method in which LWE is adapted. Furthermore, in the secret calculation device 4B, as the ciphertext conversion method, a ciphertext conversion method is implemented that is defined between a second ciphertext encrypted by the first homomorphic encryption method in which Module-LWE is adapted, and a third ciphertext encrypted by the second homomorphic encryption method in which LWE is adapted.

The homomorphic encryption method in which Module-LWE is adapted, the parameter "n" is included that represents the dimensionality of the polynomial ring, and a parameter k is included that represents the dimensionality of the vectors. When k=1 holds true, the homomorphic encryption method can be used as a homomorphic encryption method in which Ring-LWE is adapted. When n=1 holds true, the homomorphic encryption method can be used as a homomorphic encryption method in which LWE is adapted. In the first modification example, a homomorphic encryption method in which Module-LWE is adapted and n+1 holds true is implemented as the first homomorphic encryption method.

In the homomorphic encryption method in which Module-LWE is adapted, encryption can be performed with the $(n-1)$-order polynomial "m" serving as the plaintext. A secret key $sk_{MLWE}$ is provided as a set of k number of $(n-1)$-order polynomials indicating $sk_{MLWE}=(sk_0, sk_1, \ldots, sk_{k-1})$; and a public key $pk_{MLWE}$ is provided as a set of kL1 number of $(n-1)$-order polynomials. A ciphertext having the polynomial "m" as the plaintext is provided as a set (b, a) of a single $(n-1)$-order polynomial b and k number $(n-1)$-order polynomials $a=(a_0, a_1, \ldots, a_{k-1})$; and the relationship $m=<a, sk_{MLWE}>+b$ holds true.

In the homomorphic encryption in which Module-LWE is adapted, homomorphic multiplication and homomorphic addition related to $(n-1)$-order polynomials can be used at least once. Regarding the homomorphic encryption method in which Module-LWE is adapted and n+1 holds true, in an identical manner to the homomorphic encryption method in which Ring-LWE is adapted, if the method explained in "Masaya Yasuda et al. "New packing method in somewhat homomorphic encryption and its applications", Security and Communication Networks 8.13 (2015): 2194-2213" is implemented, homomorphic multiplication can be used as the homomorphic inner product computation.

The encryption conversion, which is defined between the homomorphic encryption method in which Ring-LWE is adapted as disclosed in "Hao Chen et al. "Efficient homomorphic conversion between (ring) LWE ciphertexts", International Conference on Applied Cryptography and Network Security. Cham: Springer International Publishing, 2021" and a homomorphic encryption method in which LWE is adapted, is expanded. In that case, regarding the $(n-1)$-order polynomial $m=m_0+m_1x+ \ldots +m_{n-1}x^{n-1}$ encrypted by a homomorphic encryption method in which Module-LWE is adapted and n+1 holds true, a ciphertext $(b, a_0, a_1, \ldots, a_{k-1})$ can be converted, without decrypting it, into the ciphertext of the constant term $m_0$ encrypted by a homomorphic encryption method in which LWE is adapted and vector dimensionality d=nk holds true. Herein, $a_i=a_{i,0}+a_{i,1}x+ \ldots +a_{i,n-1}x_{n-1}$ holds true. Regarding the constant term $m_0$ encrypted by a homomorphic encryption method in which LWE is adapted and the vector dimensionality d=nk holds true, the ciphertext can be calculate according to ciphertext conversion $Extract_{MLWEtoLWE}$ given below in Equation (3).

$$Enc_{LWE}(m_0) = \text{Extract}_{MLWEtoLWE} = (b_0, a_{0,0}, -a_{0,n-1}, \ldots, -a_{0,1}, a_{1,0}, \quad (3)$$

$$-a_{1,n-1}, \ldots, -a_{1,1}, \ldots, a_{k-1,0}, -a_{k-1,n-1}, \ldots, -a_{k-1,1})$$

If $sk_{MLWE}=(sk_0, sk_1, \ldots, sk_{k-1})$ represents the secret key to be used in the homomorphic encryption method in which Module-LWE is adapted and n+1 holds true, the ciphertext given above in Equation (3) is decryptable. When $sk_i= sk_{i,0}+sk_{i,1}x+\ldots+sk_{i,n-1}x^{n-1}$ holds true, the secret key $sk_{LWE}$ used in the homomorphic encryption method in which LWE is adapted and the vector dimensionality d=nk holds true becomes equal to $sk_{LWE}=(sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$. At that time, the secret key $sk_{LWE}$ is a vector which has the length nk and in which the coefficients of the (n−1)-order polynomials $sk_0, sk_1, \ldots, sk_{k-1}$ of the secret key $sk_{MLWE}$ are treated as elements in order from the zero-order coefficients.

Meanwhile, the first homomorphic encryption method and the second homomorphic encryption method are only exemplary. Thus, alternatively, as the first homomorphic encryption method, it is possible to use a homomorphic encryption method in which a polynomial plaintext can be encrypted and homomorphic computation related to polynomial multiplication and polynomial addition can be defined. Herein, in the polynomials, the coefficients represent vector elements. Moreover, as the second homomorphic encryption method, it is possible to use a homomorphic encryption method in which scalar values can be encrypted, homomorphic multiplication and homomorphic addition can be performed, and ciphertext conversion can be defined with the first homomorphic encryption method.

Explanation about Secret Calculation Method

In the secret calculation system 100B according to the first modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1B, the secret key $sk_{MLWE}$ and the public key $pk_{MLWE}$ are generated for use in the first homomorphic encryption method. Moreover, in the first terminal device 1B, the secret key to be used in the first homomorphic encryption method is set to $sk_{MLWE}=(sk_0, sk_1, \ldots, sk_{k-1})$. When $sk_i=sk_{i,0}+sk_{i,1}x+\ldots+sk_{i,n-1}x^{n-1}$ holds true, the secret key to be used in the second homomorphic encryption method becomes equal to $sk_{LWE}=(sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$. In the first terminal device 1B, the public key $pk_{MLWE}$ to be used in the first homomorphic encryption method is treated as the first encryption key, and the secret key $sk_{LWE}$ to be used in the second homomorphic encryption method is treated as the first decryption key. Alternatively, the secret key $sk_{MLWE}$ that is to be used in the first homomorphic encryption method can be used as the first encryption key.

In the first terminal device 1B, the input data containing the first vector $u=(u_0, u_1, \ldots, u_{l-1})$ and the second vector $v=(v_0, v_1, \ldots, v_{l-1})$, which have the length "l", is converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1B, the abovementioned polynomials are encrypted using the first encryption key $pk_{MLWE}$, and the two first ciphertexts $ct_u$ and $ct_v$ are generated.

In the secret calculation device 4B, the first ciphertexts $ct_u$ and $ct_v$ are subjected to the first secret calculation operation in which the homomorphic multiplication $\text{EvalMult}_{MLWE}$ is performed, and the polynomial second ciphertext $ct_{s1+}= \text{EvalMult}_{MLWE}(ct_u, ct_v)$ is calculated in which the first scalar value s1=<u, v> encrypted by the first homomorphic encryption method, represents the constant term.

Subsequently, in the secret calculation device 4B, the ciphertext conversion $\text{Extract}_{MLWEtoLWE}$ is used and, without decrypting the second ciphertext $ct_{s1+}$, the second ciphertext $ct_{s1+}$ is converted into the third ciphertext $ct_{s1}=\text{Extract}_{MLWEtoLWE}(ct_{s1+})$ of the first scalar value s1 encrypted by the second homomorphic encryption method.

Moreover, in the secret calculation device 4B, the third ciphertext $ct_{s1}$ is subjected to the second secret calculation operation using the homomorphic multiplication $\text{EvalMult}_{LWE}$, and the fourth ciphertext $ct_{s2}$ (=$\text{EvalMult}_{LWE}(ct_{s1}, ct_{s1})$) of the second scalar value s2 (=s12) is calculated.

In the first terminal device 1B, the fourth ciphertext $ct_{s2}$ of the second scalar value s2 is decrypted using the first decryption key $sk_{LWE}$ and the second scalar value s2 is calculated.

Explanation about System Configuration/Functions

Given below is the specific explanation about the secret calculation system 100B according to the first modification example.

FIG. 2 is a functional block diagram illustrating an example of the first terminal device 1B according to the first modification example. The first terminal device 1B includes a key generation processing module 11B in place of the key generation processing module 11, and includes an encryption processing module 23B in place of the encryption processing module 23. Other than that, the first terminal device 1B is identical to the first terminal device 1 according to the first embodiment described earlier.

The key generation processing module 11B generates the public key $pk_{MLWE}$ and the secret key $sk_{MLWE}$ to be used in the first homomorphic key encryption key. The key generation processing module 11B sets the secret key $sk_{MLWE}$, which is to be used in the first homomorphic encryption method, to $sk_{MLWE}=(sk_0, sk_1, \ldots, sk_{k-1})$. When $sk_i= sk_{i,0}+sk_{i,1}x+\ldots+sk_{i,n-1}x^{n-1}$ holds true, the secret key to be used in the second homomorphic encryption method becomes equal to $sk_{LWE}=(sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$.

The key generation processing module 11B uses the public key $pk_{MLWE}$, which is to be used in the first homomorphic encryption method, as the first encryption key; and uses the secret key $sk_{LWE}$, which is to be used in the second homomorphic encryption method, as the first decryption key. Meanwhile, the secret key $sk_{MLWE}$ to be used in the first homomorphic encryption method can alternatively be used as the first encryption key.

The key generation processing module 11B stores the first encryption key in the encryption key storage unit 12, and stores the first decryption key in the decryption key storage unit 13.

The encryption processing module 23B converts the first vector "u" and the second vector "v", which are included in the input data stored in the first data storage unit 22, into the polynomials $fw(u)=u_0+u_1x+\ldots+u_{l-1}x^{l-1}$ and $bw(v)=v_0- v_1x^{n-1}-v_2x^{n-2}-\ldots-v_{l-1}x^{n-(l-1)}$, respectively, according to the first conversion function fw and the second conversion function bw, respectively. After performing the conversion, the encryption processing module 23B uses the first encryption key $pk_{MLWE}$, which is stored in the encryption key storage unit 12, and encrypts the polynomials; and calculates the second ciphertexts $ct_u$ and $ct_v$ that are obtained as a result of performing encryption according to the first homomorphic encryption method. Then, the encryption processing module 23 stores the second ciphertexts in the second data storage unit 24.

Meanwhile, the input module 21 of the first terminal device 1B can obtain the polynomials fw(u) and bw(v) from the computer connected to the first terminal device 1B, and store the polynomials in the first data storage unit 22. Moreover, the encryption processing module 23B calculates the first ciphertexts $ct_u$ and $ct_v$ that are obtained by encryption of the polynomials, which stored in the first data storage unit 22, using the first encryption key $pk_{MLWE}$ stored in the encryption key storage unit 12, and store the first ciphertexts in the second data storage unit 24.

FIG. 3 is a functional block diagram illustrating an example of the secret calculation device 4B according to the first modification example.

The secret calculation device 4B includes a first secret calculation processing module 43B and a ciphertext conversion processing module 45B in place of the first secret calculation processing module 43B and the ciphertext conversion processing module 45, respectively. Other than that, the secret calculation device 4B is identical to the secret calculation device 4 according to the first embodiment described earlier.

The first secret calculation processing module 43B performs the first secret calculation operation with respect to the first ciphertexts $ct_u$ and $ct_v$, which are stored in the first data storage unit 42, using the homomorphic multiplication $EvalMult_{MLWE}$ functioning as the homomorphic inner product computation based on the first homomorphic encryption method, and calculates the polynomial second ciphertext $ct_{s1+}$ having the first scalar value s1 as the constant term. Then, the first secret calculation processing module 43B stores the second ciphertext in the second data storage unit 44.

The ciphertext conversion processing module 45B uses the ciphertext conversion $Extract_{MLWEtoLWE}$ and, without decrypting the second ciphertext $ct_{s1+}$ that is stored in the second data storage unit 44, converts the second ciphertext $ct_{s1+}$ into the third ciphertext $ct_{s1}$ of the first scalar value s1; and then stores the third ciphertext in the third data storage unit 46.

Meanwhile, the first terminal device 1B and the secret calculation device 4B have an identical hardware configuration to the first terminal device 1 and the secret calculation device 4, respectively, according to the first embodiment described earlier (see FIG. 5).

Explanation about Flow

Given below is the explanation of an exemplary flow of information processing performed in the first terminal device 1B and the secret calculation device 4B according to the first modification example.

FIG. 4 is a flowchart illustrating an exemplary flow of information processing performed in the first terminal device 1B and the secret calculation device 4B according to the first modification example. In the first modification example, the operations from Step S1 to Step S12 are performed in an identical manner to the operations performed in the first terminal device 1 and the secret calculation device 4 according to the first embodiment described earlier.

In the first modification example, at Step S1, the key generation processing module 11B of the first terminal device 1B generates the public key $pk_{MLWE}$ and the secret key $sk_{MLWE}$ that are to be used in the first homomorphic encryption method. Then, from the secret key $sk_{MLWE}$ to be used in the first homomorphic encryption method, the key generation processing module 11B calculates the secret key $sk_{LWE}$ to be used in the second homomorphic encryption method. The key generation processing module 11B uses the public key $pk_{MLWE}$, which is to be used in the first homomorphic encryption method, as the first encryption key; and uses the secret key $sk_{LWE}$, which is to be used in the second homomorphic encryption method, as the first decryption key. Alternatively, the secret key $sk_{MLWE}$, which is to be used in the first homomorphic encryption method, can be used as the first encryption key. The key generation processing module 11B stores the first encryption key in the encryption key storage unit 12 and stores the first decryption key in the decryption key storage unit 13.

Meanwhile, at Step S3, the encryption processing module 23B of the first terminal device 1B converts the input data containing the first vector "u" and the second vector "v", which are stored in the first data storage unit 22, into the polynomials $fw(u) = u_0 + u_1 x + \ldots + u_{l-1} x^{l-1}$ and $bw(v) = v_0 - v_1 x^{n-1} - v_2 x^{n-2} - \ldots - v_{l-1} x^{n-(l-1)}$, respectively, according to the first conversion function fw and the second conversion function bw, respectively. Then, the encryption processing module 23B encrypts the polynomials using the first encryption key $pk_{MLWE}$ stored in the encryption key storage unit 12, and the first ciphertexts $ct_u$ and $ct_v$ obtained by encryption by the first homomorphic encryption method. Then, the encryption processing module 23B stores the first ciphertext in the second data storage unit 24.

At Step S6, the first secret calculation processing module 43B of the secret calculation device 4B performs secret calculation regarding the first ciphertexts $ct_u$ and $ct_v$, which are stored in the first data storage unit 42, according to the first secret calculation operation in which the homomorphic multiplication $EvalMult_{MLWE}$ is performed. As a result of performing the secret calculation, the first secret calculation processing module 43B calculates the polynomial second ciphertext $ct_{s1+}$ that has the first scalar value s1 as the constant term and that is obtained by encryption using the first homomorphic encryption method. The first secret calculation processing module 43B stores the second ciphertext in the second data storage unit 44.

At Step S7, without decrypting the second ciphertext $ct_{s1+}$ that is stored in the second data storage unit 44, the ciphertext conversion processing module 45B of the secret calculation device 4B converts the second ciphertext $ct_{s1+}$ into the third ciphertext $ct_{s1}$ of the first scalar value s1, which is obtained by encryption according to the second homomorphic encryption method, using the ciphertext conversion $Extract_{MLWEtoLWE}$. Then, the ciphertext conversion processing module 45B stores the third ciphertext in the third data storage unit 46.

As explained above, in an identical manner to the ciphertext conversion processing module 45 according to the first embodiment described above, the ciphertext conversion processing module 45B according to the first modification example implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4B and the secret calculation system 100B according to the first modification example, even when Module-LWE is adapted as the first homomorphic encryption method and when LWE is adapted as the second homomorphic encryption method, it becomes possible to achieve enhancement in the secret in an identical manner to the first embodiment described earlier. Moreover, in the secret calculation device 4B and the secret calculation system 100B according to the first modification example, as the first homomorphic encryption method, a homomorphic encryption method in which Module-LWE is adapted can be implemented that has a higher level of security as compared to a homomorphic encryption method in which Ring-LWE is adapted.

Meanwhile, with reference to FIG. 2, the explanation is given about the example in which the first terminal device 1 includes the key generation processing module 11, the encryption key storage unit 12, the decryption key storage unit 13, the input module 21, the first data storage unit 22, the encryption processing module 23, the second data storage unit 24, the sending module 25, the receiving module 31, the third data storage unit 32, the decryption processing module 33, the fourth data storage unit 34, and the output module 35. Alternatively, the first terminal device 1 can be configured to include only some of those constituent elements. For example, the first terminal device 1 can be configured to include at least either the key generation processing module 11, or the encryption processing module 23, or the decryption processing module 33.

Second Modification Example of First Embodiment

In a second modification example, the explanation is given about an example in which the first homomorphic encryption method is a homomorphic encryption method in which Ring-LWE is adapted, and the second homomorphic encryption method is a homomorphic encryption method in which LWE not dependent on the ring dimensionality of Ring-LWE is adapted.

In the second modification example, in an identical manner to the first modification example described above, the explanation is given about the example in which the input data contains two polynomials and the coefficients of those polynomials represent vector elements. Moreover, in the second modification example, in an identical manner to the first modification example described above, the explanation is given about the example in which the first secret calculation operation includes calculating the inner product of two vectors, and the second secret calculation operation includes calculating the square of the inner product result. Furthermore, in the second modification example, a ciphertext conversion method is implemented that is defined between a second ciphertext encrypted by the first homomorphic encryption method in which Ring-LWE is adapted, and a third ciphertext encrypted by the second homomorphic encryption method in which LWE not dependent on the ring dimensionality of the first homomorphic encryption method is adapted.

FIG. 1 is a schematic diagram illustrating an example of a secret calculation system 100C according to the second modification example.

The secret calculation system 100C includes a first terminal device 1C and a secret calculation device 4C. The first terminal device 1C and the secret calculation device 4C are communicably connected to each other via the network 5.

Explanation about Details of Secret Calculation Operations

Firstly, the explanation is given about the details of secret calculation operations including the first secret calculation operation and the second secret calculation operation according to the second modification example.

In the secret calculation device 4C according to the second modification example, in an identical manner to the secret calculation device 4 according to the first embodiment described earlier, the following is performed as the first secret calculation operation: the inner product of the first vector $u=(u_0, u_1, \ldots, u_{l-1})$ having the length "l" and the second vector $v=(v_0, v_1, \ldots, v_{l-1})$ having the length "l" is calculated, and the first scalar value $s1=<u, v>$ is output. Moreover, in the secret calculation device 4C according to the second modification example, in an identical manner to the secret calculation device 4 according to the first embodiment described earlier, as the second secret calculation operation, the square of the first scalar value s1 is calculated and a second scalar value $s2 (=s1^2)$ is output. Furthermore, in the secret calculation device 4C according to the second modification example, in an identical manner to the secret calculation device 4 according to the first embodiment described earlier, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4C according to the second modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4C according to the second modification example, the first homomorphic encryption method is a homomorphic encryption method in which Ring-LWE having the ring dimensionality equal to "n" is adapted. Moreover, in the secret calculation device 4C, the second homomorphic encryption method is a homomorphic encryption method in which LWE having the vector dimensionality equal to d' ($\neq$n) is adapted. Furthermore, in the secret calculation device 4C, a ciphertext conversion method is implemented that is defined between a homomorphic encryption method in which Ring-LWE having the ring dimensionality equal to "n" is adapted and a homomorphic encryption method in which LWE having the vector dimensionality equal to d' is adapted.

The ciphertext conversion method according to the second modification example can configured by combining the following: the ciphertext conversion Extract RLWEtoLWE between a homomorphic encryption method in which Ring-LWE having the ring dimensionality equal to "n" is adapted and a homomorphic encryption method in which LWE having the vector dimensionality "n" is adapted; and the ciphertext conversion between a homomorphic encryption method in which LWE having the vector dimensionality "d" is adapted and a homomorphic encryption method in which LWE having the vector dimensionality equal to d' is adapted. The following explanation is given about the ciphertext conversion method defined between a homomorphic encryption method in which LWE having the vector dimensionality "d" is adapted and a homomorphic encryption method in which LWE having the vector dimensionality equal to d' is adapted.

In the homomorphic encryption method in which LWE having the vector dimensionality "d" is adapted, $sk_{LWE}$ represents the secret key to be used. In the homomorphic encryption method in which LWE having the vector dimensionality equal to d' is adapted, $sk_{LWE'}$ represents the secret key to be used and $pk_{LWE'}$ represents the public key to be used. Moreover, as the conversion key to be used in ciphertext conversion, a ciphertext $ksk_{LWEtoLWE'}=Enc_{LWE'}(sk_{LWE})$ is treated as the conversion key that is obtained by encryption the secret key $sk_{LWE}$, which is used in the homomorphic encryption method in which LWE having the vector dimensionality "d" is adapted, using the secret key $sk_{LWE'}$, Which is used in the homomorphic encryption method in which LWE having the vector dimensionality equal to d' is adapted. Herein, since the conversion key is a ciphertext, it can also be made public.

It is known that the ciphertext of a scalar value $m_0$ encrypted by the homomorphic encryption method in which LWE having the vector dimensionality "d" is adapted, can be converted, without decrypting it, into the ciphertext of the scalar value $m_0$ encrypted by the homomorphic encryption method in which LWE having the vector dimensionality equal to d' is adapted. More particularly, $Enc_{LWE}(m_0)=(b, a)$ represents the ciphertext of the scalar value $m_0$, wherein $a=(a_0, a_1, \ldots, a_{d-1})$ holds true. In that case, the ciphertext of the scalar value $m_0$ encrypted by the homomorphic encryption method in which LWE having the vector dimensionality equal to d' is adapted, can be calculated according to ciphertext conversion $Convert_{LWEtoLWE'}$ given below in Equation (4).

$$Enc_{LWE'}(m_0)=Convert_{LWEtoLWE'}(Enc_{LWE}(m_0))=Enc_{LWE'}(b)+<a,ksk_{LWEtoLWE'}> \quad (4)$$

Meanwhile, $Enc_{LWE'}(b)$ can be set as a trivial ciphertext $Enc_{LWE'}(b)=(b, 0, 0, \ldots, 0)$. Moreover, although not explained in the second modification example, it is also possible to implement a conversion method in which gadget decomposition is used.

In Equation (4), $Enc_{LWE'}(b)$ represents the ciphertext of "b" as obtained by performing encryption using the public key $pk_{LWE'}$ that is used in the homomorphic encryption method in which LWE having the vector dimensionality equal to d' is adapted.

Herein, $Enc_{RLWE}(m)=(b, a_0)$ represents the ciphertext of the polynomial "m" encrypted by the homomorphic encryption method in which Ring-LWE having the ring dimensionality equal to "n" is adapted. Moreover, $a0=a_{0,\ 0}+a_{0,\ 1}x+\ldots+a_{0,\ n-1}x^{n-1}$ holds true. In that case, the ciphertext of the constant term $m_0$ of the polynomial m, which has been obtained as a result of performing encryption according to a homomorphic encryption method in which LWE is adapted with the vector dimensionality equal to d', can be calculated using ciphertext conversion given below in Equation (5).

$$Enc_{LWE'}(m_0)=Convert_{LWEtoLWE'}(Extract_{RLWEtoLWE}(Enc_{RLWE}(m))) \quad (5)$$

Explanation about Secret Calculation Method

In the secret calculation system 100C according to the second modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1C, the secret key $sk_{RLWE}$ and the public key $pK_{RLWE}$ are generated for use in the first homomorphic encryption method. Moreover, in the first terminal device 1C, the secret key $sk_{LWE'}$ and the public key $pk_{LWE'}$ are generated for use in the second homomorphic encryption method. Furthermore, when the secret key to be used in the first homomorphic encryption method is set to $sk_{RLWE}=sk_0+sk_1x+\ldots+sk_{n-1}x^{n-1}$, the conversion key $ksk_{LWEtoLWE'}$ is treated as a ciphertext $ksk_{LWEtoLWE'}=Enc_{LWE'}(sk_{LWE})$ of the secret key $sk_{LWE}=(sk_0, sk_1, \ldots, sk_{n-1})$ encrypted by the second homomorphic encryption method. The public key $pk_{RLWE}$ to be used in the first homomorphic encryption method is treated as a first encryption key, and the secret key $sk_{LWE'}$ to be used in the second homomorphic encryption method is treated as a first decryption key. Alternatively, the secret key $sk_{RLWE}$ that is to be used in the first homomorphic encryption method can be used as the first encryption key. Moreover, the public key $pk_{LWE'}$ to be used in the second homomorphic encryption method is treated as a second encryption key.

In the first terminal device 1C, the input data containing the first vector $u=(u_0, u_1, \ldots, u_{l-1})$ and the second vector $v=(v_0, v_1, \ldots, v_{l-1})$, which have the length "l", is converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1C, the above-mentioned polynomials are encrypted using the first encryption key $pk_{RLWE}$, and the two first ciphertexts $ct_u$ and $ct_v$ are calculated.

In the secret calculation device 4C, the first ciphertexts $ct_u$ and $ct_v$ are subjected to the first secret calculation operation in which the homomorphic multiplication $EvalMult_{RLWE}$ is performed, and a polynomial second ciphertext $ct_{s1+}=EvalMult_{RLWE}(ct_u, ct_v)$ is calculated in which the first scalar value $s1=<u, v>$ represents the constant term.

Subsequently, in the secret calculation device 4C, the ciphertext conversion Extract RLWEtoLWE, the ciphertext conversion $Convert_{LWEtoLWE'}$, the conversion key $ksk_{LWEtoLWE'}$, and the second encryption key $pk_{LWE'}$ are used and, without decrypting the second ciphertext $ct_{s1+}$, the second ciphertext $ct_{s1+}$ is converted into a third ciphertext $ct_{s1}=Convert_{LWEtoLWE'}(Extract_{RLWEtoLWE}(ct_{s1+}))$ of the first scalar value s1.

Moreover, in the secret calculation device 4C, the third ciphertext $ct_{s1}$ is subjected to the second secret calculation operation using the homomorphic multiplication $EvalMult_{LWE'}$, and the fourth ciphertext $ct_{s2}$ $(=EvalMult_{LWE'}(ct_{s1}, ct_{s1}))$ of the second scalar value s2 $(=s1^2)$ is calculated. Herein, the homomorphic multiplication $EvalMult_{LWE'}$ represents homomorphic multiplication usable in the second homomorphic encryption method.

In the first terminal device 1C, the fourth ciphertext $ct_{s2}$ of the second scalar value s2 is decrypted using the first decryption key $sk_{LWE'}$ and the second scalar value s2 is calculated.

Explanation about System Configuration/Functions

Given below is the specific explanation about the secret calculation system 100C according to the second modification example.

FIG. 6 is a functional block diagram illustrating an example of the first terminal device 1C according to the second modification example. The first terminal device 1C includes a key generation processing module 11C, a sending module 25C, and a decryption processing module 33C in place of the key generation processing module 11, the sending module 25, and the decryption processing module 33. Moreover, the first terminal device 1C further includes a conversion key storage unit 14. Other than that, the first terminal device 1C is identical to the first terminal device 1 according to the first embodiment described earlier.

The key generation processing module 11C generates the public key $pK_{RLWE}$ and the secret key $sk_{RLWE}$ to be used in the first homomorphic key encryption key. Moreover, the key generation processing module 11C generates the public key $pk_{LWE'}$ and the secret key $sk_{LWE'}$ to be used in the second homomorphic key encryption key. When $sk_{RLWE}=sk_0+sk_1x+\ldots+sk_{n-1}x^{n-1}$ represents the secret key to be used in the first homomorphic encryption method, the conversion key $ksk_{LWEtoLWE'}$ is set to the ciphertext $ksk_{LWEtoLWE'}=Enc_{LWE'}(sk_{LWE})$ of the secret key $sk_{LWE}$ encrypted by the second homomorphic encryption method. The key generation processing module 11C treats the public key $pK_{RLWE}$ as the first encryption key and treats the secret key $sk_{LWE'}$ as the first decryption key. Alternatively, the secret key $sk_{RLWE}$ that is to be used in the first homomorphic encryption method can be used as the first encryption key. Moreover, the key generation processing module 11C generates the public key $pk_{LWE'}$, which is to be used in the second homomorphic key encryption key, as the second encryption key.

Then, the key generation processing module 11C stores the first encryption key and the second encryption key in the encryption key storage unit 12; stores the first decryption key in the decryption key storage unit 13; and stores the conversion key in the conversion key storage unit 14.

The sending module 25C sends the second encryption key $pk_{LWE'}$, which is stored in the encryption key storage unit 12, and the conversion key $ksk_{LWEtoLWE'}$, which is stored in the conversion key storage unit 14, to the secret calculation device 4C.

The decryption processing module 33C decrypts the fourth ciphertext, which is stored in the third data storage unit 32, using the first decryption key $sk_{LWE'}$ that is stored in the decryption key storage unit 13, and calculates the second scalar value s2. Then, the decryption processing module 33C stores the second scalar value in the fourth data storage unit 34.

Figure 7:
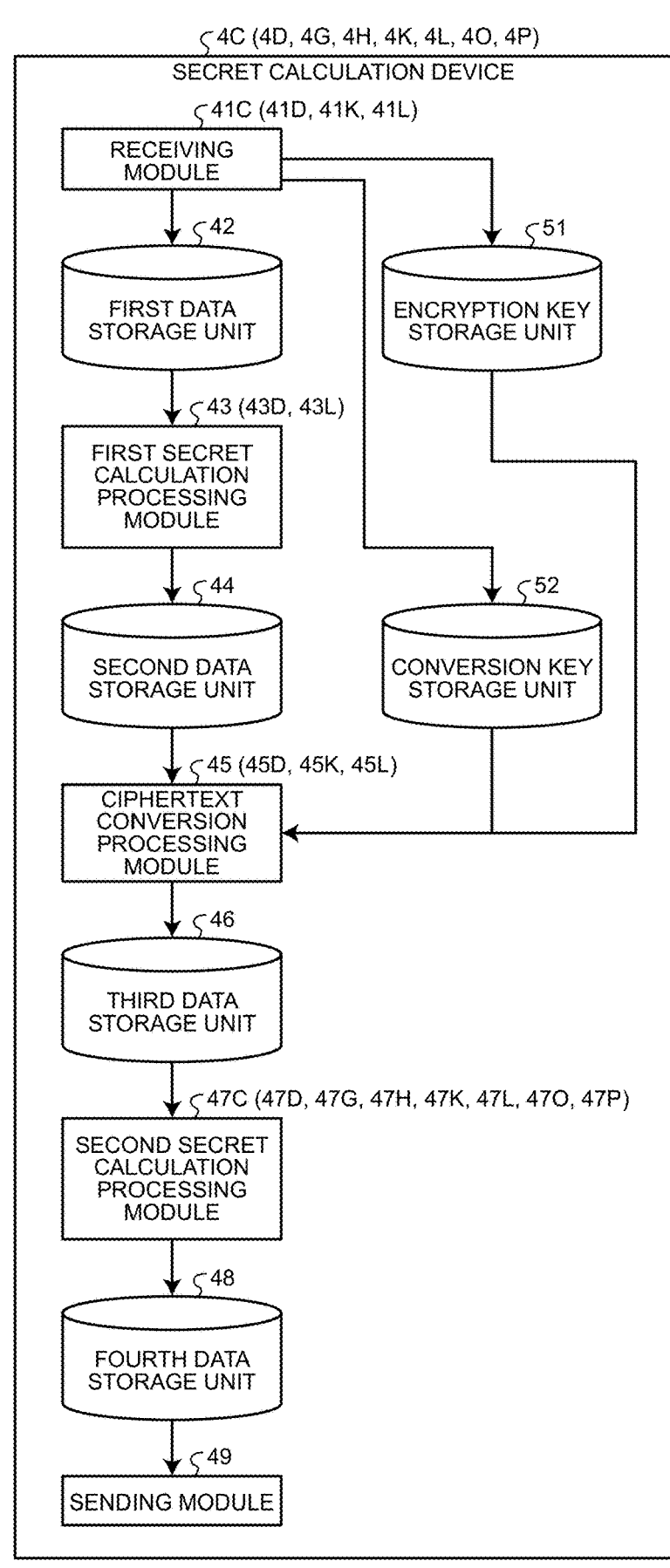
FIG. 7 is a functional block diagram illustrating a secret calculation device.

FIG. 7 is a functional block diagram illustrating an example of the secret calculation device 4C according to the second modification example.

The secret calculation device 4C includes a receiving module 41C, a ciphertext conversion processing module 45C, and a second secret calculation processing module 47C in place of the receiving module 41, the ciphertext conversion processing module 45, and the second secret calculation processing module 47. Moreover, the secret calculation device 4C further includes an encryption key storage unit 51 and a conversion key storage unit 52. Other than that, the secret calculation device 4C is identical to the secret calculation device 4 according to the first embodiment described earlier.

The receiving module 41C receives the second encryption key $pk_{LWE'}$ and the conversion key $sk_{LWEtoLWE'}$ from the first terminal device 1C; stores the second encryption key in the encryption key storage unit 51; and stores the conversion key in the conversion key storage unit 52.

The ciphertext conversion processing module 45C uses the ciphertext conversion $Extract_{RLWEtoLWE}$ and $Convert_{LWEtoLWE'}$ and, without decrypting the second ciphertext $ct_{s1+}$ that is stored in the second data storage unit 44, converts the second ciphertext $ct_{s1+}$ into the third ciphertext $ct_{s1}$ of the first scalar value s1 as obtained as a result of performing encryption according to the second homomorphic encryption method. Then, the ciphertext conversion processing module 45C performs ciphertext conversion using the second encryption key $pk_{LWE'}$, which is stored in the encryption key storage unit 51, and the conversion key $ksk_{LWEtoLWE'}$, which is stored in the conversion key storage unit 52. That is, without decrypting the second ciphertext, the ciphertext conversion processing module 45C converts the second ciphertext into a third ciphertext using the encryption key according to the second homomorphic encryption key and using the conversion key used in the ciphertext conversion. Then, the ciphertext conversion processing module 45C stores the third ciphertext in the third data storage unit 46.

The second secret calculation processing module 47C performs the second secret calculation operation with respect to the third ciphertext $ct_{s1}$, which is stored in the third data storage unit 46, using the homomorphic multiplication $EvalMult_{LWE'}$, and calculates the fourth ciphertext $ct_{s2}$ of the second scalar value s2. Then, the second secret calculation processing module 47C stores the fourth ciphertext in the fourth data storage unit 48.

Meanwhile, the first terminal device 1C and the secret calculation device 4C have an identical hardware configuration to the first terminal device 1 and the secret calculation device 4, respectively, according to the first embodiment described earlier (see FIG. 5).

Explanation about Flow

Given below is the explanation of an exemplary flow of information processing performed in the first terminal device 1C and the secret calculation device 4C according to the second modification example.

Figure 8:
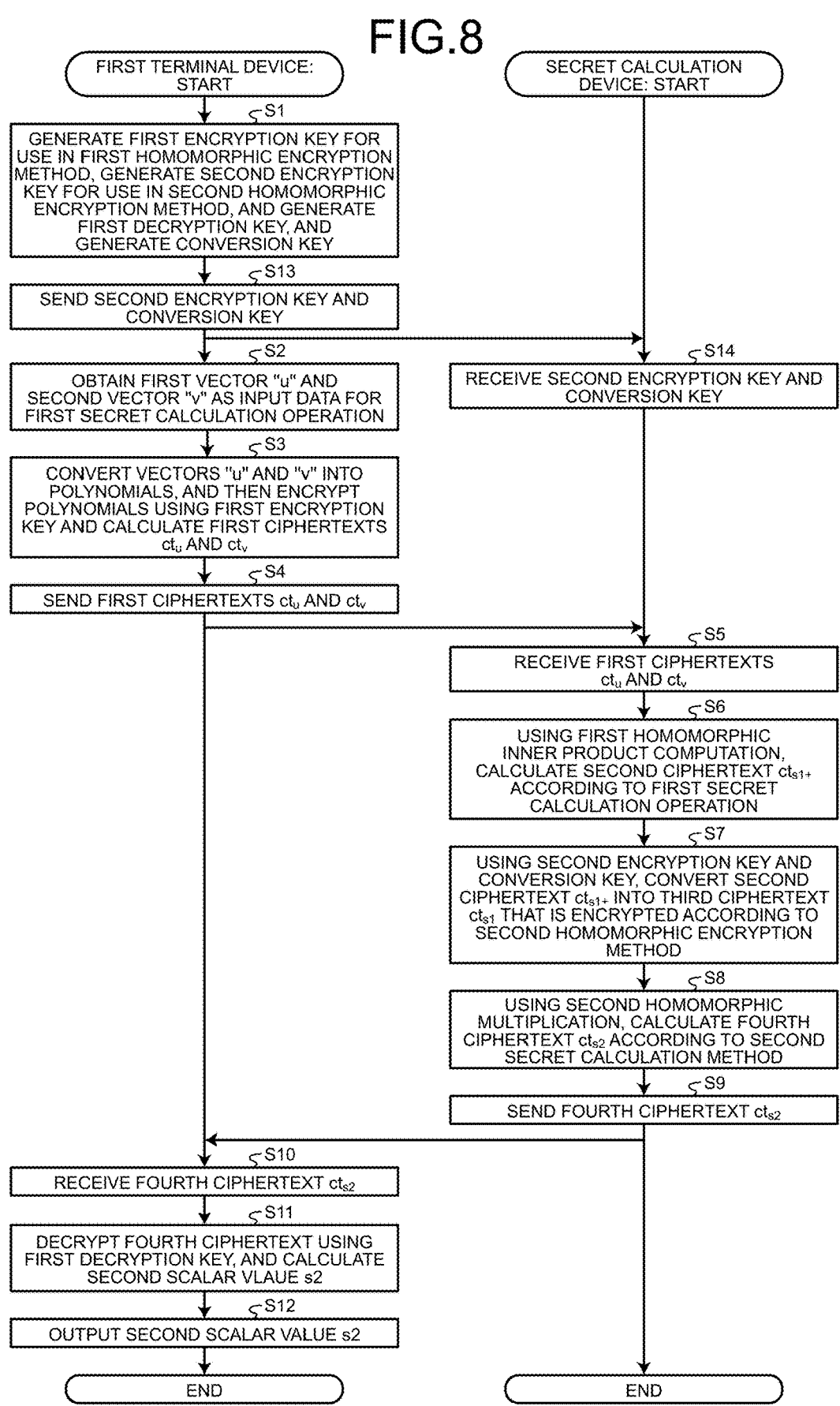
FIG. 8 is a flowchart for explaining an exemplary flow of information processing performed in the first terminal device and the secret calculation device.

FIG. 8 is a flowchart for explaining an exemplary flow of information processing performed in the first terminal device 1C and the secret calculation device 4C according to the second modification example. In the second modification example, the operations from Step S1 to Step S12 are performed in an identical manner to the operations performed in the first terminal device 1 and the secret calculation device 4 according to the first embodiment described earlier. Moreover, in the information processing performed in the first terminal device 1C and the secret calculation device 4C according to the second modification example, Step S13 is added in between Step S1 and Step S2, and Step S14 is added in between Step S2 and Step S3.

More specifically, in the second modification example, at Step S1, the key generation processing module 11C of the first terminal device 1C generates the public key $pk_{RLWE}$ and the secret key $sk_{RLWE}$ that are to be used in the first homomorphic encryption method. Moreover, the key generation processing module 11C generates the public key $pK_{LWE'}$ and the secret key $sk_{LWE'}$ that are to be used in the second homomorphic encryption method. When the secret key to be used in the first homomorphic encryption method is set to $sk_{RLWE}=sk_0+sk_1x+\ldots+sk_{n-1}x^{n-1}$, the conversion key $ksk_{LWEtoLWE'}$ is treated as the ciphertext $ksk_{LWEtoLWE'}=Enc_{LWE'}(sk_{LWE})$ of the secret key $sk_{LWE}=(sk_0, sk_1, \ldots, sk_{n-1})$ encrypted by the second homomorphic encryption method. The public key $pk_{RLWE}$ to be used in the first homomorphic encryption method is treated as the first encryption key, and the secret key $sk_{LWE'}$ to be used in the second homomorphic encryption method is treated as the first decryption key. Alternatively, the secret key $sk_{RLWE}$ to be used in the first homomorphic encryption method in the first terminal device 1C can be used as the first encryption key. Moreover, the public key $pk_{LWE'}$ to be used in the second homomorphic encryption method in the secret calculation device 4C is treated as the second encryption key. Then, the key generation processing module 11C stores the first encryption key and the second encryption key in the encryption key storage unit 12; stores the first decryption key in the decryption key storage unit 13; and stores the conversion key in the conversion key storage unit 14.

Subsequently, the sending module 25C sends the second encryption key $pk_{LWE'}$, which is stored in the encryption key storage unit 12, and the conversion key $ksk_{LWEtoLWE'}$, which is stored in the conversion key storage unit 14, to the secret calculation device 4C (Step S13).

In the secret calculation device 4C, the receiving module 41C receives the second encryption key $pk_{LWE'}$ and the conversion key $sk_{LWEtoLWE'}$ from the first terminal device 1C; stores the second encryption key in the encryption key storage unit 51; and stores the conversion key in the conversion key storage unit 52 (Step S14).

Then, the operations from Step S3 to Step S12 are performed in an identical manner to the operations performed in first embodiment described above.

At Step S7, without decrypting the second ciphertext $ct_{s1+}$ that is stored in the second data storage unit 44, the ciphertext conversion processing module 45C of the secret calculation device 4C converts the second ciphertext $ct_{s1+}$ into the third ciphertext $ct_{s1}$ of the first scalar value s1, which is obtained by encryption according to the second homomorphic encryption method, using the ciphertext conversion $Extract_{RLWEtoLWE}$ and $Convert_{LWEtoLWE'}$. Then, the ciphertext conversion processing module 45C stores the third ciphertext in the third data storage unit 46. At the time of performing ciphertext conversion, the ciphertext conversion processing module 45C uses the second encryption key $pk_{LWE'}$, which is stored in the encryption key storage unit 51, and the conversion key $ksk_{LWEtoLWE'}$, which is stored in the conversion key storage unit 52.

At Step S8, the second secret calculation processing module 47C of the secret calculation device 4C performs the second secret calculation operation with respect to the third ciphertext $ct_{s1}$, which is stored in the third data storage unit 46, using the homomorphic multiplication $EvalMult_{LWE'}$ and calculates the fourth ciphertext $ct_{s2}$ of the second scalar value s2. Then, the second secret calculation processing module 47C stores the fourth ciphertext in the fourth data storage unit 48.

At Step S11, the decryption processing module 33C of the first terminal device 1C decrypts the fourth ciphertext, which is stored in the third data storage unit 32, using the first decryption key $sk_{LWE'}$ that is stored in the decryption key storage unit 13, and calculates the second scalar value s2. Then, the decryption processing module 33C stores the second scalar value in the fourth data storage unit 34.

As explained above, in the second modification example, in an identical manner to the ciphertext conversion processing module 45 according to the first embodiment described earlier, the ciphertext conversion processing module 45C of the secret calculation device 4C implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4C and the secret calculation system 100C according to the second modification example, even when Ring-LWE is adapted as the first homomorphic encryption method and LWE not dependent on the ring dimensionality of Ring-LWE is adapted as the second homomorphic encryption method, it becomes possible to achieve enhancement in the secret in an identical manner to the first embodiment described earlier.

Moreover, in the secret calculation device 4C and the secret calculation system 100C according to the second modification example, a homomorphic encryption method in which LWE not dependent on the ring dimensionality can be used as a homomorphic encryption method in which Ring-LWE is adapted. As a result, the parameters can be customized, and the processing performance of homomorphic computation can be improved further. In the secret calculation system 100C according to the second modification example, the ciphertext conversion becomes more complex as compared to the secret calculation system 100 according to the first embodiment described earlier. Hence, there is a possibility of a decline in the processing performance of the ciphertext conversion. For that reason, in the secret calculation system 100C according to the second modification example, it is believed to be a good option to use different ciphertext conversion depending on the processing details of the second secret calculation operation.

Meanwhile, the first terminal device 1C according to the second modification example can be configured to include only some of the constituent elements illustrated in FIG. 6. For example, a plurality of external terminal devices installed separately from the first terminal device 1C can be configured to include the constituent elements not included in the first terminal device 1C.

More specifically, the first terminal device 1C can be configured to include at least either the key generation processing module 11, or the encryption processing module 23, or the decryption processing module 33. The following explanation is given only about the differences with the first embodiment.

More particularly, the first terminal device 1C can be configured to not include the key generation processing module 11. Thus, an external terminal device installed separately from the first terminal device 1C can be configured to include the key generation processing module 11 and generate the first encryption key, which is to be used in the first homomorphic encryption method, and the second encryption key, which is to be used in the second homomorphic encryption method. In that case, the external terminal device sends the first encryption key, which is stored in an encryption key storage unit, and the first decryption key, which is stored in a decryption key storage unit, to the first terminal device 1C; and sends the second encryption key, which is stored in a conversion key storage unit, to the secret calculation device 4C. If the first terminal device 1C is configured to not include the encryption processing module 23, then the external terminal device need not send the first encryption key to the first terminal device 1C. Moreover, if the first terminal device 1C is configured to not include the decryption processing module 33, then the external terminal device need not send the first decryption key to the first terminal device 1C. When the first encryption key or the first decryption key is received from the external terminal device, the receiving module 31 of the first terminal device 1C stores the first encryption key or the first decryption key in the encryption key storage unit 12 or the decryption key storage unit 13. Moreover, when the second encryption key is received from the external terminal device, the secret calculation device 4C stores the second encryption key in the conversion key storage unit 52.

Meanwhile, the first terminal device 1 can be configured to include the key generation processing module 11, the encryption key storage unit 12, the decryption key storage unit 13, the conversion key storage unit 14, and the sending module 25. Thus, the first terminal device 1C can generate the first encryption key for use in the first homomorphic encryption method and generate the first decryption key and the conversion key for use in the second homomorphic encryption method, so that the generated keys are used in an external terminal device installed separately from the first terminal device 1C. In that case, the sending module 25 of the first terminal device IC sends the first encryption key, which is stored in the encryption key storage unit 12, to the external terminal device that, for example, includes the encryption processing module 23. Moreover, the sending module 25 of the first terminal device 1C sends the first decryption key, which is stored in the decryption key storage unit 13, to the external terminal device that, for example, includes the decryption processing module 33. Furthermore, the first terminal device 1C sends the conversion key, which is stored in the conversion key storage unit 14, to the secret calculation device 4. After sending them, the first terminal device 1C can delete the first encryption key, the first decryption key, and the conversion key.

Third Modification Example of First Embodiment

In a third modification example, the explanation is given about an example in which the first homomorphic encryption method is a homomorphic encryption method in which Module-LWE is adapted, and the second homomorphic encryption method is a homomorphic encryption method in which LWE not dependent on the ring dimensionality of Module-LWE is adapted.

In the third modification example, in an identical manner to the first modification example described above, the explanation is given about the example in which the input data contains two polynomials and the coefficients of those polynomials represent vector elements. Moreover, in the third modification example, in an identical manner to the first modification example described above, the explanation is given about the example in which the first secret calculation operation includes calculating the inner product of two vectors, and the second secret calculation operation includes calculating the square of the inner product result. Furthermore, in the third modification example, a ciphertext conversion method is implemented that is defined between a second ciphertext encrypted by the first homomorphic encryption method in which Module-LWE is adapted, and a third ciphertext encrypted by the second homomorphic encryption method in which LWE not dependent on the ring dimensionality of the first homomorphic encryption method is adapted.

FIG. 1 is a schematic diagram illustrating an example of a secret calculation system 100D according to the third modification example.

The secret calculation system 100D includes a first terminal device 1D and a secret calculation device 4D. The first terminal device 1D and the secret calculation device 4D are communicably connected to each other via the network 5. Explanation about Details of Secret Calculation Operations Firstly, the explanation is given about the details of secret calculation operations including the first secret calculation operation and the second secret calculation operation according to the third modification example.

In the secret calculation device 4D according to the third modification example, in an identical manner to the secret calculation device 4 according to the first embodiment described earlier, the following is performed as the first secret calculation operation: the inner product of the first vector $u=(u_0, u_1, \ldots, u_{l-1})$ having the length "l" and the second vector $v=(v_0, v_1, \ldots, v_{l-1})$ having the length "l" is calculated, and the first scalar value $s1=<u, v>$ is output.

Moreover, in the secret calculation device 4D according to the third modification example, in an identical manner to the secret calculation device 4 according to the first embodiment described earlier, as the second secret calculation operation, the square of the first scalar value s1 is calculated and a second scalar value s2 ($=s1^2$) is output. Furthermore, in the secret calculation device 4D according to the third modification example, in an identical manner to the secret calculation device 4 according to the first embodiment described earlier, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4D according to the third modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4D according to the third modification example, the first homomorphic encryption method is a homomorphic encryption method in which Module-LWE having the ring dimensionality equal to "n" ($\neq 1$) and having the vector dimensionality equal to "k" is adapted. Moreover, in the secret calculation device 4D according to the third modification example, the second homomorphic encryption method is a homomorphic encryption method in which LWE having the vector dimensionality equal to d' is adapted. Furthermore, in the secret calculation device 4D, a ciphertext conversion method is implemented that is defined between a homomorphic encryption method in which Module-LWE having the ring dimensionality equal to "n" is adapted and a homomorphic encryption method in which LWE having the vector dimensionality equal to d' is adapted. In the following explanation, in the homomorphic encryption method in which Module-LWE having the ring dimensionality equal to "n" ($\neq 1$) and having the vector dimensionality equal to "k" is adapted, $sk_{MLWE}$ represents the secret key to be used and $pk_{MLWE}$ represents the public key to be used. Moreover, in the homomorphic encryption method in which LWE having the vector dimensionality equal to d' is adapted, $sk_{LWE'}$ represents the secret key to be used and $pk_{LWE'}$ represents the public key to be used.

Explanation about Secret Calculation Method

In the secret calculation system 100D according to the third modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1D, the secret key $sk_{MLWE}$ and the public key $pk_{MLWE}$ are generated for use in the first homomorphic encryption method. Moreover, in the first terminal device 1D, the secret key $sk_{LWE'}$ is generated for use in the second homomorphic encryption method. The secret key to be used in the first homomorphic encryption method is set to $sk_{MLWE}=(sk_0, sk_1, \ldots, sk_{k-1})$. When $sk_i=sk_{i, 0}+sk_{i, 1}x+ \ldots +sk_{i, n-1}x^{n-1}$ holds true, the conversion key $ksk_{LWEtoLWE'}$ becomes equal to the ciphertext $ksk_{LWEtoLWE'}=Enc_{LWE'}(sk_{LWE})$ of the secret key $sk_{LWE}=(sk_{0, 0}, sk_{0, 1}, \ldots, sk_{0, n-1}, sk_{1, 0}, sk_{1, 1}, \ldots, sk_{1, n-1}, \ldots, sk_{k-1, 0}, sk_{k-1, 1}, \ldots, sk_{k-1, n-1})$ encrypted by the second homomorphic encryption method.

In the first terminal device 1D, the public key $pk_{MLWE}$ to be used in the first homomorphic encryption method is treated as the first encryption key, and the secret key $sk_{LWE'}$ to be used in the second homomorphic encryption method is treated as the first decryption key. Alternatively, the secret key $sk_{MLWE}$ that is to be used in the first homomorphic encryption method can be used as the first encryption key. Moreover, in the first terminal device 1D, the public key $pk_{LWE'}$ to be used in the second homomorphic encryption method is treated as the second encryption key.

In the first terminal device 1D, using the first homomorphic encryption method, the input data containing the first vector $u=(u_0, u_1, \ldots, u_{l-1})$ and the second vector $V=(v_0, v_1, \ldots, v_{l-1})$, which have the length "l", is converted into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1D, the abovementioned polynomials are encrypted using the first encryption key $pk_{MLWE}$, and the two first ciphertexts $ct_u$ and $ct_v$ are calculated.

In the secret calculation device 4D, the first ciphertexts $ct_u$ and $ct_v$ are subjected to the first secret calculation operation in which the homomorphic multiplication $EvalMult_{MLWE}$ is performed as the homomorphic inner product computation based on the first homomorphic encryption method, and a polynomial second ciphertext $ct_{s1+}=EvalMult_{MLWE}(ct_u, ct_v)$ is calculated in which the first scalar value $s1=<u, v>$ encrypted by the first homomorphic encryption method, represents the constant term.

Subsequently, in the secret calculation device 4D, the ciphertext conversion $Extract_{MLWEtoLWE}$ and $Convert_{LWEtoLWE'}$, the conversion key $ksk_{LWEtoLWE'}$, and the second encryption key $pk_{LWE'}$ are used; and, without decrypting the second ciphertext $ct_{s1+}$, the second ciphertext $ct_{s1+}$ is converted into the third ciphertext $ct_{s1}=Convert_{LWEtoLWE'}(Extract_{RLWEtoLWE}(ct_{s1+}))$ of the first scalar value s1.

Moreover, in the secret calculation device 4D, the third ciphertext $ct_{s1}$ is subjected to the second secret calculation operation using the homomorphic multiplication $EvalMult_{LWE'}$, and the fourth ciphertext $ct_{s2}$ ($=EvalMult_{LWE'}(ct_{s1}, ct_{s1})$) of the second scalar value s2 ($=s1^2$) is calculated.

In the first terminal device 1D, the fourth ciphertext $ct_{s2}$ of the second scalar value s2 is decrypted using the first decryption key $sk_{LWE'}$ and the second scalar value s2 is calculated.

Explanation about System Configuration/Functions

Given below is the specific explanation about the secret calculation system 100D according to the third modification example.

FIG. 6 is a functional block diagram illustrating an example of the first terminal device 1D according to the third modification example. The first terminal device 1D includes a key generation processing module 11D, an encryption processing module 23D, a sending module 25D, and a decryption processing module 33D in place of the key generation processing module 11, the encryption processing module 23, the sending module 25, and the decryption processing module 33. Moreover, the first terminal device 1D further includes the conversion key storage unit 14. Other than that, the first terminal device 1D is identical to the first terminal device 1 according to the first embodiment described earlier. Meanwhile, although not illustrated in FIG. 6, in the third modification example, an arrow indicating the communication of data from the encryption key storage unit 12 to the sending module 25D needs to be additionally illustrated.

The key generation processing module 11D generates the public key $pk_{MLWE}$ and the secret key $sk_{MLWE}$ to be used in the first homomorphic key encryption key. Moreover, the key generation processing module 11D generates the public key $pk_{LWE'}$ and the secret key $sk_{LWE'}$ to be used in the second homomorphic key encryption key. The secret key to be used in the first homomorphic encryption method is set to $sk_{MLWE}=(sk_0, sk_1, \ldots, sk_{k-1})$. When $sk_i=sk_{i, 0}+sk_{i, 1}x+ \ldots +sk_{i, n-1}x^{n-1}$ holds true, the conversion key $ksk_{LWEtoLWE'}$ becomes equal to the ciphertext $ksk_{LWEtoLWE'}=Enc_{LWE'}(sk_{LWE})$ of the secret key $sk_{LWE}=(sk_{0, 0}, sk_{0, 1}, \ldots, sk_{0, n-1}, sk_{1, 0}, sk_{1, 1}, \ldots, sk_{1, n-1}, \ldots, sk_{k-1, 0}, sk_{k-1, 1}, \ldots, sk_{k-1, n-1})$ encrypted by the second homomorphic encryption method.

The key generation processing module 11D treats the public key $pk_{MLWE}$, which is to be used in the first homomorphic encryption method, as the first encryption key and treats the secret key $sk_{LWE'}$, which is to be used in the second homomorphic encryption method, as the first decryption key. Alternatively, the secret key $sk_{MLWE}$ that is to be used in the first homomorphic encryption method can be used as the first encryption key. Moreover, the public key $pk_{LWE'}$, which is to be used in the second homomorphic key encryption key, as the second encryption key for use in the secret calculation device 4D. Then, the key generation processing module 11D stores the first encryption key and the second encryption key in the encryption key storage unit 12; stores the first decryption key in the decryption key storage unit 13; and stores the conversion key in the conversion key storage unit 14.

The sending module 25D sends the second encryption key $pk_{LWE'}$, which is stored in the encryption key storage unit 12, and the conversion key $ksk_{LWEtoLWE'}$, which is stored in the conversion key storage unit 14, to the secret calculation device 4D.

The encryption processing module 23D converts the first vector "u" and the second vector "v", which are stored in the first data storage unit 22, into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, according to the first conversion function fw and the second conversion function bw, respectively. Then, the encryption processing module 23D encrypts the abovementioned polynomials using the first encryption key $pk_{MLWE}$ stored in the encryption key storage unit 12, and generates the two first ciphertexts $ct_u$ and $ct_v$ obtained as a result of performing encryption according to the first homomorphic encryption method. Subsequently, the encryption processing module 23D stores the first ciphertexts in the second data storage unit 24.

The decryption processing module 33D decrypts the fourth ciphertext, which is stored in the third data storage unit 32, using the first decryption key $sk_{LWE'}$ that is stored in the decryption key storage unit 13, and calculates the second scalar value s2. Then, the decryption processing module 33D stores the second scalar value in the fourth data storage unit 34.

Meanwhile, the input module 21 can obtain the polynomials fw(u) and bw(v) from the computer connected to the first terminal device 1D, and store them in the first data storage unit 22. Then, the encryption processing module 23D can encrypt the abovementioned polynomials, which are stored in the first data storage unit 22, using the first encryption key $pk_{MLWE}$ stored in the encryption key storage unit 12, and calculate the first ciphertexts $ct_u$ and $ct_v$. Then, the encryption processing module 23D can store the first ciphertexts in the second data storage unit 24.

FIG. 7 is a functional block diagram illustrating an example of the secret calculation device 4D according to the third modification example.

The secret calculation device 4D includes a receiving module 41D, a first secret calculation processing module 43D, a ciphertext conversion processing module 45D, and a second secret calculation processing module 47D in place of the receiving module 41, the first secret calculation processing module 43, the ciphertext conversion processing module 45, and the second secret calculation processing module 47, respectively. Moreover, the secret calculation device 4D further includes the encryption key storage unit 51 and the conversion key storage unit 52. Other than that, the secret calculation device 4D is identical to the secret calculation device 4 according to the first embodiment described earlier.

The receiving module 41D receives the second encryption key $pk_{LWE'}$ and the conversion key $sk_{LWEtoLWE'}$ from the first terminal device 1D; stores the second encryption key in the encryption key storage unit 51; and stores the conversion key in the conversion key storage unit 52.

The first secret calculation processing module 43D performs the first secret calculation operation with respect to the first ciphertexts $ct_u$ and $ct_v$, which are stored in the first data storage unit 42, using the homomorphic multiplication $EvalMult_{MLWE}$ functioning as the homomorphic inner product computation based on the first homomorphic encryption method, and calculates the polynomial second ciphertext $ct_{s1+}$ having the first scalar value s1 as the constant term. Then, the first secret calculation processing module 43D stores the second ciphertext in the second data storage unit 44.

The ciphertext conversion processing module 45D uses the ciphertext conversion $Extract_{MLWEtoLWE}$ and $Convert_{LWEtoLWE'}$ and, without decrypting the second ciphertext $ct_{s1+}$ that is stored in the second data storage unit 44, converts the second ciphertext $ct_{s1+}$ into the third ciphertext $ct_{s1}$ of the first scalar value s1. Then, the ciphertext conversion processing module 45D stores the third ciphertext in the third data storage unit 46. At the time of performing ciphertext conversion, the ciphertext conversion processing module 45D uses the second encryption key $pk_{LWE'}$, which is stored in the encryption key storage unit 51, and the conversion key $ksk_{LWEtoLWE'}$, which is stored in the conversion key storage unit 52.

The second secret calculation processing module 47D performs the second secret calculation operation with respect to the third ciphertext $ct_{s1}$, which is stored in the third data storage unit 46, using the homomorphic multiplication $EvalMult_{LWE'}$ and calculates the fourth ciphertext $ct_{s2}$ of the second scalar value s2. Then, the second secret calculation processing module 47D stores the fourth ciphertext in the fourth data storage unit.

Meanwhile, the first terminal device 1D and the secret calculation device 4D have an identical hardware configuration to the first terminal device 1 and the secret calculation device 4, respectively, according to the first embodiment described earlier (see FIG. 5).

Explanation about Flow

Given below is the explanation of an exemplary flow of information processing performed in the first terminal device 1D and the secret calculation device 4D according to the third modification example.

FIG. 8 is a flowchart for explaining an exemplary flow of information processing performed in the first terminal device 1D and the secret calculation device 4D according to the third modification example. In the third modification example, the operations from Step S1 to Step S12 are performed in an identical manner to the operations performed in the first terminal device 1 and the secret calculation device 4 according to the first embodiment described earlier. Moreover, in the information processing performed in the first terminal device 1D and the secret calculation device 4D according to the third modification example, Step S13 is added in between Step S1 and Step S2, and Step S14 is added in between Step S2 and Step S3.

More specifically, in the third modification example, at Step S1, the key generation processing module 11D of the first terminal device 1C generates the public key $pk_{MLWE}$ and the secret key $sk_{MLWE}$ that are to be used in the first homomorphic encryption method. Moreover, the key generation processing module 11D generates the public key $pk_{LWE'}$ and the secret key $sk_{LWE'}$ that are to be used in the second homomorphic encryption method. The secret key to be used in the first homomorphic encryption method is set to $sk_{MLWE}=(sk_0, sk_1, \ldots, sk_{k-1})$. When $sk_i = sk_{i,0} + sk_{i,1}x + \ldots + sk_{i,n-1}x^{n-1}$ holds true, the conversion key $ksk_{LWEtoLWE'}$ becomes equal to the ciphertext $ksk_{LWEtoLWE'} = Enc_{LWE'}(sk_{LWE})$ of the secret key $sk_{LWE} = (sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$ encrypted by the second homomorphic encryption method.

The key generation processing module 11D treats the public key $pk_{MLWE}$, which is to be used in the first homomorphic encryption method, as the first encryption key and treats the secret key $sk_{LWE'}$, which to be used in the second homomorphic encryption method, as the first decryption key. Alternatively, the secret key $sk_{MLWE}$ that is to be used in the first homomorphic encryption method can be used as the first encryption key. Moreover, the public key $pk_{LWE'}$, which is to be used in the second homomorphic encryption method, is treated as the second encryption key for use in the secret calculation device 4D.

Then, the key generation processing module 11D stores the first encryption key and the second encryption key in the encryption key storage unit 12; stores the first decryption key in the decryption key storage unit 13; and stores the conversion key in the conversion key storage unit 14.

At Step S13, the sending module 25D of the first terminal device 1D sends the second encryption key $pk_{LWE'}$, which is stored in the encryption key storage unit 12, and the conversion key $ksk_{LWEtoLWE'}$, which is stored in the conversion key storage unit 14, to the secret calculation device 4D.

At Step S14, the receiving module 41D of the secret calculation device 4D receives the second encryption key $pk_{LWE'}$ and the conversion key $sk_{LWEtoLWE'}$ from the first terminal device 1D; stores the second encryption key in the encryption key storage unit 51; and stores the conversion key in the conversion key storage unit 52.

At Step S3, the encryption processing module 23D of the first terminal device 1D uses the first conversion function fw and the second conversion function bw and converts the input data containing the first vector "u" and the second vector "v", which are stored in the first data storage unit 22, into the polynomials $fw(u) = u_0 + u_1x + \ldots + u_{l-1}x^{l-1}$ and $bw(v) = v_0 - v_1x^{n-1} - v_2x^{n-2} - \ldots - v_{l-1}x^{n-(l-1)}$, respectively. Then, the encryption processing module 23D encrypts the polynomials fw(u) and bw(v) using the first encryption key $pk_{MLWE}$ that is stored in the encryption key storage unit 12, and calculates the first ciphertexts $ct_u$ and $ct_v$. Then, the encryption processing module 23D stores the first ciphertexts in the second data storage unit 24.

Then, the operations from Step S3 to Step S12 are performed in an identical manner to the operations performed in first embodiment described above.

At Step S6, the first secret calculation processing module 43D of the secret calculation device 4D performs secret calculation regarding the first ciphertexts $ct_u$ and $ct_v$, which are stored in the first data storage unit 42, according to the first secret calculation operation in which the homomorphic multiplication $EvalMult_{MLWE}$ is performed, and calculates the second ciphertext $ct_{s1+}$ having the first scalar value s1 as the constant term. Then, the first secret calculation processing module 43D stores the second ciphertext in the second data storage unit 44.

At Step S7, the ciphertext conversion processing module 45D of the secret calculation device 4D uses the ciphertext conversion $Extract_{MLWEtoLWE}$ and $Convert_{LWEtoLWE'}$ and, without decrypting the second ciphertext $ct_{s1+}$ that is stored in the second data storage unit 44, converts the second ciphertext $ct_{s1+}$ into the third ciphertext $ct_{s1}$ of the first scalar value s1. Then, the ciphertext conversion processing module 45D stores the third ciphertext in the third data storage unit 46. At the time of performing ciphertext conversion, the ciphertext conversion processing module 45D uses the second encryption key $pk_{LWE'}$, which is stored in the encryption key storage unit 51, and the conversion key $ksk_{LWEtoLWE'}$, which is stored in the conversion key storage unit 52.

At Step S8, the second secret calculation processing module 47D of the secret calculation device 4D performs the second secret calculation operation with respect to the third ciphertext $ct_{s1}$, which is stored in the third data storage unit 46, using the homomorphic multiplication $EvalMult_{LWE'}$ and calculates the fourth ciphertext $ct_{s2}$ of the second scalar value s2. Then, the second secret calculation processing module 47D stores the fourth ciphertext in the fourth data storage unit 48.

At Step S11, the decryption processing module 33D of the first terminal device 1D decrypts the fourth ciphertext, which is stored in the third data storage unit 32, using the first decryption key $sk_{LWE'}$ that is stored in the decryption key storage unit 13, and calculates the second scalar value s2. Then, the decryption processing module 33D stores the second scalar value in the fourth data storage unit 34.

As explained above, in the second modification example, in an identical manner to the ciphertext conversion processing module 45 according to the first embodiment described earlier, the ciphertext conversion processing module 45D of the secret calculation device 4D implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4D and the secret calculation system 100D according to the third modification example, even when Module-LWE is adapted as the first homomorphic encryption method and LWE not dependent on the ring dimensionality of Module-LWE is adapted as the second homomorphic encryption method, it becomes possible to achieve enhancement in the secret in an identical manner to the first embodiment described earlier.

Moreover, in the secret calculation device 4D and the secret calculation system 100D according to the third modification example, a homomorphic encryption method in which Module-LWE is adapted can be implemented that has a higher level of security as compared to a homomorphic encryption method in which Ring-LWE is adapted.

Meanwhile, in the third modification example, as illustrated in FIG. 6, the first terminal device 1D includes the key generation processing module 11D, the encryption key storage unit 12, the decryption key storage unit 13, the input module 21, the first data storage unit 22, the encryption processing module 23D, the second data storage unit 24, the sending module 25D, the receiving module 31, the third data storage unit 32, the decryption processing module 33D, the fourth data storage unit 34, and the output module 35. However, in an identical manner to the first terminal device 1 according to the first embodiment, the first terminal device 1D can be configured to include only some of those constituent elements.

Second Embodiment

In a second embodiment, the explanation is given about an example in which the first homomorphic encryption method is a homomorphic encryption method in which Ring-LWE is adapted, and the second homomorphic encryption method is a homomorphic encryption method in which LWE is adapted.

Moreover, in the second embodiment, the explanation is given about an example in which the input data contains two polynomials, and each coefficient in the polynomials is a vector element.

Furthermore, in the second embodiment, the explanation is given about an example in which the first secret calculation operation includes calculating the inner product of two vectors, and the second secret calculation operation includes identity calculation.

The identity operation implies the operation in which the original value and the operation result are identical values. That is, in the second embodiment, the explanation is given about an example in which, as the second secret calculation operation, no calculation is performed with respect to the original data.

FIG. 1 is a schematic diagram illustrating an example of a secret calculation system 100E according to the second embodiment.

The secret calculation system 100E includes a first terminal device 1E and a secret calculation device 4E. The first terminal device 1E and the secret calculation device 4E are communicably connected to each other via the network 5.

Explanation about Details of Secret Calculation Operations

Firstly, the explanation is given about the details of secret calculation operations including the first secret calculation operation and the second secret calculation operation according to the second embodiment.

In the secret calculation device 4E according to the second embodiment, in an identical manner to the secret calculation device 4 according to the first embodiment described earlier, the following is performed as the first secret calculation operation: the inner product of the first vector $u=(u_0, u_1, \ldots, u_{l-1})$ having the length "l" and the second vector $v=(v_0, v_1, \ldots, v_{l-1})$ having the length "l" is calculated, and the first scalar value s1=<u, v> is output. Moreover, in the secret calculation device 4E according to the second embodiment, as the second secret calculation operation, the first scalar value s1 representing the inner product result is not changed and is calculated, without modification, as the second scalar value s2 (=s1). Furthermore, in the secret calculation device 4E according to the second embodiment, in an identical manner to the secret calculation device 4 according to the first embodiment described earlier, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4E according to the second embodiment, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4E according to the second embodiment, the first homomorphic encryption method is a homomorphic encryption method in which Ring-LWE is adapted. In the secret calculation device 4E, the first homomorphic encryption method is a homomorphic encryption method in which Ring-LWE having the ring dimensionality equal to "n" is adapted. Moreover, in the secret calculation device 4E, the second homomorphic encryption method is a homomorphic encryption method in which LWE having the vector dimensionality equal to "d" (=n) is adapted. Furthermore, in the secret calculation device 4E, such ciphertext conversion is implemented which is used in the homomorphic encryption method in which Ring-LWE having the ring dimensionality equal to "n" is adapted, and which is used in the homomorphic encryption method in which LWE having the vector dimensionality equal to "d" (=n) is adapted.

Explanation about Secret Calculation Method

In the secret calculation system 100E according to the second embodiment, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1E, the secret key $sk_{RLWE}$ and the public key $pK_{RLWE}$ are generated for use in the first homomorphic encryption method. Moreover, when the secret key to be used in the first homomorphic encryption method is set to $sk_{RLWE}=sk_0+sk_1x+\ldots+sk_{n-1}x^{n-1}$, the secret key to be used in the second homomorphic encryption method is set to $sk_{LWE}=(sk_0, sk_1, \ldots, sk_{n-1})$. In the first terminal device 1E, the public key $pk_{RLWE}$ to be used in the first homomorphic encryption method is treated as the first encryption key, and the secret key $sk_{LWE}$ to be used in the second homomorphic encryption method is treated as the first decryption key. Alternatively, the secret key $sk_{RLWE}$ that is to be used in the first homomorphic encryption method can be used as the first encryption key.

In the secret calculation device 4E, using the first homomorphic encryption method, the input data containing the first vector $u=(u_0, u_1, \ldots, u_{l-1})$ and the second vector $v=(v_0, v_1, \ldots, v_{l-1})$, which have the length "l", is converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions fw(v) and bw(u) can also be used. Then, in the secret calculation device 4E, the abovementioned polynomials are encrypted using the first encryption key $pk_{RLWE}$, and the two first ciphertexts $ct_u$ and $ct_v$ are calculated.

In the secret calculation device 4E, the first ciphertexts $ct_u$ and $ct_v$ are subjected to the first secret calculation operation in which the homomorphic multiplication $EvalMult_{RLWE}$ is performed, and a polynomial second ciphertext $ct_{s1+}=Eval-Mult_{RLWE}(ct_u, ct_v)$ is calculated in which the first scalar value s1=<u, v> represents the constant term.

Subsequently, in the secret calculation device 4E, the ciphertext conversion Extract RLWEtoLWE is performed and, without decrypting the second ciphertext $ct_{s1+}$, the second ciphertext $ct_{s1+}$ is converted into a third ciphertext $ct_{s1}=Extract_{RLWEtoLWE}(ct_{s1+})$ of the first scalar value s1.

Moreover, in the secret calculation device 4E, the second secret calculation operation is performed that includes doing nothing, and the third ciphertext $ct_{s1}$ is calculated as the fourth ciphertext $ct_{s2}$ (=$ct_{s1}$) of the second scalar value s2 (=s1).

In the first terminal device 1E, the fourth ciphertext $ct_{s2}$ of the second scalar value s2 is decrypted using the first decryption key $sk_{LWE}$ and the second scalar value s2 is calculated.

Explanation about System Configuration/Functions

Given below is the specific explanation about the secret calculation system 100E according to the second embodiment.

FIG. 2 is a functional block diagram illustrating an example of the first terminal device 1E according to the second embodiment. The first terminal device 1E has an identical functional configuration to the first terminal device 1 according to the first embodiment described earlier.

FIG. 3 is a functional block diagram illustrating an example of the secret calculation device 4E according to the second embodiment.

The secret calculation device 4E includes a second secret calculation processing module 47E in place of the second secret calculation processing module 47. Other than that, the secret calculation device 4E is identical to the secret calculation device 4 according to the first embodiment described earlier.

The second secret calculation processing module 47E performs the second secret calculation operation, which includes doing nothing, with respect to the third ciphertext $ct_{s1}$ stored in the third data storage unit 46, and calculates the third ciphertext $ct_{s1}$ as the fourth ciphertext $ct_{s2}$ (=$ct_{s1}$) of the second scalar value s2 (=s1). Then, a second secret calculation processing module 47F stores the fourth ciphertext in the fourth data storage unit 48.

Meanwhile, the first terminal device 1E and the secret calculation device 4E have an identical hardware configuration to the first terminal device 1 and the secret calculation device 4, respectively, according to the first embodiment described earlier (see FIG. 5).

Explanation about Flow

Given below is the explanation of an exemplary flow of information processing performed in the first terminal device 1E and the secret calculation device 4E according to the second embodiment.

FIG. 4 is a flowchart illustrating an exemplary flow of information processing performed in the first terminal device 1E and the secret calculation device 4E according to the second embodiment. In the second embodiment, the operations from Step S1 to Step S12 are performed in an identical manner to the operations performed in the first terminal device 1 and the secret calculation device 4 according to the first embodiment described earlier.

In the second embodiment, at Step S8, the second secret calculation processing module 47E of the secret calculation device 4E performs the second secret calculation operation, which includes doing nothing, with respect to the third ciphertext $ct_{s1}$ stored in the third data storage unit 46, and calculates the third ciphertext $ct_{s1}$ as the fourth ciphertext $\text{ct}_{s2}$ (=$\text{ct}_{s1}$) of the second scalar value s2 (=s1). Then, the second secret calculation processing module 47E stores the fourth ciphertext in the fourth data storage unit 48.

As explained above, in an identical manner to the ciphertext conversion processing module 45 according to the first embodiment described earlier, the ciphertext conversion processing module 45E of the secret calculation device 4E according to the second embodiment implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4E and the secret calculation system 100E according to the second embodiment, even when Ring-LWE is adapted as the first homomorphic encryption method and when LWE is adapted as the second homomorphic encryption method, it becomes possible to achieve enhancement in the secret in an identical manner to the first embodiment described earlier.

In the secret calculation device 4E and the secret calculation system 100E according to the second embodiment, the first secret calculation operation includes calculating the inner product of two vectors, and the second secret calculation operation includes identity calculation.

In the case of decrypting the ciphertexts obtained as a result of performing the first secret calculation operation, there is a possibility of leakage of information from the non-constant terms. Hence, it becomes necessary to perform a masking operation with respect to the ciphertext as explained in "International Laid-open Pamphlet No. 2022/201277". In contrast, in the secret calculation system 100E according to the second embodiment, ciphertext conversion of non-constant terms is performed to decrypt the ciphertext from which the non-constant terms are deleted. That eliminates the need for performing a masking operation with respect to the ciphertext. Thus, in the secret calculation system 100E according to the second embodiment, in addition to achieving the effects explained earlier, it becomes possible to eliminate the need for performing a masking operation with respect to the ciphertext of the result of homomorphic inner product calculation.

First Modification Example of Second Embodiment

In a first modification example, the explanation is given about an example in which the first homomorphic encryption method is a homomorphic encryption method in which Module-LWE is adapted, and the second homomorphic encryption method is a homomorphic encryption method in which LWE is adapted.

Moreover, in the first modification example, in an identical manner to the first embodiment described earlier, the explanation is given about an example in which the input data contains two polynomials and the coefficients of those polynomials represent vector elements. Furthermore, in the first modification example, in an identical manner to the second embodiment described earlier, the explanation is given about an example in which the first secret calculation operation includes calculating the inner product of two vectors, and the second secret calculation operation includes calculating the square of the identity.

FIG. 1 is a schematic diagram illustrating an example of a secret calculation system 100F according to the first modification example.

The secret calculation system 100F includes a first terminal device 1F and a secret calculation device 4F. The first terminal device 1F and the secret calculation device 4F are communicably connected to each other via the network 5.

Explanation about Details of Secret Calculation Operations

Firstly, the explanation is given about the details of secret calculation operations including the first secret calculation operation and the second secret calculation operation according to the first modification example.

In the secret calculation device 4F according to the first modification example, in an identical manner to the secret calculation device 4 according to the first embodiment described earlier, the following is performed as the first secret calculation operation: the inner product of the first vector u=($u_0$, $u_1$, . . . , $u_{l-1}$) having the length "l" and the second vector v=($v_0$, $v_1$, . . . , $v_{l-1}$) having the length "l" is calculated, and the first scalar value s1=<u, v> is output. Moreover, in the secret calculation device 4F, as the second secret calculation operation, the first scalar value s1 representing the inner product result is not changed and is calculated, without modification, as the second scalar value s2 (=s1). Furthermore, in the secret calculation device 4F according to the first modification example, in an identical manner to the secret calculation device 4 according to the first embodiment described above, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4F according to the first modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4F according to the first modification example, the first homomorphic encryption method is a homomorphic encryption method in which Module-LWE is adapted. Moreover, in the secret calculation device 4F, the second homomorphic encryption method is a homomorphic encryption method in which LWE is adapted. Furthermore, in the secret calculation device 4F, such ciphertext conversion is implemented which is used in the homomorphic encryption method in which Module-LWE is adapted, and which is used in the homomorphic encryption method in which LWE is adapted.

Explanation about Secret Calculation Method

In the secret calculation system 100F according to the first modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1F, the secret key $\text{sk}_{MLWE}$ and the public key $\text{pk}_{MLWE}$ are generated for use in the first homomorphic encryption method. Moreover, in the first terminal device 1F, the secret key to be used in the first homomorphic encryption method is set to $\text{sk}_{MLWE}$=($\text{sk}_0$, $\text{sk}_1$, . . . , $\text{sk}_{k-1}$). When $\text{sk}_i$=$\text{sk}_{i,0}$+$\text{sk}_{i,1}$x+ . . . +$\text{sk}_{i,n-1}$$x^{n-1}$ holds true, the secret key to be used in the second homomorphic encryption method becomes equal to $\text{sk}_{LWE}$=($\text{sk}_{0,0}$, $\text{sk}_{0,1}$, . . . , $\text{sk}_{0,n-1}$, $\text{sk}_{1,0}$, $\text{sk}_{1,1}$, . . . , $\text{sk}_{1,n-1}$, . . . , $\text{sk}_{k-1,0}$, $\text{sk}_{k-1,1}$, . . . , $\text{sk}_{k-1,n-1}$).

In the first terminal device 1F, the public key $\text{pk}_{MLWE}$ to be used in the first homomorphic encryption method is treated as the first encryption key, and the secret key $sk_{LWE}$ to be used in the second homomorphic encryption method is treated as the first decryption key. Alternatively, the secret key $sk_{MLWE}$ that is to be used in the first homomorphic encryption method can be used as the first encryption key.

In the secret calculation device 4F, using the first homomorphic encryption method, the input data containing the first vector $u=(u_0, u_1, \ldots, u_{l-1})$ and the second vector $v=(v_0, v_1, \ldots, v_{l-1})$, which have the length "1", is converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively.

Alternatively, at the time of conversion, the functions $fw(v)$ and $bw(u)$ can also be used. Then, in the secret calculation device 4F, the abovementioned polynomials are encrypted using the first encryption key $pk_{MLWE}$, and the two first ciphertexts $ct_u$ and $ct_v$ are calculated.

In the secret calculation device 4F, the first ciphertexts $ct_u$ and $ct_v$ are subjected to the first secret calculation operation in which the homomorphic multiplication $EvalMult_{MLWE}$ is performed according to the first homomorphic encryption method, and a polynomial second ciphertext $ct_{s1+}=EvalMult_{MLWE}(ct_u, ct_v)$ is calculated in which the first scalar value $s1=<u, v>$ represents the constant term.

Subsequently, in the secret calculation device 4F, the ciphertext conversion $Extract_{MLWEtoLWE}$ is performed and, without decrypting the second ciphertext $ct_{s1+}$, the second ciphertext $ct_{s1+}$ is converted into the third ciphertext $ct_{s1}=Extract_{MLWEtoLWE}(ct_{s1+})$ of the first scalar value s1.

Then, in the secret calculation device 4F, the second secret calculation operation is performed that includes doing nothing, and the third ciphertext $ct_{s1}$ is calculated as the fourth ciphertext $ct_{s2}$ ($=ct_{s1}$) of the second scalar value s2 ($=s1$).

In the first terminal device 1F, the fourth ciphertext $ct_{s2}$ of the second scalar value s2 is decrypted using the first decryption key $sk_{LWE}$ and the second scalar value s2 is calculated.

Explanation about System Configuration/Functions

Given below is the specific explanation about the secret calculation system 100F according to the second modification example.

FIG. 2 is a functional block diagram illustrating an example of the first terminal device 1F according to the first modification example. The first terminal device 1F has an identical functional configuration to the first terminal device 1 according to the first embodiment described earlier.

FIG. 3 is a functional block diagram illustrating an example of the secret calculation device 4F according to the first modification example.

The secret calculation device 4F includes a second secret calculation processing module 47F in place of the second secret calculation processing module 47. Other than that, the secret calculation device 4F is identical to the secret calculation device 4 according to the first embodiment described earlier.

The second secret calculation processing module 47F performs the second secret calculation operation, which includes doing nothing, with respect to the third ciphertext $ct_{s1}$ stored in the third data storage unit 46, and calculates the third ciphertext $ct_{s1}$ as the fourth ciphertext $ct_{s2}$ ($=ct_{s1}$) of the second scalar value s2 ($=s1$). Then, the second secret calculation processing module 47F stores the fourth ciphertext in the fourth data storage unit 48.

Meanwhile, the first terminal device 1F and the secret calculation device 4F have an identical hardware configuration to the first terminal device 1 and the secret calculation device 4, respectively, according to the first embodiment described earlier (see FIG. 5).

Explanation about Flow

Given below is the explanation of an exemplary flow of information processing performed in the first terminal device 1F and the secret calculation device 4F according to the first modification example.

FIG. 4 is a flowchart illustrating an exemplary flow of information processing performed in the first terminal device 1F and the secret calculation device 4F according to the first modification example. In the first modification example, the operations from Step S1 to Step S12 are performed in an identical manner to the operations performed in the first terminal device 1 and the secret calculation device 4 according to the first embodiment described earlier.

In the first modification example, at Step S8, the second secret calculation processing module 47F of the secret calculation device 4F performs the second secret calculation operation, which includes doing nothing, with respect to the third ciphertext $ct_{s1}$ stored in the third data storage unit 46, and calculates the third ciphertext $ct_{s1}$ as the fourth ciphertext $ct_{s2}$ ($=ct_{s1}$) of the second scalar value s2 ($=s1$). Then, the second secret calculation processing module 47F stores the fourth ciphertext in the fourth data storage unit 48.

As explained above, in an identical manner to the ciphertext conversion processing module 45 according to the first embodiment described earlier, the ciphertext conversion processing module 45F of the secret calculation device 4F according to the first modification example implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4E and the secret calculation system 100F according to the first modification example, even when Module-LWE is adapted as the first homomorphic encryption method and when LWE is adapted as the second homomorphic encryption method, it becomes possible to achieve enhancement in the secret in an identical manner to the first embodiment described earlier.

In the secret calculation device 4F and the secret calculation system 100F according to the first modification example, a homomorphic encryption method in which Module-LWE is adapted can be implemented that has a higher level of security as compared to a homomorphic encryption method in which Ring-LWE is adapted.

Furthermore, in the secret calculation device 4F and the secret calculation system 100F according to the first modification example, the explanation is given about an example in which the first secret calculation operation includes calculating the inner product of two vectors, and the second secret calculation operation includes identity calculation.

Thus, in the secret calculation system 100F according to the first modification example, in addition to achieving the effects explained earlier, it becomes possible to eliminate the need for performing a masking operation with respect to the ciphertext of the result of homomorphic inner product calculation.

Second Modification Example of Second Embodiment

In a second modification example, the explanation is given about an example in which the first homomorphic encryption method is a homomorphic encryption method in which Ring-LWE is adapted, and the second homomorphic encryption method is a homomorphic encryption method in which LWE not dependent on the ring dimensionality of Ring-LWE is adapted.

In the second modification example, in an identical manner to the first modification example described above, the explanation is given about the example in which the input data contains two polynomials and the coefficients of those polynomials represent vector elements. Moreover, in the second modification example, in an identical manner to the second embodiment described above, the explanation is given about the example in which the first secret calculation operation includes calculating the inner product of two vectors, and the second secret calculation operation includes identity calculation.

FIG. 1 is a schematic diagram illustrating an example of a secret calculation system 100G according to the second modification example.

The secret calculation system 100G includes a first terminal device 1G and a secret calculation device 4G. The first terminal device 1G and the secret calculation device 4G are communicably connected to each other via the network 5.

Explanation about Details of Secret Calculation Operations

Firstly, the explanation is given about the details of secret calculation operations including the first secret calculation operation and the second secret calculation operation according to the second modification example.

In the secret calculation device 4G according to the second modification example, in an identical manner to the secret calculation device 4 according to the first embodiment described earlier, the following is performed as the first secret calculation operation: the inner product of the first vector $u=(u_0, u_1, \ldots, u_{l-1})$ having the length "l" and the second vector $v=(v_0, v_1, \ldots, v_{l-1})$ having the length "l" is calculated, and the first scalar value $s1=<u, v>$ is output. Moreover, in the secret calculation device 4G, as the second secret calculation operation, the first scalar value s1 representing the inner product result is not changed and is calculated, without modification, as the second scalar value s2 (=s1). Furthermore, in the secret calculation device 4G according to the second modification example, in an identical manner to the secret calculation device 4 according to the first embodiment described earlier, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4E according to the second modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4G according to the second modification example, the first homomorphic encryption method is a homomorphic encryption method in which Ring-LWE having the ring dimensionality equal to "n" is adapted. Moreover, in the secret calculation device 4G, the second homomorphic encryption method is a homomorphic encryption method in which LWE having the vector dimensionality equal to d' (n) is adapted. Furthermore, in the secret calculation device 4C, a ciphertext conversion method is implemented that is defined between a homomorphic encryption method in which Ring-LWE having the ring dimensionality equal to "n" is adapted and a homomorphic encryption method in which LWE having the vector dimensionality equal to d' is adapted.

Explanation about Secret Calculation Method

In the secret calculation system 100G according to the second modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1G, the secret key $sk_{RLWE}$ and the public key $pk_{RLWE}$ are generated for use in the first homomorphic encryption method. Moreover, in the first terminal device 1G, the secret key $sk_{LWE'}$ and the public key $pk_{LWE'}$ are generated for use in the second homomorphic encryption method. Furthermore, in the first terminal device 1G, the secret key to be used in the first homomorphic encryption method is set to $sk_{RLWE}=sk_0+sk_1x+ \ldots +sk_{n-1}x^{n-1}$. Moreover, the conversion key $ksk_{LWEtoLWE'}$ is treated as the ciphertext $ksk_{LWEtoLWE'}=Enc_{LWE'}(sk_{LWE})$ of the secret key $sk_{LWE}=(sk_0, sk_1, \ldots, sk_{n-1})$ encrypted by the second homomorphic encryption method.

In the first terminal device 1G, the public key $pK_{RLWE}$ to be used in the first homomorphic encryption method is treated as the first encryption key, and the secret key $sk_{LWE'}$ to be used in the second homomorphic encryption method is treated as the first decryption key. Alternatively, the secret key $sk_{RLWE}$ that is to be used in the first homomorphic encryption method can be used as the first encryption key. Moreover, the public key $pk_{LWE'}$ to be used in the second homomorphic encryption method is treated as the second encryption key.

In the first terminal device 1G, using the first homomorphic encryption method, the input data containing the first vector $u=(u_0, u_1, \ldots, u_{l-1})$ and the second vector $V=(v_0, v_1, \ldots, v_{l-1})$, which have the length "l", is converted into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1C, the abovementioned polynomials are encrypted using the first encryption key $pk_{RLWE}$, and the two first ciphertexts $ct_u$ and $ct_v$ are calculated.

In the secret calculation device 4G, the first ciphertexts $ct_u$ and $ct_v$ are subjected to the first secret calculation operation in which the homomorphic multiplication $EvalMult_{RLWE}$ is performed, and a polynomial second ciphertext $ct_{s1+}=EvalMult_{RLWE}(ct_u, ct_v)$ is calculated in which the first scalar value $s1=<u, v>$ represents the constant term.

Subsequently, in the secret calculation device 4G, the ciphertext conversion $Extract_{RLWEtoLWE}$, the ciphertext conversion $Convert_{LWEtoLWE'}$, the conversion key $ksk_{LWEtoLWE'}$, and the second encryption key $pk_{LWE}$ are used and, without decrypting the second ciphertext $ct_{s1+}$, the second ciphertext $ct_{s1+}$ is converted into the third ciphertext $ct_{s1}=Convert_{LWEtoLWE'}(Extract_{RLWEtoLWE}(ct_{s1+}))$ of the first scalar value s1.

In the secret calculation device 4G, the second secret calculation operation includes doing nothing, and the third ciphertext $ct_{s1}$ is calculated as the fourth ciphertext $ct_{s2}$ (=$ct_{s1}$) of the second scalar value s2 (=s1).

In the first terminal device 1G, the fourth ciphertext $ct_{s2}$ of the second scalar value s2 is decrypted using the first decryption key $sk_{LWE'}$ and the second scalar value s2 is calculated.

Explanation about System Configuration/Functions

Given below is the specific explanation about the secret calculation system 100G according to the second modification example.

FIG. 6 is a functional block diagram illustrating an example of the first terminal device 1G according to the second modification example. The first terminal device 1G has an identical functional configuration to the first terminal device 1C according to the second modification example of the first embodiment.

FIG. 7 is a functional block diagram illustrating an example of the secret calculation device 4G according to the second modification example.

The secret calculation device 4G includes a second secret calculation processing module 47G in place of the second secret calculation processing module 47C. Other than that, the secret calculation device 4G is identical to the secret calculation device 4C according to the second modification example of the first embodiment described earlier.

The second secret calculation processing module 47G performs the second secret calculation operation, which includes doing nothing, with respect to the third ciphertext $ct_{s1}$ stored in the third data storage unit 46, and calculates the third ciphertext $ct_{s1}$ as the fourth ciphertext $ct_{s2}$ (=$ct_{s1}$) of the second scalar value s2 (=s1). Then, the second secret calculation processing module 47G stores the fourth ciphertext in the fourth data storage unit 48.

Meanwhile, the first terminal device 1G and the secret calculation device 4G have an identical hardware configuration to the first terminal device 1 and the secret calculation device 4, respectively, according to the first embodiment described earlier (see FIG. 5).

Explanation about Flow

Given below is the explanation of an exemplary flow of information processing performed in the first terminal device 1G and the secret calculation device 4G according to the second modification example.

FIG. 8 is a flowchart for explaining an exemplary flow of information processing performed in the first terminal device 1G and the secret calculation device 4G according to the second modification example. In the second modification example, the operations from Step S1 to Step S12 are performed in an identical manner to the operations performed in the first terminal device 1 and the secret calculation device 4 according to the first embodiment described earlier. Moreover, in the information processing performed in the first terminal device 1G and the secret calculation device 4G according to the second modification example, Step S13 is added in between Step S1 and Step S2, and Step S14 is added in between Step S2 and Step S3. The operations performed at Steps S13, S2, S14, and S3 are identical to the operations performed in the first terminal device 1C and the secret calculation device 4C according to the second modification example of the first embodiment described earlier.

In the second modification example, at Step S8, the second secret calculation processing module 47G of the secret calculation device 4G performs the second secret calculation operation, which includes doing nothing, with respect to the third ciphertext $ct_{s1}$ stored in the third data storage unit 46, and calculates the third ciphertext $ct_{s1}$ as the fourth ciphertext $ct_{s2}$ (=$ct_{s1}$) of the second scalar value s2

(=s1). Then, the second secret calculation processing module 47G stores the fourth ciphertext in the fourth data storage unit 48.

As explained above, in an identical manner to the ciphertext conversion processing module 45 according to the first embodiment described earlier, the ciphertext conversion processing module 45G of the secret calculation device 4G according to the second modification example implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4G and the secret calculation system 100G according to the second modification example, even when Ring-LWE is adapted as the first homomorphic encryption method and LWE not dependent on the ring dimensionality of Ring-LWE is adapted as the second homomorphic encryption method, it becomes possible to achieve enhancement in the secret in an identical manner to the first embodiment described earlier.

Furthermore, in the secret calculation device 4G and the secret calculation system 100G according to the second modification example, the explanation is given about an example in which the first secret calculation operation includes calculating the inner product of two vectors, and the second secret calculation operation includes identity calculation.

Thus, in the secret calculation system 100G according to the second modification example, in addition to achieving the effects explained earlier, it becomes possible to eliminate the need for performing a masking operation with respect to the ciphertext of the result of homomorphic inner product calculation.

Third Modification Example of Second Embodiment

In a third modification example, the explanation is given about an example in which the first homomorphic encryption method is a homomorphic encryption method in which Module-LWE is adapted, and the second homomorphic encryption method is a homomorphic encryption method in which LWE not dependent on the ring dimensionality of Module-LWE is adapted.

In the third modification example, in an identical manner to the first embodiment described earlier, the explanation is given about the example in which the input data contains two polynomials and the coefficients of those polynomials represent vector elements. Moreover, in the third modification example, in an identical manner to the first embodiment described earlier, the explanation is given about the example in which the first secret calculation operation includes calculating the inner product of two vectors. Furthermore, in the third modification example, in an identical manner to the second embodiment described earlier, the explanation is given about the example in which the first secret calculation operation includes calculating the inner product of two vectors, and the second secret calculation operation includes identity calculation.

FIG. 1 is a schematic diagram illustrating an example of a secret calculation system 100H according to the third modification example.

The secret calculation system 100H includes a first terminal device 1H and a secret calculation device 4H. The first terminal device 1H and the secret calculation device 4H are communicably connected to each other via the network 5.

Explanation about Details of Secret Calculation Operations

Firstly, the explanation is given about the details of secret calculation operations including the first secret calculation operation and the second secret calculation operation according to the third modification example.

In the secret calculation device 4H according to the third modification example, in an identical manner to the secret calculation device 4 according to the first embodiment described earlier, the following is performed as the first secret calculation operation: the inner product of the first vector $u=(u_0, u_1, \ldots, u_{l-1})$ having the length "l" and the second vector $v=(v_0, v_1, \ldots, v_{l-1})$ having the length "l" is calculated, and the first scalar value $s1=<u, v>$ is output. Moreover, in the secret calculation device 4H, as the second secret calculation operation, the first scalar value s1 representing the inner product result is not changed and is calculated, without modification, as the second scalar value s2 (=s1). Furthermore, in the secret calculation device 4H according to the third modification example, in an identical manner to the secret calculation device 4 according to the first embodiment described earlier, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4H according to the third modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4H according to the third modification example, the first homomorphic encryption method is a homomorphic encryption method in which Module-LWE having the ring dimensionality equal to "n" ($\neq 1$) and having the vector dimensionality equal to "k" is adapted. Moreover, in the secret calculation device 4H according to the third modification example, the second homomorphic encryption method is a homomorphic encryption method in which LWE having the vector dimensionality equal to d' is adapted. Furthermore, in the secret calculation device 4H, a ciphertext conversion method is implemented that is defined between a homomorphic encryption method in which Module-LWE having the ring dimensionality equal to "n" is adapted and a homomorphic encryption method in which LWE having the vector dimensionality equal to d' is adapted.

Explanation about Secret Calculation Method

In the secret calculation system 100H according to the third modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1H, the secret key $sk_{MLWE}$ and the public key $pk_{MLWE}$ are generated for use in the first homomorphic encryption method. Moreover, in the first terminal device 1H, the secret key $sk_{LWE'}$ is generated for use in the second homomorphic encryption method. In the first terminal device 1H, the secret key to be used in the first homomorphic encryption method is set to $sk_{MLWE}=(sk_0, sk_1, \ldots, sk_{k-1})$. When $sk_i=sk_{i, 0}+sk_{i, 1}x+ \ldots +sk_{i, n-1}x^{n-1}$ holds true, the conversion key $ksk_{LWEtoLWE'}$ becomes equal to the ciphertext $ksk_{LWEtoLWE'}=Enc_{LWE'}(sk_{LWE})$ of the secret key $sk_{LWE}=(sk_{0, 0}, sk_{0, 1}, \ldots, sk_{0, n-1}, sk_{1, 0}, sk_{1, 1}, \ldots, sk_{1, n-1}, \ldots, sk_{k-1, 0}, sk_{k-1, 1}, \ldots, sk_{k-1, n-1})$ encrypted by the second homomorphic encryption method.

In the first terminal device 1H, the public key $pk_{MLWE}$ to be used in the first homomorphic encryption method is treated as the first encryption key, and the secret key $sk_{LWE'}$ to be used in the second homomorphic encryption method is treated as the first decryption key. Alternatively, the secret key $sk_{MLWE}$ that is to be used in the first homomorphic encryption method can be used as the first encryption key. Moreover, in the first terminal device 1H, the public key $pk_{LWE'}$ to be used in the second homomorphic encryption method is treated as the second encryption key.

In the first terminal device 1H, using the first homomorphic encryption method, the input data containing the first vector $u=(u_0, u_1, \ldots, u_{l-1})$ and the second vector $V=(v_0, v_1, \ldots, v_{l-1})$, which have the length "l", is converted into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, according to the first conversion function fw and the second conversion function bw, respectively. Alternatively, at the time of conversion, the functions fw(v) and bw(u) can also be used.

Then, in the first terminal device 1H, the abovementioned polynomials are encrypted using the first encryption key $pk_{MLWE}$, and the two first ciphertexts $ct_u$ and $ct_v$ are calculated.

In the secret calculation device 4B, the first ciphertexts $ct_u$ and $ct_v$ are subjected to the first secret calculation operation in which the homomorphic multiplication $EvalMult_{MLWE}$ is performed as the homomorphic inner product computation based on the first homomorphic encryption method, and the polynomial second ciphertext $ct_{s1+}=EvalMult_{MLWE}(ct_u, ct_v)$ is calculated in which the first scalar value $s1=<u, v>$ represents the constant term.

Subsequently, in the secret calculation device 4H, the ciphertext conversion $Extract_{MLWEtoLWE}$ and $Convert_{LWEtoLWE'}$, the conversion key $ksk_{LWEtoLWE'}$, and the second encryption key $pk_{LWE}$ are used; and, without decrypting the second ciphertext $ct_{s1+}$, the second ciphertext $ct_{s1+}$ is converted into the third ciphertext $ct_{s1}=Convert_{LWEtoLWE'}(Extract_{MLWEtoLWE}(ct_{s1+}))$ of the first scalar value s1.

Moreover, in the secret calculation device 4H, the second secret calculation operation is performed that includes doing nothing, and the third ciphertext $ct_{s1}$ is calculated as the fourth ciphertext $ct_{s2}$ (=$ct_{s1}$) of the second scalar value s2 (=s1).

In the first terminal device 1H, the fourth ciphertext $ct_{s2}$ of the second scalar value s2 is decrypted using the first decryption key $sk_{LWE'}$ and the second scalar value s2 is calculated.

Explanation about System Configuration/Functions

Given below is the specific explanation about the secret calculation system 100H according to the third modification example.

FIG. 6 is a functional block diagram illustrating an example of the first terminal device 1H according to the third modification example. The first terminal device 1H has an identical functional configuration to FIG. 6 the first terminal device 1C according to the second modification example of the first embodiment described earlier.

FIG. 7 is a functional block diagram illustrating an example of the secret calculation device 4H according to the third modification example.

The secret calculation device 4H includes a second secret calculation processing module 47H in place of the second secret calculation processing module 47C. Other than that, the secret calculation device 4H is identical to the secret calculation device 4C according to the second modification example of the first embodiment described earlier.

The second secret calculation processing module 47H performs the second secret calculation operation, which includes doing nothing, with respect to the third ciphertext $ct_{s1}$ stored in the third data storage unit 46, and calculates the third ciphertext $ct_{s1}$ as the fourth ciphertext $ct_{s2}$ ($=ct_{s1}$) of the second scalar value s2 ($=$s1). Then, the second secret calculation processing module 47G stores the fourth ciphertext in the fourth data storage unit 48.

Meanwhile, the first terminal device 1H and the secret calculation device 4H have an identical hardware configuration to the first terminal device 1 and the secret calculation device 4, respectively, according to the first embodiment described earlier (see FIG. 5).

Explanation about Flow

Given below is the explanation of an exemplary flow of information processing performed in the first terminal device 1H and the secret calculation device 4H according to the third modification example.

FIG. 8 is a flowchart for explaining an exemplary flow of information processing performed in the first terminal device 1H and the secret calculation device 4H according to the third modification example. In the third modification example, the operations from Step S1 to Step S12 are performed in an identical manner to the operations performed in the first terminal device 1 and the secret calculation device 4 according to the first embodiment described earlier. Moreover, in the information processing performed in the first terminal device 1H and the secret calculation device 4H according to the third modification example, Step S13 is added in between Step S1 and Step S2, and Step S14 is added in between Step S2 and Step S3. The operations performed at Steps S13, S2, S14, and S3 are identical to the operations performed in the first terminal device 1C and the secret calculation device 4C according to the second modification example of the first embodiment described earlier.

In the third modification example, at Step S8, the second secret calculation processing module 47H of the secret calculation device 4H performs the second secret calculation operation, which includes doing nothing, with respect to the third ciphertext $ct_{s1}$ stored in the third data storage unit 46, and calculates the third ciphertext $ct_{s1}$ as the fourth ciphertext $ct_{s2}$ ($=ct_{s1}$) of the second scalar value s2 ($=$s1). Then, the second secret calculation processing module 47H stores the fourth ciphertext in the fourth data storage unit 48.

As explained above, in an identical manner to the ciphertext conversion processing module 45 according to the first embodiment described earlier, the ciphertext conversion processing module 45H of the secret calculation device 4H according to the third modification example implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4H and the secret calculation system 100H according to the third modification example, even when Module-LWE is adapted as the first homomorphic encryption method and LWE not dependent on the ring dimensionality of Module-LWE is adapted as the second homomorphic encryption method, it becomes possible to achieve enhancement in the secret in an identical manner to the first embodiment described earlier.

Moreover, in the secret calculation device 4H and the secret calculation system 100H according to the third modification example, a homomorphic encryption method in which Module-LWE is adapted can be implemented that has a higher level of security as compared to a homomorphic encryption method in which Ring-LWE is adapted.

In the secret calculation device 4H and the secret calculation system 100H according to the third modification example, the first secret calculation operation includes calculating the inner product of two vectors, and the second secret calculation operation includes identity calculation.

Thus, in the secret calculation system 100H according to the third modification example, in addition to achieving the effects explained earlier, it becomes possible to eliminate the need for performing a masking operation with respect to the ciphertext of the result of homomorphic inner product calculation.

Third Embodiment

In a third embodiment, as a more specific calculation operation, the explanation is given about a case in which a secret calculation system is applied for genome-wide association analysis (GWAS) representing one of the analysis methods of genome data.

GWAS represents one of the genome analysis operations. The GWAS represents a calculation operation in which single nucleotide polymorphism (SNP) data of a plurality of individuals and trait data indicating the presence or absence or a particular disorder are used as the input data; and statistics indicating the relationship between the SNP and the trait is output. The GWAS includes a step for calculating an allele frequency table, and a step for evaluating the allele frequency table. The allele frequency table represents an example of a cross-tabulation table.

If the GWAS calculation method explained in "Wenjie Lu, Yoshiji Yamada, and Jun Sakuma. "Privacy-preserving genome-wide association studies on cloud environment using fully homomorphic encryption", BMC medical informatics and decision making. Vol. 15. BioMed Central, 2015" is implemented, then the GSWA can be calculated according to a first secret calculation operation in which two vectors are treated as input and three scalar values are output, and a second secret calculation operation in which the data obtained by performing the first secret calculation operation is treated as input and at least a single scalar value is output.

Figure 9:
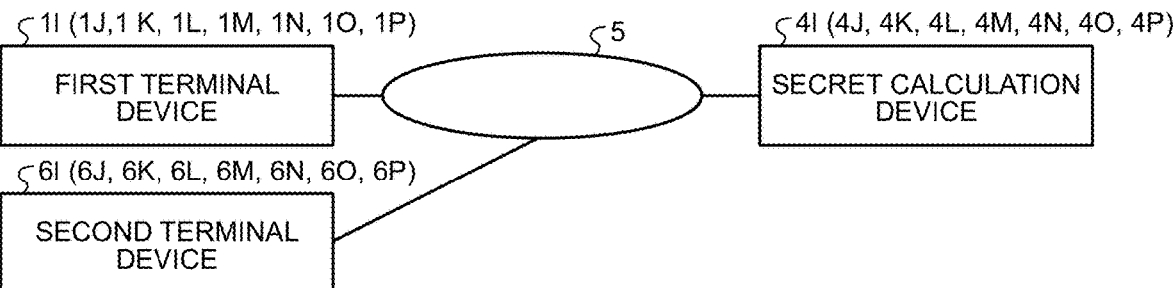
FIG. 9 is a schematic diagram illustrating a secret calculation system.

FIG. 9 is a schematic diagram illustrating an example of a secret calculation system 100I according to the third embodiment.

The secret calculation system 100I includes a first terminal device 1I, a second terminal device 6I, and a secret calculation device 4I. The first terminal device 1I, the second terminal device 6I, and the secret calculation device 4I are communicably connected to each other via the network 5. The secret calculation system 100I includes the first terminal device 1I and the second terminal device 6I in place of the first terminal device 1 according to the first embodiment. Moreover, the secret calculation system 100I includes the secret calculation device 4I in place of the secret calculation device 4. Regarding each device, the detailed explanation is given later.

The secret calculation system 100I can be configured to include one or more first terminal devices 1I and one or more second terminal devices 6. Thus, the secret calculation system 100I is not limited to a configuration including a single first terminal device 1I and a single second terminal device 6I. Moreover, the secret calculation system 100I can include one or more secret calculation devices 4I. Thus, the secret calculation system 100I is not limited to a configuration including a single secret calculation device 4I.

Explanation about Calculation Details of GWAS

In the GWAS calculated in the secret calculation system 100I according to the third embodiment, single nucleotide polymorphism (SNP) data and trait data indicating for example, the presence or absence or a particular disorder are used as the input data.

If X and Y represent symbols indicating one of the base types A, G, C, and T; then the SNP data of a single person is expressed as one of XX, XY, or YY. Moreover, according to the count of the symbol X, the SNP data of a single person can be expressed as "2", or "1", or "0". At that time, the SNP data of a single person can be expressed as the first vector $u=(u_0, u_1, \ldots, u_{l-1})$ having the length "l".

Regarding the trait data of a single person indicating the presence or absence of a particular disorder, the trait data can be expressed as "1" when there is a disorder and can be expressed as "0" when there is no disorder. At that time, the trait data for a single person can be expressed as the second vector $v=(v_0, v_1, \ldots, v_{l-1})$ having the length "l".

In the step for calculating an allele frequency table, the first vector "u" and the second vector "v" are treated as the input data, and the following scalar values are output: a scalar value "a" representing the total count of the base type X in all individuals having a disorder; a scalar value "b" representing the total count of the base type Y in all individuals having a disorder; a scalar value "c" representing the total count of the base type X in all individuals not having a disorder; and a scalar value "d" representing the total count of the base type Y in all individuals not having a disorder.

Moreover, a scalar value n1 representing the result of addition of the scalar values "a" and "c" can be calculated; a scalar value n2 representing the result of addition of the scalar values "a" and "b" can be calculated; a scalar value n3 representing the result of addition of the scalar values "c" and "d" can be calculated; and a scalar value n4 representing the result of addition of the scalar values "b" and "d" can be calculated. Moreover, a scalar value "n" representing the result of addition of the scalar values "a", "b", "c", and "d" can be calculated. Herein, the scalar value "n" is double the vector length "l" representing the input data. As a result, an allele frequency table given in Table 1 is obtained.

TABLE 1

|   | X | Y | Sum total |
|---|---|---|---|
| 1 | a | b | n2 |
| 0 | c | d | n3 |
| Sum total | n1 | n4 | n |

If the GWAS calculation method explained in "Wenjie Lu, Yoshiji Yamada, and Jun Sakuma. "Privacy-preserving genome-wide association studies on cloud environment using fully homomorphic encryption", BMC medical informatics and decision making. Vol. 15. BioMed Central, 2015" is implemented, then the scalar values "a", "b", "c," "d", n1, n2, n3, n4, and "n" can be calculated as given below in Equation (6).

$$a = \langle u, v \rangle \qquad (6)$$
$$n1 = \langle u, 1 \rangle$$
$$n2\_ = \langle v, 1 \rangle$$
$$n2 = 2 \times n2\_$$
$$n3 = n - n2$$
$$n4 = n - n1$$
$$b = n2 - a$$
$$c = n1 - a$$
$$d = n3 - c$$
$$n = n1 + n4$$

In the step for evaluating the allele frequency table, the scalar values "a", "b", "c," "d", n1, n2, n3, n4, and "n" are treated as input and chi-square testing is performed, and a scalar value sq representing the statistics is output. The scalar value sq can be calculated as given below in Equation (7).

$$Xsq = (a+b+c+d) \times (a \times d - b \times c)^2 / ((a+b) \times (a+c) \times (b+d) \times \qquad (7)$$
$$(c+d)) = n \times (a \times d - b \times c)^2 / (n1 \times n2 \times n3 \times n4)$$

Equation (7) is equivalent to Equation (A) according to the application concerned and represents chi-square testing.

In the following explanation, Xsq1 represents the scalar value indicating the numerator of the scalar value Xsq, and Xsq2 represents the scalar value indicating the denominator of the scalar value Xsq.

In the first secret calculation operation performed in the secret calculation system 100I according to the third embodiment, second ciphertexts are calculated by encrypting the plaintext of the scalar values indicating the elements of the allele frequency table (cross-tabulation table) aggregated as a result of performing the first secret calculation operation with respect to first ciphertexts which are obtained as a result of encrypting the plaintext including vectors. More specifically, in the first secret calculation operation, the first vector $u=(u_0, u_1, \ldots, u_{l-1})$ having the length "l", the second vector $v=(v_0, v_1, \ldots, v_{l-1})$ having the length "l" and representing the trait data indicating the presence or absence or a particular disorder, and the vector length "l" are treated as the input data; and the scalar value "a", the scalar value n1, and a scalar value n2 that is half of the scalar value n2 are output as the second ciphertexts. In the case of the allele frequency table given in Table 1, in the first secret calculation operation, the second ciphertexts are calculated by encrypting the plaintext of the scalar values indicating the elements of a 2×2 allele frequency table (cross-tabulation table) aggregated as a result of performing the first secret calculation operation with respect to first ciphertexts which are obtained as a result of encrypting the plaintext including vectors.

In the ciphertext conversion operation performed in the secret calculation system 100I according to the third embodiment, the second ciphertexts are converted into third ciphertexts by encrypting the plaintext of the scalar values, which represent the elements of the allele frequency table (cross-tabulation table) obtained as a result of performing encryption according to the second homomorphic encryption method. In the case of the allele frequency table given in Table 1, in the ciphertext conversion operation, the second ciphertexts are converted into third ciphertexts by encrypting the plaintext of the scalar values, which represent the elements of the 2×2 allele frequency table (cross-tabulation table) obtained as a result of performing encryption according to the second homomorphic encryption method.

In the second secret calculation operation performed in the secret calculation system 100I according to the third embodiment, as a result of performing the second secret calculation operation with respect to the third ciphertexts, fourth ciphertexts are calculated by encrypting the plaintext of the scalar value representing the valuation result of the allele frequency table (cross-tabulation table). In the case of the allele frequency table given in Table 1, in the second secret calculation operation, as a result of performing the second secret calculation operation with respect to the third ciphertexts, fourth ciphertexts are calculated by encrypting the plaintext of the scalar values representing the chi-square testing result of the 2×2 allele frequency table (cross-tabulation table). More particularly, in the second secret calculation operation, the scalar value "a", the scalar value n1, the scalar value n2, and the scalar value "n" that is double the vector length "l" are treated as input; and the scalar values Xsq1 and Xsq2 are output.

In the third embodiment, the data to be input to the first secret calculation operation and the second secret calculation operation is calculated in the confidential state. In the following explanation, the scalar value "a" is referred to as the first scalar value, the scalar value n1 is referred to as the second scalar value, the scalar value n2 is referred to as the third scalar value, the scalar value Xsq1 is referred to as the fourth scalar value, and the scalar value Xsq2 is referred to as the fifth scalar value.

Thus, in the third embodiment, the fourth scalar value Xsq1 and the fifth scalar value Xsq2 are calculated. Alternatively, it is possible to calculate the scalar value Xsq=Xsq1/Xsq2. As a result of performing calculation such as a comparison operation in which the fourth scalar value Xsq1 and the fifth scalar value Xsq2 are treated as the input, a binary value can be output that indicates the presence or absence of the relationship between the SNP data and the trait data. Moreover, in the third embodiment, by disclosing the vector length "l", the scalar value "n" that is double the vector length "l" is calculated in a disclosed manner. However, alternatively, the scalar value "n" can be calculated in a confidential manner. Meanwhile, in the third embodiment, chi-square testing is performed as an example. However, as other types of evaluation, for example, the Fisher's exact test can also be performed.

Explanation about Homomorphic Encryption Method and Ciphertext Conversion Method In the secret calculation device 4I according to the third embodiment, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4I according to the third embodiment, the first homomorphic encryption method is a homomorphic encryption method in which Ring-LWE is adapted. Moreover, in the secret calculation device 4I, the second homomorphic encryption method is a homomorphic encryption method in which LWE is adapted. Furthermore, in the secret calculation device 4I, such ciphertext conversion is implemented which is used in the homomorphic encryption method in which Ring-LWE is adapted, and which is used in the homomorphic encryption method in which LWE is adapted.

Meanwhile, the first homomorphic encryption method and the second homomorphic encryption method are only exemplary. Thus, alternatively, as the first homomorphic encryption method, it is possible to use a homomorphic encryption method in which a polynomial plaintext can be encrypted and homomorphic computation related to polynomial multiplication and polynomial addition can be defined. Herein, in the polynomials, the coefficients represent vector elements. Moreover, as the second homomorphic encryption method, it is possible to use a homomorphic encryption method in which scalar values can be encrypted, homomorphic multiplication and homomorphic addition can be performed, and ciphertext conversion can be defined with the first homomorphic encryption method.

Explanation about Secret Calculation Method for GWAS

In the secret calculation device 4I according to the third embodiment, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1I, the secret key $sk_{RLWE}$ and the public key $pK_{RLWE}$ are generated for use in the first homomorphic encryption method. Moreover, when the secret key to be used in the first homomorphic encryption method is set to $sk_{RLWE}=sk_0+sk_1x+\ldots+sk_{n-1}x^{n-1}$, the secret key to be used in the second homomorphic encryption method is set to $sk_{LWE}=(sk_0, sk_1, \ldots, sk_{n-1})$. The public key $pK_{RLWE}$ to be used in the first homomorphic encryption method is treated as the first encryption key, and the secret key $sk_{LWE}$ to be used in the second homomorphic encryption method is treated as the first decryption key.

In the first terminal device 1I and the second terminal device 6I, using the first homomorphic encryption method, the input data containing the first vector $u=(u_0, u_1, \ldots, u_{l-1})$ and the second vector $v=(v_0, v_1, \ldots, v_{l-1})$, which have the length "l" and which represent the input to the first secret calculation operation, is converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1I and the second terminal device 6I, the abovementioned polynomials are encrypted using the first encryption key $pk_{RLWE}$, and the two first ciphertexts $ct_u$ and $ct_v$ are calculated.

In the secret calculation device 4I, the first ciphertexts $ct_u$ and $ct_v$ are subjected to the first secret calculation operation in which the homomorphic multiplication $EvalMult_{RLWE}$ is performed as given in Equation (8). As a result, in the secret calculation device 4I, the following ciphertexts are obtained: a polynomial ciphertext $ct_{a+}$ in which the first scalar value "a" obtained as a result of performing encryption according to the first homomorphic encryption method represents the constant term; a polynomial ciphertext $ct_{n1+}$ in which the second scalar value n1 represents the constant term; and a polynomial ciphertext $ct_{n2\_+}$ in which the first scalar value n2 represents the constant term.

$$Ct_{a+} = EvalMult_{RLWE}(ct_u, ct_v) \qquad (8)$$

$$Ct_{n1+} = EvalMult_{RLWE}(ct_u, bw(1))$$

$$Ct_{n2\_+} = EvalMult_{RLWE}(fw(1), ct_v)$$

The functions bw(1) and fw(1) given in Equation (8) are obtained by converting the all-1 vector $(1, 1, \ldots, 1)$ having the length "l" into polynomials $fw(1)=1+1x+ \ldots +1x^{l-1}$ and $bw(1)=1-x^{n-1}-x^{n-2}- \ldots -x^{n-(l-1)}$ using the two conversion functions fw and bw.

Then, in the secret calculation device 4I, the ciphertext conversion Extract RLWEtoLWE according to the second homomorphic encryption is used and, without decrypting the second ciphertexts $ct_{a+}$, $ct_{n1+}$, and $ct_{n2\_+}$ representing the output data of the first secret calculation operation, the second ciphertexts $ct_{a+}$, $ct_{n1+}$, and $ct_{n2\_+}$ are converted into the third ciphertext $ct_a$ of the first scalar value "a", the third ciphertext $ct_{n1}$ of the second scalar value n1, and the third ciphertext $ct_{n2\_}$ of the third scalar value n2_, respectively, as given below in Equation (9).

$$ct_a = Extract_{RLWEtoLWE}(ct_{a+}) \qquad (9)$$

$$ct_{n1} = Extract_{RLWEtoLWE}(ct_{n1+})$$

$$ct_{n2\_} = -Extract_{RLWEtoLWE}(ct_{n2\_+})$$

Subsequently, in the secret calculation device 4I, the three third ciphertexts, which are obtained as a result of performing encryption according to the second homomorphic encryption method, and the scalar value "n", which is double the vector length "l", are subjected to the second secret calculation operation using the homomorphic multiplication $EvalMult_{LWE}$, the homomorphic addition $EvalAdd_{LWE}$, and homomorphic subtraction $EvalSub_{LWE}$ as given below in Equation (10). The homomorphic subtraction $EvalSub_{LWE}$ can be defined from the homomorphic addition $EvalAdd_{LWE}$. Then, in the secret calculation device 4I, the fourth ciphertext $ct_{Xsq1}$ of the fourth scalar value Xsq1 and the fourth ciphertext $ct_{Xsq2}$ of the fifth scalar value Xsq2 are calculated by performing encryption according to the second homomorphic encryption method.

$$ct_{n2} = EvalAdd_{LWE}(ct_{n2\_}, ct_{n2\_}) \qquad (10)$$

$$ct_{n3} = EvalSub_{LWE}(n, ct_{n2})$$

$$ct_{n4} = EvalSub_{LWE}(n, ct_{n1})$$

$$ct_b = EvalSub_{LWE}(ct_{n2}, ct_a)$$

$$ct_c = EvalSub_{LWE}(ct_{n1}, ct_a)$$

$$ct_d = EvalSub_{LWE}(ct_{n3}, ct_c)$$

$$ct_{tmp1} = EvalMult_{LWE}(ct_a, ct_d)$$

$$ct_{tmp2} = EvalMult_{LWE}(ct_c, ct_b)$$

$$ct_{tmp3} = EvalSub_{LWE}(ct_{tmp1}, ct_{tmp2})$$

$$ct_{tmp4} = EvalMult_{LWE}(ct_{tmp3}, ct_{tmp3})$$

$$ct_{Xsq1} = EvalMult_{LWE}(n, ct_{tmp4})$$

$$ct_{tmp5} = EvalMult_{LWE}(ct_{n1}, ct_{n2})$$

-continued $$ct_{tmp6} = EvalMult_{LWE}(ct_{n3}, ct_{n4})$$

$$ct_{Xsq2} = EvalMult_{LWE}(ct_{tmp5}, ct_{tmp6})$$

In the first terminal device 1I, the fourth ciphertext $ct_{Xsq1}$ of the fourth scalar value Xsq1 and the fourth ciphertext $ct_{Xsq2}$ of the fifth scalar value Xsq2 are decrypted using the first decryption key $sk_{LWE}$, and the fourth scalar value Xsq1 and the fifth scalar value Xsq2 are calculated.

In the case in which homomorphic division is definable in the second homomorphic encryption method, in the secret calculation device 4I, the fourth ciphertext of a sixth scalar value Xsq=Xsq1/Xsq2 can be output as the output data of the second secret calculation operation. Moreover, in the case in which homomorphic comparison is definable in the second homomorphic encryption method, in the secret calculation device 4I, a binary fourth ciphertext that indicates the presence or absence of the relationship between the SNP data and the trait data can be output as the output data of the second secret calculation operation.

Explanation about System Configuration/Functions

Given below is the specific explanation about the secret calculation system 100I according to the third embodiment.

FIG. 2 is a functional block diagram illustrating an example of the first terminal device 1I according to the third embodiment. The first terminal device 1I includes a key generation processing module 11I, an input module 21I, an encryption processing module 23I, a sending module 25I, a receiving module 31I, a decryption processing module 33I, and an output module 35I in place of the key generation processing module 11, the input module 21, the encryption processing module 23, the sending module 25, the receiving module 31, the decryption processing module 33, and the output module 35. Other than that, the first terminal device 1I is identical to the first terminal device 1 according to the first embodiment described earlier.

The key generation processing module 11I generates the public key $pk_{RLWE}$ and the secret key $sk_{RLWE}$ to be used in the first homomorphic key encryption key. Then, from the secret key $sk_{RLWE}$ to be used in the first homomorphic key encryption key, the key generation processing module 11I generates the secret key $sk_{LWE}$ to be used in the second homomorphic key encryption key. The key generation processing module 11I treats the public key $pK_{RLWE}$, which is to be used in the first homomorphic encryption method, as the first encryption key, and treats the secret key $sk_{LWE}$, which is to be used in the second homomorphic encryption method, as the first decryption key. The key generation processing module 11I stores the first encryption key in the encryption key storage unit 12, and stores the first decryption key in the decryption key storage unit 13.

The sending module 25I performs the operation of sending information in an identical manner to the sending module 25, and also sends the encryption key $pk_{RLWE}$, which is stored in the encryption key storage unit 12, to the second terminal device 6I.

The input module 21I obtains, from the computer connected to the first terminal device 1I, the first vector $u=(u_0, u_1, \ldots, u_{l-1})$ that has the length "l" and that is the SNP data representing the input data for the first secret calculation operation, and stores that data in the first data storage unit 22.

The encryption processing module 23I converts the first vector "u", which is stored in the first data storage unit 22, into the polynomial $fw(u)=u_0+u_1x+ \ldots +u_{l-1}x^{l-1}$ according to the first conversion function fw. Then, the encryption processing module 23I encrypts the polynomial fw(u) using the first encryption key $pk_{RLWE}$ stored in the encryption key storage unit 12, and calculates the first ciphertext $ct_u$ encrypted by the first homomorphic encryption method. Then, the encryption processing module 23I stores the first ciphertext in the second data storage unit 24.

The sending module 25I sends the first ciphertext $ct_u$, which is stored in the second data storage unit 24, and the vector length "l" to the secret calculation device 4I.

The receiving module 31I receives, from the secret calculation device 4I, the fourth ciphertext $ct_{Xsq1}$ of the fourth scalar value Xsq1 and the fourth ciphertext $ct_{Xsq2}$ of the fifth scalar value Xsq2 that are obtained as a result of performing encryption according to the second homomorphic encryption method, and stores the fourth ciphertexts in the third data storage unit 32.

The decryption processing module 33I decrypts the fourth ciphertexts $ct_{Xsq1}$ and $ct_{Xsq2}$, which are stored in the third data storage unit 32, using the first decryption key $sk_{LWE}$ that is stored in the decryption key storage unit 13, and calculates the fourth scalar values Xsq1 and the fifth scalar values Xsq2. Then, the decryption processing module 33I stores the fourth scalar value and the fifth scalar value in the fourth data storage unit 34.

The output module 35I outputs the fourth scalar value Xsq1 and the fifth scalar value Xsq2 to the computer connected to the first terminal device 1I.

Meanwhile, the input module 21I can obtain the polynomial fw(u) from the computer connected to the first terminal device 1I, and store the polynomial fw(u) in the first data storage unit 22. Moreover, the encryption processing module 23I can calculate the first ciphertext $ct_u$ by encrypting the polynomial fw(u), which is stored in the first data storage unit 22, using the first encryption key $pk_{RLWE}$ stored in the encryption key storage unit 12; and can store the ciphertext $ct_u$ in the second data storage unit 24.

Figure 10:
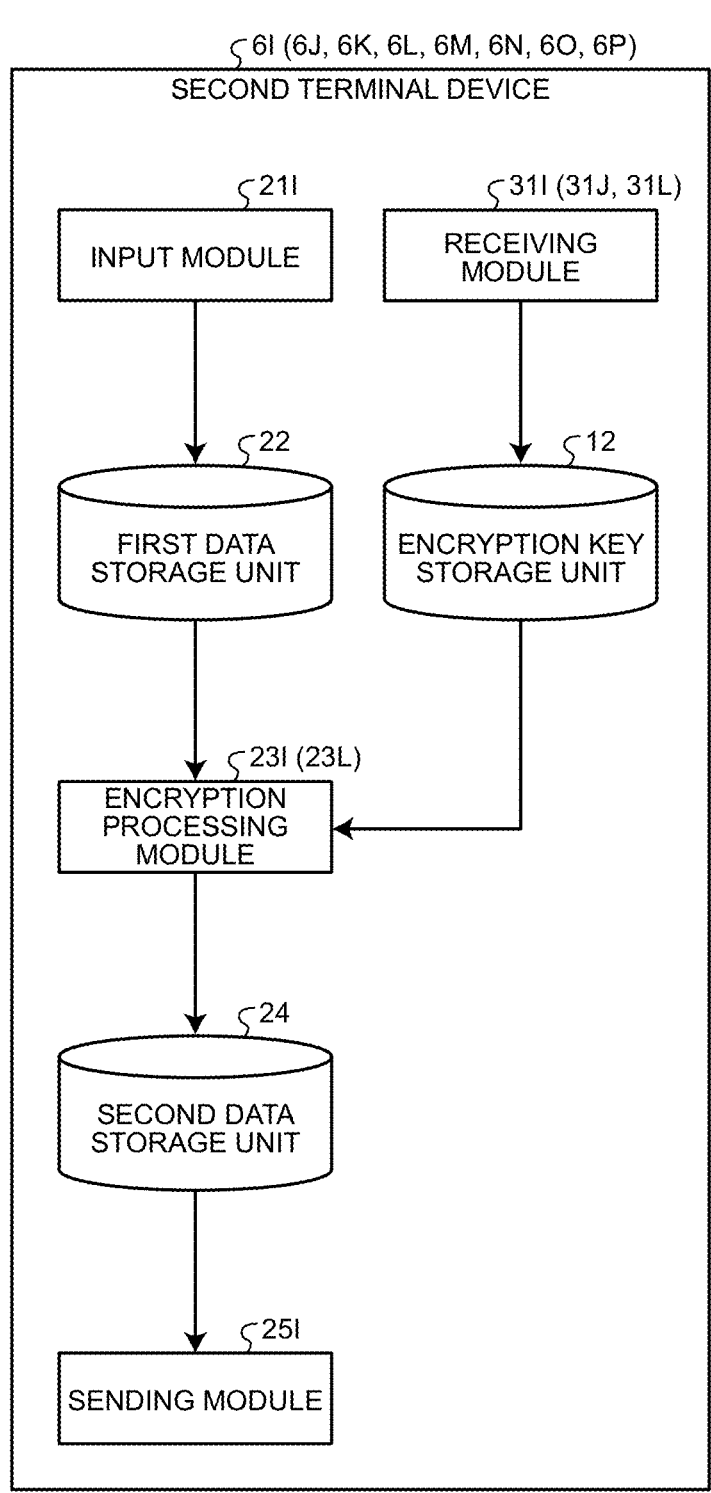
FIG. 10 is a functional block diagram illustrating a second terminal device.

FIG. 10 is a functional block diagram illustrating an example of the second terminal device 6I according to the third embodiment. The second terminal device 6I includes the input module 21I, the first data storage unit 22, the encryption processing module 23I, the second data storage unit 24, the sending module 25I, the receiving module 31I, and the encryption key storage unit 12.

The receiving module 31I receives the first encryption key $pk_{RLWE}$ from the first terminal device 1I and stores it in the encryption key storage unit 12.

The input module 21I obtains, from the computer connected to the second terminal device 6I, the second vector $v=(v_0, v_1, \ldots, v_{l-1})$ that has the length "l" and that is the trait data representing the input data for the first secret calculation operation, and stores the second vector "v" in the first data storage unit 22.

The encryption processing module 23I converts the second vector "v", which is stored in the first data storage unit 22, into the polynomial $bw(v)=v_0-v_1x^{n-1}-v_2x^{n-2}- \ldots - v_{l-1}x^{n-(l-1)}$ using the second conversion function bw. Then, the encryption processing module 23I encrypts the polynomial bw(v) using the first encryption key $pK_{RLWE}$ that is stored in the encryption key storage unit 12, and calculates the first ciphertext $ct_v$ encrypted by the first homomorphic encryption method. Subsequently, the encryption processing module 23I stores the first ciphertext in the second data storage unit 24.

The sending module 25I sends the first ciphertext $ct_v$, which is stored in the second data storage unit 24, and the vector length "l" to the secret calculation device 4I.

Meanwhile, alternatively, the input module 21I can obtain the polynomial bw(v) from the computer connected to the first terminal device 1I, and store the polynomial bw(v) in the first data storage unit 22. Moreover, the encryption processing module 23I can calculate the first ciphertext $ct_v$ by encrypting the polynomial bw(v), which is stored in the first data storage unit 22, using the first encryption key $pk_{RLWE}$ stored in the encryption key storage unit 12; and can store the ciphertext $ct_v$ in the second data storage unit 24.

FIG. 3 is a functional block diagram illustrating an example of the secret calculation device 4I according to the third embodiment.

The secret calculation device 4I includes a receiving module 41I, a first secret calculation processing module 43I, a ciphertext conversion processing module 45I, a second secret calculation processing module 47I, and a sending module 49I in place of the receiving module 41, the first secret calculation processing module 43, the ciphertext conversion processing module 45, the second secret calculation processing module 47, and the sending module 49, respectively. Other than that, the secret calculation device 4I is identical to the secret calculation device 4 according to the first embodiment described earlier.

The receiving module 41I receives, from the first terminal device 1I and the second terminal device 6I, the first ciphertext $ct_u$ in which the first vector "u" that is the SNP data representing the input data for the first secret calculation operation is treated as a polynomial, and the first ciphertext $ct_v$ in which the second vector "v" representing the trait data is treated as a polynomial. Then, the receiving module 41I stores the first ciphertexts in the first data storage unit 42.

The first secret calculation processing module 43I performs the first secret calculation operation with respect to the first ciphertexts $ct_u$ and $ct_v$ using the homomorphic multiplication $EvalMult_{RLWE}$. As a result of performing the first secret calculation operation, the first secret calculation processing module 43I calculates the following ciphertexts: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2 as the constant term.

The first secret calculation processing module 43I stores the second ciphertexts in the second data storage unit 44.

The ciphertext conversion processing module 45I uses the ciphertext conversion $Extract_{RLWEtoLWE}$ and, without decrypting the second ciphertexts $ct_{a+}$, $ct_{n1+}$, and $ct_{n2\_+}$, converts the second ciphertexts $ct_{a+}$, $ct_{n1+}$, and $ct_{n2\_+}$ into the third ciphertext $ct_a$ of the first scalar value "a", the third ciphertext $ct_{n1}$ of the second scalar value n1, and the third ciphertext $ct_{n2\_}$ of the third scalar value n2, respectively. Then, the ciphertext conversion processing module 45I stores the third ciphertexts in the third data storage unit 46.

The second secret calculation processing module 47I treats the third ciphertexts $ct_a$, $ct_{n1}$, and $ct_{n2}$ and the scalar value "n" that is double the vector length "l" as the input, and performs the second secret calculation operation using the homomorphic multiplication $EvalMult_{LWE}$, the homomorphic addition $EvalAdd_{LWE}$, and the homomorphic subtraction $EvalSub_{LWE}$. As a result of performing the second secret calculation operation, the second secret calculation processing module 47I calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47I stores the fourth ciphertexts in the fourth data storage unit 48.

The sending module 49I sends the fourth ciphertexts $ct_{Xsq1}$ and $ct_{Xsq2}$, which are stored in the fourth data storage unit 48, to the first terminal device 1I.

Meanwhile, the first terminal device 1I and the second terminal device 6I have an identical hardware configuration to the first terminal device 1 according to the first embodiment described earlier (see FIG. 5), and the secret calculation device 4I has an identical hardware configuration to the secret calculation device 4 according to the first embodiment described earlier (see FIG. 5).

Explanation about Flow

Given below is the explanation of an exemplary flow of information processing performed in the first terminal device 1I, the second terminal device 6I, and the secret calculation device 4I according to the third embodiment.

Figure 11:
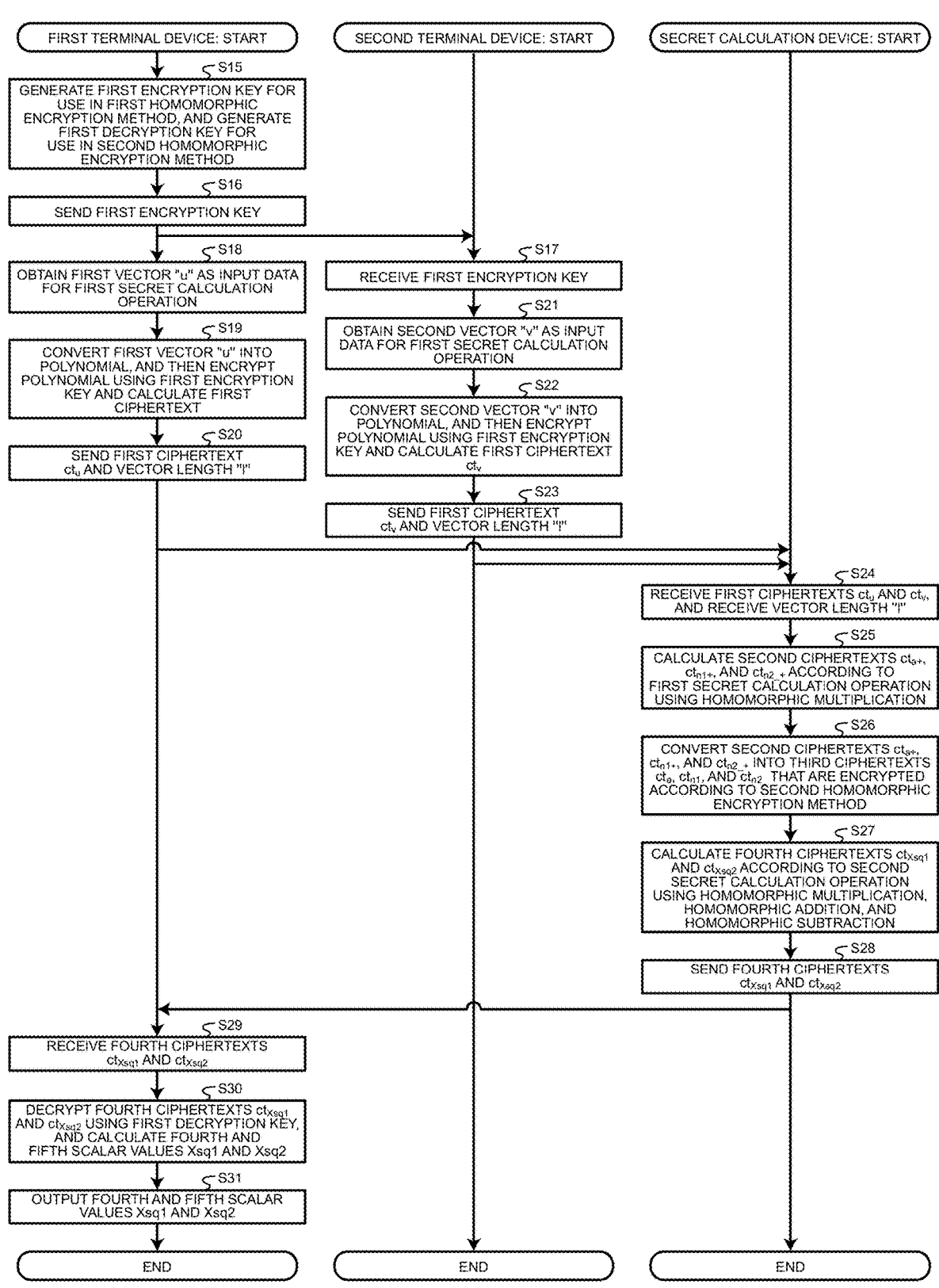
FIG. 11 is a flowchart illustrating an exemplary flow of information processing performed in the first terminal device, the second terminal device, and the secret calculation device.

FIG. 11 is a flowchart illustrating an exemplary flow of information processing performed in the first terminal device 1I, the second terminal device 6I, and the secret calculation device 4I according to the third embodiment.

At Step S15, the key generation processing module 11I of the first terminal device 1I generates the public key $pK_{RLWE}$ and the secret key $sk_{RLWE}$ to be used in the first homomorphic encryption method. Then, from the secret key $sk_{RLWE}$ to be used in the first homomorphic encryption method, the key generation processing module 11I calculates the secret key $sk_{LWE}$ to be used in the second homomorphic encryption method. The key generation processing module 11I treats the public key $pk_{RLWE}$, which is to be first homomorphic encryption method, as the first encryption key and treats the secret key $sk_{LWE}$, which is to be used in the second homomorphic encryption method, as the first decryption key. Then, the key generation processing module 11I stores the first encryption key in the encryption key storage unit 12 and stores the first decryption key in the decryption key storage unit 13.

At Step S16, the sending module 25I of the first terminal device 1I sends the first encryption key $pk_{RLWE}$, which is stored in the encryption key storage unit 12, to the second terminal device 6I.

At Step S17, the receiving module 31I of the second terminal device 6I receives the first encryption key $pK_{RLWE}$ from the first terminal device 1I, and stores the first encryption key $pk_{RLWE}$ in the encryption key storage unit 12.

At Step S18, the input module 21I of the first terminal device 1I obtains, from the computer connected to the first terminal device 1I, the first vector $u=(u_0, u_1, \ldots, u_{l-1})$ that has the length "l" and that is the SNP data representing the input data for the first secret calculation operation, and stores the first vector "u" in the first data storage unit 22.

At Step S19, the encryption processing module 23I of the first terminal device 1I converts the first vector "u", which is stored in the first data storage unit 22, into the polynomial $fw(u)=u_0+u_1x+ \ldots +u_{l-1}x^{l-1}$ according to the first conversion function fw. Then, the encryption processing module 23I encrypts the polynomial $fw(u)$ using the first encryption key $pk_{RLWE}$ and calculates the first ciphertext $ct_u$. Subsequently, the encryption processing module 23I stores the first ciphertext in the second data storage unit 24.

At Step S20, the sending module 25I of the first terminal device 1I sends the first ciphertext $ct_u$, which is stored in the second data storage unit 24, and the vector length "l" to the secret calculation device 4I.

At Step S21, the input module 21I of the second terminal device 6I obtains, from the computer connected to the second terminal device 6I, the second vector $v=(v_0, v_1, \ldots, v_{l-1})$ that has the length "l" and that is the trait data representing the input data for the first secret calculation operation, and stores the second vector "v" in the first data storage unit 22.

At Step S22, the encryption processing module 23I of the second terminal device 6I converts the second vector "v", which is stored in the first data storage unit 22, into the polynomial $bw(v)=v_0-v_1x^{n-1}-v_2x^{n-2}- \ldots -v_{l-1}x^{n-(l-1)}$ using the second conversion function bw. Then, the encryption processing module 23I encrypts the polynomial $bw(v)$ using the first encryption key $pk_{RLWE}$, and calculates the first ciphertext $ct_v$. Subsequently, the encryption processing module 23I stores the first ciphertext in the second data storage unit 24.

At Step S23, the sending module 25I of the second terminal device 6I sends the first ciphertext $ct_v$ and the vector length "l" to the secret calculation device 4I.

At Step S24, the receiving module 41I of the secret calculation device 4I receives, from the first terminal device 1I and the second terminal device 6I, the first ciphertext $ct_u$ in which the first vector "u" that is the SNP data is treated as a polynomial, and the first ciphertext $ct_v$ in which the second vector "v" representing the trait data is treated as a polynomial. Then, the receiving module 41I stores the first ciphertexts in the first data storage unit 42.

At Step S25, the first secret calculation processing module 43I of the secret calculation device 4I performs the first secret calculation operation with respect to the first ciphertexts $ct_u$ and $ct_v$ using the homomorphic multiplication $EvalMult_{RLWE}$; and calculates the following ciphertexts: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term. Then, the first secret calculation processing module 43I stores the second ciphertexts in the second data storage unit 44.

At Step S26, the ciphertext conversion processing module 45I of the secret calculation device 4I uses the ciphertext conversion $Extract_{RLWEtoLWE}$ and, without decrypting the second ciphertexts $ct_{a+}$, $ct_{n1+}$, and $ct_{n2\_+}$, converts the second ciphertexts $ct_{a+}$, $ct_{n1+}$, and $ct_{n2\_+}$ into the third ciphertext $ct_a$ of the first scalar value "a", the third ciphertext $ct_{n1}$ of the second scalar value n1, and the third ciphertext $ct_{n2\_}$ of the third scalar value n2_, respectively. Then, the ciphertext conversion processing module 45I stores the third ciphertexts in the third data storage unit 46.

At Step S27, the second secret calculation processing module 47I of the secret calculation device 4I performs the second secret calculation operation with respect to the third ciphertexts $ct_a$, $ct_{n1}$, and $ct_{n2\_}$ and the scalar value "n", which is double the vector length "l", using the homomorphic multiplication $EvalMult_{LWE}$, the homomorphic addition $EvalAdd_{LWE}$, and the homomorphic subtraction $EvalSub_{LWE}$. As a result of performing the second secret calculation operation, the second secret calculation processing module 47I calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47I stores the fourth ciphertexts in the fourth data storage unit 48.

At Step S28, the sending module 25I of the secret calculation device 4I sends the fourth ciphertexts $ct_{Xsq1}$ and $ct_{Xsq2}$ to the first terminal device 1I.

At Step S29, the receiving module 31I of the first terminal device 1I receives the fourth ciphertext $ct_{Xsq1}$ of the fourth scalar value Xsq1 and the fourth ciphertext $ct_{Xsq2}$ of the fifth scalar value Xsq2 from the secret calculation device 4I, and stores them in the third data storage unit 32.

At Step S30, the decryption processing module 33I of the first terminal device 1I decrypts the fourth ciphertexts $ct_{Xsq1}$ and $ct_{Xsq2}$ using the first decryption key $sk_{LWE}$, and calculates the fourth scalar values Xsq1 and the fifth scalar values Xsq2. Then, the decryption processing module 33I stores the fourth scalar value and the fifth scalar value in the fourth data storage unit 48.

At Step S31, the output module 35I of the first terminal device 1I outputs the fourth scalar value Xsq1 and the fifth scalar value Xsq2 to the computer connected to the first terminal device 1I.

As explained above, in an identical manner to the ciphertext conversion processing module 45 according to the first embodiment described earlier, the ciphertext conversion processing module 45I of the secret calculation device 4I according to the third embodiment implements the ciphertext conversion method that is defined between the first homomorphic encryption method and the second homomorphic encryption method; and, without decrypting the second ciphertexts, converts the second ciphertexts into third ciphertexts that are obtained as a result of performing encryption according to the second homomorphic encryption method. Thus, in the secret calculation device 4I and the secret calculation system 100I according to the third embodiment, it becomes possible to achieve enhancement in the secret in an identical manner to the first embodiment described earlier.

Moreover, in the secret calculation device 4I and the secret calculation system 100I according to the third embodiment, as a result of using the ciphertext conversion defined between the first homomorphic encryption method and the second homomorphic encryption method, the ciphertexts of the first scalar value "a", the second scalar value n1, and the third scalar value n2 representing the output data for the first secret calculation operation in the GWAS can be calculated without having to decrypt the ciphertexts. A cross-tabulation table such as an allele frequency table can be directly calculated from at least one of the first scalar value "a", the second scalar value n1, and the third scalar value n2. Since those scalar values are kept confidential, it is believed that a contribution can be made toward keeping the cross-tabulation table confidential.

Meanwhile, as an example, as illustrated in FIG. 2, the first terminal device 1I according to the third embodiment includes the key generation processing module 11I, the encryption key storage unit 12, the decryption key storage unit 13, the input module 21I, the first data storage unit 22, the encryption processing module 23I, the second data storage unit 24, the sending module 25I, the receiving module 31I, the third data storage unit 32, the decryption processing module 33I, the fourth data storage unit 34, the an output module 35I. Alternatively, in an identical manner to the first terminal device 1 according to the first embodiment, the first terminal device 1I can be configured to include only some of those constituent elements. Moreover, a plurality of external terminal devices installed separately from the first terminal device 1I can be configured to include the constituent elements not included in the first terminal device 1I. Furthermore, the first terminal device 1I can be configured to include at least either the key generation processing module 11I, or the encryption processing module 23I, or the decryption processing module 33I.

First Modification Example of Third Embodiment

In a first modification example of the third embodiment, the explanation is given about an example in which the first homomorphic encryption method is a homomorphic encryption method in which Module-LWE is adapted, and the second homomorphic encryption method is a homomorphic encryption method in which LWE is adapted.

FIG. 9 is a schematic diagram illustrating an example of a secret calculation system 100J according to the first modification example.

The secret calculation system 100J includes a first terminal device 1J, a second terminal device 6J, and a secret calculation device 4J. The first terminal device 1J, the second terminal device 6J, and the secret calculation device 4J are communicably connected to each other via the network 5.

Explanation about Details of Secret Calculation Operations

Firstly, the explanation is given about the details of secret calculation operations including the first secret calculation operation and the second secret calculation operation according to the first modification example.

In the secret calculation device 4J according to the first modification example, in an identical manner to the secret calculation device 4I according to the third embodiment, in the first secret calculation operation, the first vector $u=(u_0, u_1, \ldots, u_{l-1})$, which has the length "l" and which represents the SNP data, and the second vector $V=(v_0, v_1, \ldots, v_{l-1})$, which has the length "l" and which represents the trait data indicating the presence or absence or a particular disorder, are treated as the input data; and the first scalar value "a", the second scalar value n1, and the third scalar value n2_ are output. Moreover, in the secret calculation device 4J, in the second secret calculation operation, the first scalar value "a", the second scalar value n1, and the third scalar value n2_ are treated as the input; and the fourth scalar value Xsq1 and the fifth scalar value Xsq2 are output that represent the chi-square statistics indicating the relationship between the SNP data and the trait data. Meanwhile, in the secret calculation device 4J according to the first modification example, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4J according to the first modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4J according to the first modification example, the first homomorphic encryption method is a homomorphic encryption method in which Module-LWE is adapted. Moreover, in the secret calculation device 4J according to the first modification example, the second homomorphic encryption method is a homomorphic encryption method in which LWE is adapted. Furthermore, in the secret calculation device 4J, such ciphertext conversion is implemented which is used in the homomorphic encryption method in which Module-LWE is adapted, and which is used in the homomorphic encryption method in which LWE is adapted.

Explanation about Secret Calculation Method

In the secret calculation system 100J according to the first modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1J, the secret key $sk_{MLWE}$ and the public key $pk_{MLWE}$ are generated for use in the first homomorphic encryption method. Moreover, the secret key to be used in the first homomorphic encryption method is set to $sk_{MLWE}=(sk_0, sk_1, \ldots, sk_{k-1})$. When $sk_i=sk_{i,0}+sk_{i,1}x+\ldots+sk_{i,n-1}x^{n-1}$ holds true, the secret key to be used in the second homomorphic encryption method becomes equal to $sk_{LWE}=(sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$.

In the first terminal device 1J, the public key $pk_{MLWE}$ to be used in the first homomorphic encryption method is treated as the first encryption key, and the secret key $sk_{LWE}$ to be used in the second homomorphic encryption method is treated as the first decryption key. Alternatively, the first terminal device 1J can use the secret key $sk_{MLWE}$, which is to be used in the first homomorphic encryption method, as the first encryption key.

In the first terminal device 1J and the second terminal device 6J, the first vector $u=(u_0, u_1, \ldots, u_{l-1})$ and the second vector $v=(v_0, v_1, \ldots, v_{l-1})$, which have the length "l", are converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions $fw(v)$ and $bw(u)$ can also be used. Then, in the first terminal device 1J and the second terminal device 6J, the abovementioned polynomials are encrypted using the first encryption key $pk_{MLWE}$, and the two first ciphertexts $ct_u$ and $ct_v$ are calculated.

In the secret calculation device 4J, the first ciphertexts $ct_u$ and $ct_v$ are subjected to the first secret calculation operation in which the homomorphic multiplication $EvalMult_{MLWE}$ is performed as given in Equation (8). Then, in the secret calculation device 4J, as a result of performing the calculation operations, the following ciphertexts are calculated: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term.

In the secret calculation device 4J, the ciphertext conversion $Extract_{MLWEtoLWE}$ is used and, without decrypting the second ciphertexts $ct_{a+}$, $ct_{n1+}$, and $ct_{n2\_+}$, the second ciphertexts $ct_{a+}$, $ct_{n1+}$, and $ct_{n2\_+}$ are converted into the third ciphertext $ct_a$ of the first scalar value "a", the third ciphertext $ct_{n1}$ of the second scalar value n1, and the third ciphertext $ct_{n2\_}$ of the third scalar value n2_, respectively, as given in Equation (9).

In the secret calculation device 4J, the three third ciphertexts and the scalar value "n", which is double the vector length "l", are subjected to the second secret calculation operation using the homomorphic multiplication $EvalMult_{LWE}$, the homomorphic addition $EvalAdd_{LWE}$, and the homomorphic subtraction $EvalSub_{LWE}$ as given in Equation (10). As a result of performing the second secret calculation operation, in the secret calculation device 4J, the fourth ciphertext $ct_{Xsq1}$ of the fourth scalar value Xsq1 and the fourth ciphertext $ct_{Xsq2}$ of the fifth scalar value Xsq2 are calculated.

In the first terminal device 1J, the fourth ciphertext $ct_{Xsq1}$ of the fourth scalar value Xsq1 and the fourth ciphertext $ct_{Xsq2}$ of the fifth scalar value Xsq2 are decrypted using the first decryption key $sk_{LWE}$, and the fourth scalar value Xsq1 and the fifth scalar value Xsq2 are calculated.

In the case in which homomorphic division is definable in the second homomorphic encryption method, in the secret calculation device 4J, the fourth ciphertext of the sixth scalar value Xsq=Xsq1/Xsq2 can be output as the output data of the second secret calculation operation. Moreover, in the case in which homomorphic comparison is definable in the second homomorphic encryption method, in the secret calculation device 4J, a binary fourth ciphertext that indicates the presence or absence of the relationship between the SNP data and the trait data can be output as the output data of the second secret calculation operation.

Explanation about System Configuration/Functions

Given below is the specific explanation about the secret calculation system 100J according to the first modification example.

FIG. 2 is a functional block diagram illustrating an example of the first terminal device 1J according to the first modification example. The first terminal device 1J includes a key generation processing module 11J, an encryption processing module 23J, and a sending module 25J in place of the key generation processing module 11I, the encryption processing module 23I, and the sending module 25I. Other than that, the first terminal device 1J is identical to the first terminal device 1I according to the third embodiment described above.

The key generation processing module 11J generates the public key $pk_{MLWE}$ and the secret key $sk_{MLWE}$ to be used in the first homomorphic key encryption key. The key generation processing module 11J sets the secret key $sk_{MLWE}$, which is to be used in the first homomorphic encryption method, to $sk_{MLWE}=(sk_0, sk_1, \ldots, sk_{k-1})$. When $sk_i=sk_{i,0}+sk_{i,1}x+\ldots+sk_{i,n-1}x^{n-1}$ holds true, the secret key to be used in the second homomorphic encryption method becomes equal to $sk_{LWE}=(sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$.

The key generation processing module 11J uses the public key $pk_{MLWE}$, which is to be used in the first homomorphic encryption method, as the first encryption key; and uses the secret key $sk_{LWE}$, which is to be used in the second homomorphic encryption method, as the first decryption key. Alternatively, the key generation processing module 11J can use the secret key $sk_{MLWE}$, which is to be used in the first homomorphic encryption method, as the first encryption key. Then, the key generation processing module 11J stores the first encryption key in the encryption key storage unit 12, and stores the first decryption key in the decryption key storage unit 13.

The sending module 25J sends the first encryption key $pk_{MLWE}$, which is stored in the encryption key storage unit 12, to the second terminal device 6J.

The encryption processing module 23J converts the first vector "u", which is stored in the first data storage unit 22, into the polynomial $fw(u)=u_0+u_1x+\ldots+u_{l-1}x^{l-1}$ according to the first conversion function fw. Then, the encryption processing module 23J encrypts the polynomial $fw(u)$ using the first encryption key $pk_{MLWE}$, and calculates the first ciphertext $ct_u$ encrypted by the first homomorphic encryption method. Then, the encryption processing module 23J stores the first ciphertext in the second data storage unit 24.

Meanwhile, the input module 21I can obtain the polynomial $fw(u)$ from the computer connected to the first terminal device 1I, and store the polynomial $fw(u)$ in the first data storage unit 22. Moreover, the encryption processing module 23J can encrypt the polynomial $fw(u)$, which is stored in the first data storage unit 22, using the first encryption key $pk_{MLWE}$, which is stored in the encryption key storage unit 12, and calculate the first ciphertext $ct_u$; and store the first ciphertext $ct_u$ in the second data storage unit 24.

FIG. 10 is a functional block diagram illustrating an example of the second terminal device 6J according to the first modification example. The second terminal device 6J includes an encryption processing module 23J and a receiving module 31J in place of the encryption processing module 23I and the receiving module 31I. Other than that, the second terminal device 6J is identical to the second terminal device 6I according to the third embodiment described above.

The receiving module 31J receives the first encryption key $pk_{MLWE}$ from the first terminal device 1J and stores it in the encryption key storage unit 12.

The encryption processing module 23J converts the second vector "v", which is stored in the first data storage unit 22, into the polynomial $bw(v)=v_0-v_1x^{n-1}-v_2x^{n-2} \ldots v_{l-1} x^{n-(l-1)}$ using the second conversion function bw. Then, the encryption processing module 23J encrypts the polynomial bw(v) using the first encryption key $pk_{MLWE}$, and calculates the first ciphertext $ct_v$. Subsequently, the encryption processing module 23J stores the first ciphertext in the second data storage unit 24.

Meanwhile, the input module 21J can obtain the polynomial bw(v) from the computer connected to the second terminal device 6J, and store the polynomial bw(v) in the first data storage unit 22. Moreover, the encryption processing module 23J can encrypt the polynomial bw(v), which is stored in the first data storage unit 22, using the first encryption key $pk_{MLWE}$, which is stored in the encryption key storage unit 12, and calculate the first ciphertext $ct_v$. Then, the encryption processing module 23J can store the first ciphertext $ct_v$ in the second data storage unit 24.

FIG. 3 is a functional block diagram illustrating an example of the secret calculation device 4J according to the first modification example.

The secret calculation device 4J includes a first secret calculation processing module 43J and a ciphertext conversion processing module 45J in place of the first secret calculation processing module 43I and the ciphertext conversion processing module 45I, respectively. Other than that, the secret calculation device 4J is identical to the secret calculation device 4I according to the third embodiment described above.

The first secret calculation processing module 43J performs the first secret calculation operation with respect to the first ciphertexts $ct_u$ and $ct_v$, which are stored in the first data storage unit 42, using the homomorphic multiplication $EvalMult_{MLWE}$ functioning as the homomorphic inner product computation based on the first homomorphic encryption method. Then, the first secret calculation processing module 43J calculates the following ciphertexts obtained as a result of performing encryption according to the first secret calculation operation: the polynomial ciphertext $ct_{a+}$ having the first scalar value "a" as the constat term, the polynomial ciphertext $ct_{n1+}$ having the second scalar value n1 as the constat term, and the polynomial ciphertext $ct_{n2\_+}$ having the third scalar value n2_ as the constat term. Then, the first secret calculation processing module 43J stores the second ciphertexts in the second data storage unit 44.

The ciphertext conversion processing module 45J uses the ciphertext conversion $Extract_{MLWEtoLWE}$ and, without decrypting the second ciphertexts $ct_{a+}$, $ct_{n1+}$, and $ct_{n2\_+}$, converts the second ciphertexts $ct_{a+}$, $ct_{n1+}$, and $ct_{n2\_+}$ into the third ciphertext $ct_a$ of the first scalar value "a", the third ciphertext $ct_{n1}$ of the second scalar value n1, and the third ciphertext $ct_{n2\_}$ of the third scalar value n2_, respectively. Then, the ciphertext conversion processing module 45J stores the third ciphertexts in the third data storage unit 46.

Meanwhile, the first terminal device 1J and the second terminal device 6J have an identical hardware configuration to the first terminal device 1 according to the first embodiment described earlier (see FIG. 5), and the secret calculation device 4J has an identical hardware configuration to the secret calculation device 4 according to the first embodiment described earlier (see FIG. 5).

Explanation about Flow

Given below is the explanation of an exemplary flow of information processing performed in the first terminal device 1J, the second terminal device 6J, and the secret calculation device 4J according to the first modification example.

FIG. 11 is a flowchart illustrating an exemplary flow of information processing performed in the first terminal device 1J, the second terminal device 6J, and the secret calculation device 4J according to the first modification example. In the first modification example, the operations from S15 to Step S31 are performed in an identical manner to the operations performed in the first terminal device 1I, the second terminal device 6I, and the secret calculation device 4I according to the third embodiment.

However, in the first modification example, at Step S15, the key generation processing module 11J of the first terminal device 1J generates the public key $pk_{MLWE}$ and the secret key $sk_{MLWE}$ to be used in the first homomorphic encryption method. The key generation processing module 11J sets the secret key $sk_{MLWE}$, Which is to be used in the first homomorphic encryption method, to $sk_{MLWE}=(sk_0, sk_1, \ldots, sk_{k-1})$. When $sk_i=sk_{i,\,0}+sk_{i,\,1}x+ \ldots +sk_{i,\,n-1}x^{n-1}$ holds true, the secret key to be used in the second homomorphic encryption method becomes equal to $sk_{LWE}=(sk_{0,\,0}, sk_{0,\,1}, \ldots, sk_{0,\,n-1}, sk_{1,\,0}, sk_{1,\,1}, \ldots, sk_{1,\,n-1}, \ldots, sk_{k-1,\,0}, sk_{k-1,\,1}, \ldots, sk_{k-1,\,n-1})$. The key generation processing module 11J uses the public key $pk_{MLWE}$, which is to be used in the first homomorphic encryption method, as the first encryption key; and uses the secret key $sk_{LWE}$, which is to be used in the second homomorphic encryption method, as the first decryption key. Meanwhile, the secret key $sk_{MLWE}$ to be used in the first homomorphic encryption method can alternatively be used as the first encryption key. Then, the key generation processing module 11J stores the first encryption key in the encryption key storage unit 12, and stores the first decryption key in the decryption key storage unit 13.

At Step S16, the sending module 25J of the first terminal device 1J sends the first encryption key $pk_{MLWE}$, which is stored in the encryption key storage unit 12, to the second terminal device 6J.

At Step S17, the receiving module 31J of the second terminal device 6J receives the first encryption key $pk_{MLWE}$ from the first terminal device 1J, and stores the first encryption key $pk_{MLWE}$ in the encryption key storage unit 12.

At Step S19, the encryption processing module 23J of the first terminal device 1J converts the first vector "u", which is stored in the first data storage unit 22, into the polynomial $fw(u)=u_0+u_1x+ \ldots +u_{l-1}x^{l-1}$ according to the first conversion function fw. Then, the encryption processing module 23J encrypts the polynomial fw(u) using the first encryption key $pk_{MLWE}$ and calculates the first ciphertext $ct_u$. Subsequently, the encryption processing module 23J stores the first ciphertext in the second data storage unit 24.

At Step S22, the encryption processing module 23J of the second terminal device 6J converts the second vector "v", which is stored in the first data storage unit 22, into the polynomial $bw(v)=v_0-v_1x^{n-1}-v_2x^{n-2}- \ldots -v_{l-1}x^{n-(l-1)}$ using the second conversion function bw. Then, the encryption processing module 23J encrypts the polynomial bw(v) using the first encryption key $pk_{MLWE}$, and calculates the first ciphertext $ct_v$. Subsequently, the encryption processing module 23J stores the first ciphertext in the second data storage unit 24.

At Step S25, the first secret calculation processing module 43J of the secret calculation device 4J performs the first secret calculation operation with respect to the first ciphertexts $ct_u$ and $ct_v$ using the homomorphic multiplication $EvalMult_{MLWE}$; and calculates the following ciphertexts: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term. Then, the first secret calculation processing module 43J stores the second ciphertexts in the second data storage unit 44.

At Step S26, the ciphertext conversion processing module 45J of the secret calculation device 4J uses the ciphertext conversion $Extract_{MLWEtoLWE}$ and, without decrypting the second ciphertexts $ct_{a+}$, $ct_{n1+}$, and $ct_{n2\_+}$, converts the second ciphertexts $ct_{a+}$, $ct_{n1+}$, and $ct_{n2\_+}$ into the third ciphertext $ct_a$ of the first scalar value "a", the third ciphertext $ct_{n1}$ of the second scalar value n1, and the third ciphertext $ct_{n2\_}$ of the third scalar value n2_, respectively. Then, the ciphertext conversion processing module 45J stores the third ciphertexts in the third data storage unit 46.

As explained above, in an identical manner to the ciphertext conversion processing module 45 according to the first embodiment described earlier, the ciphertext conversion processing module 45J according to the first modification example implements the ciphertext conversion method defined between the first homomorphic encryption method and the second homomorphic encryption method and, without decrypting the second ciphertexts, converts the second ciphertexts into the third ciphertexts by performing encryption according to the second homomorphic encryption method. Hence, in the secret calculation device 4J and the secret calculation system 100J according to the first modification example, it becomes possible to achieve enhancement in the secret in an identical manner to the first embodiment described earlier.

Moreover, in the secret calculation device 4J and the secret calculation system 100J according to the first modification example, the ciphertexts of the first scalar value "a", the second scalar value n1, and the third scalar value n2_ representing the output data for the first secret calculation operation in the GWAS can be calculated without having to decrypt the ciphertexts. Furthermore, in the secret calculation device 4J and the secret calculation system 100J according to the first modification example, a homomorphic encryption method in which Module-LWE is adapted can be implemented that has a higher level of security as compared to a homomorphic encryption method in which Ring-LWE is adapted.

Second Modification Example of Third Embodiment

In a second modification example, the explanation is given about an example in which the first homomorphic encryption method is a homomorphic encryption method in which Ring-LWE is adapted, and the second homomorphic encryption method is a homomorphic encryption method in which LWE not dependent on the ring dimensionality of Ring-LWE is adapted.

FIG. 9 is a schematic diagram illustrating an example of a secret calculation system 100K according to the second modification example.

The secret calculation system 100K includes a first terminal device 1K, a second terminal device 6K, and a secret calculation device 4K. The first terminal device 1K, the second terminal device 6K, and the secret calculation device 4K are communicably connected to each other via the network 5.

Explanation about Details of Secret Calculation Operations

Firstly, the explanation is given about the details of secret calculation operations including the first secret calculation operation and the second secret calculation operation according to the second modification example.

In the secret calculation device 4K according to the second modification example, in an identical manner to the secret calculation device 4J according to the first modification example, in the first secret calculation operation, the first vector $u=(u_0, u_1, \ldots, u_{l-1})$, which has the length "l" and which represents the SNP data, and the second vector $v=(v_0, v_1, \ldots, v_{l-1})$, which has the length "l" and which represents the trait data indicating the presence or absence or a particular disorder, are treated as the input data; and the first scalar value "a", the second scalar value n1, and the third scalar value n2_ are output. Moreover, in the secret calculation device 4K, in the second secret calculation operation, the first scalar value "a", the second scalar value n1, and the third scalar value n2_ are treated as the input; and the fourth scalar value Xsq1 and the fifth scalar value Xsq2 are output that represent the chi-square statistics indicating the relationship between the SNP data and the trait data. Meanwhile, in the secret calculation device 4K, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4K according to the second modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4K according to the second modification example, the first homomorphic encryption method is a homomorphic encryption method in which Ring-LWE having the ring dimensionality equal to "n" is adapted. Moreover, in the secret calculation device 4K, the second homomorphic encryption method is a homomorphic encryption method in which LWE having the vector dimensionality equal to d' (n) is adapted. Furthermore, in the secret calculation device 4K, a ciphertext conversion method is implemented that is defined between a homomorphic encryption method in which Ring-LWE having the ring dimensionality equal to "n" is adapted and a homomorphic encryption method in which LWE having the vector dimensionality equal to d' is adapted.

Explanation about Secret Calculation Method

In the secret calculation system 100K according to the second modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1K, the secret key $sk_{RLWE}$ and the public key $pK_{RLWE}$ are generated for use in the first homomorphic encryption method. Moreover, in the first terminal device 1K, the secret key $sk_{LWE'}$ and the public key $pk_{LWE'}$ are generated for use in the second homomorphic encryption method. Furthermore, when the secret key to be used in the first homomorphic encryption method is set to $sk_{RLWE}=sk_0+sk_1x+ \ldots +sk_{n-1}x^{n-1}$, the conversion key $ksk_{LWEtoLWE'}$ is treated as the ciphertext $ksk_{LWEtoLWE'}=Enc_{LWE'}(sk_{LWE})$ of the secret key $sk_{LWE}=(sk_0, sk_1, \ldots, sk_{n-1})$ encrypted by the second homomorphic encryption method.

In the first terminal device 1K, the public key $pK_{RLWE}$ to be used in the first homomorphic encryption method is treated as the first encryption key, and the secret key $sk_{LWE'}$ to be used in the second homomorphic encryption method is treated as the first decryption key. Alternatively, the secret key $sk_{RLWE}$ that is to be used in the first homomorphic encryption method can be used as the first encryption key. Moreover, in the first terminal device 1K, the public key $pk_{LWE'}$ to be used in the second homomorphic encryption method is treated as the second encryption key.

In the first terminal device 1K and the second terminal device 6K, the first vector $u=(u_0, u_1, \ldots, u_{l-1})$ and the second vector $v=(v_0, v_1, \ldots, v_{l-1})$, which have the length "l" and which represent the input to the first secret calculation operation, are converted into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1K and the second terminal device 6k, the above-mentioned polynomials are encrypted using the first encryption key $pk_{RLWE}$, and the two first ciphertexts $ct_u$ and $ct_v$ are generated.

In the secret calculation device 4K, the first ciphertexts $ct_u$ and $ct_v$ are subjected to the first secret calculation operation in which the homomorphic multiplication $EvalMult_{RLWE}$ is performed as given in Equation (8), and the following ciphertexts are calculated: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2 as the constant term.

Then, in the secret calculation device 4K, the ciphertext conversion $Extract_{RLWEtoLWE}$ and $Convert_{LWEtoLWE'}$, the conversion key $ksk_{LWEtoLWE'}$, and the second encryption key $pk_{LWE'}$ are used; and, without decrypting the second ciphertexts $ct_{a+}$, $ct_{n1+}$, and $ct_{n2\_+}$, the second ciphertexts $ct_{a+}$, $ct_{n1+}$, and $ct_{n2\_+}$ are converted into the third ciphertext $ct_a$ of the first scalar value "a", the third ciphertext $ct_{n1}$ of the second scalar value n1, and the third ciphertext $ct_{n2\_}$ of the third scalar value n2_, respectively, as given in Equation (9).

In the secret calculation device 4K, the second secret calculation operation is performed with respect to the three third ciphertexts and the scalar value n, which is double the vector length "l", as given in Equation (10) using the homomorphic multiplication $EvalMult_{LWE}$, the homomorphic addition $EvalAdd_{LWE}$, and the homomorphic subtraction $EvalSub_{LWE}$. As a result of performing the second secret calculation operation, in the secret calculation device 4K, the fourth ciphertext $ct_{Xsq1}$ of the fourth scalar value Xsq1 and the fourth ciphertext $ct_{Xsq2}$ of the fifth scalar value Xsq2 are calculated.

In the first terminal device 1K, the fourth scalar value Xsq1 and the fourth ciphertext $ct_{Xsq2}$ of the fifth scalar value Xsq2 are decrypted using the first decryption key $sk_{LWE}$, and the fourth scalar value Xsq1 and the fifth scalar value Xsq2 are calculated.

In the case in which homomorphic division is definable in the second homomorphic encryption method, in the secret calculation device 4K, the fourth ciphertext of the sixth scalar value Xsq=Xsq1/Xsq2 can be output as the output of the second secret calculation operation. Moreover, in the case in which homomorphic comparison is definable in the second homomorphic encryption method, in the secret calculation device 4K, a binary fourth ciphertext that indicates the presence or absence of the relationship between the SNP data and the trait data can be output as the output of the second secret calculation operation.

Explanation about System Configuration/Functions

Given below is the specific explanation about the secret calculation system 100K according to the second modification example.

FIG. 6 is a functional block diagram illustrating an example of the first terminal device 1K according to the second modification example. The first terminal device 1K includes a key generation processing module 11K, a sending module 25K, and a decryption processing module 33K in place of the key generation processing module 11, the sending module 25, and the decryption processing module 33. Moreover, the first terminal device 1K further includes the conversion key storage unit 14. Other than that, the first terminal device 1K is identical to the first terminal device 1I according to the third embodiment described earlier. Moreover, the conversion key storage unit 14 is identical to the conversion key storage unit 14 in the first terminal device 1C according to the second modification example of the first embodiment.

The key generation processing module 11K generates the public key $pk_{RLWE}$ and the secret key $sk_{RLWE}$ to be used in the first homomorphic key encryption key. When $sk_{RLWE}=sk_0+sk_1x+ \ldots +sk_{n-1}x^{n-1}$ represents the secret key to be used in the first homomorphic encryption method, the conversion key $ksk_{LWEtoLWE'}$ is set to the ciphertext $ksk_{LWEtoLWE'}=Enc_{LWE'}(sk_{LWE})$ of the secret key $sk_{LWE}=(sk_0, sk_1, \ldots sk_{n-1})$ encrypted by the second homomorphic encryption method.

The key generation processing module 11K treats the public key $pk_{RLWE}$, which is to be used in the first homomorphic encryption method in the first terminal device 1K, as the first encryption key, and treats the secret key $sk_{LWE'}$, which is to be used in the second homomorphic encryption method, as the first decryption key. Alternatively, the secret key $sk_{RLWE}$ that is to be used in the first homomorphic encryption method can be used as the first encryption key. Moreover, the public key $pk_{LWE'}$ to be used in the second homomorphic encryption method in the secret calculation device 4K is treated as the second encryption key. Then, the key generation processing module 11K stores the first encryption key and the second encryption key in the encryption key storage unit 12; stores the first decryption key in the decryption key storage unit 13; and stores the conversion key in the conversion key storage unit 14.

The sending module 25K sends the second encryption key $pk_{LWE'}$, which is stored in the encryption key storage unit 12, and the conversion key $ksk_{LWEtoLWE'}$, which is stored in the conversion key storage unit 14, to the secret calculation device 4K.

The decryption processing module 33K decrypts the fourth ciphertexts $ct_{Xsq1}$ and $ct_{Xsq2}$, which are stored in the third data storage unit 32, using the first decryption key $sk_{LWE'}$ that is stored in the decryption key storage unit 13, and calculates the fourth scalar value Xsq1 and the fifth scalar value Xsq2. Then, the decryption processing module 33 stores the fourth scalar value and the fifth scalar value in the fourth data storage unit 34.

FIG. 10 is a functional block diagram illustrating an example of the second terminal device 6K according to the second modification example. The second terminal device 6K has an identical functional configuration to the second terminal device 6I according to the third embodiment.

FIG. 7 is a functional block diagram illustrating an example of the secret calculation device 4K according to the second modification example.

The secret calculation device 4K includes a receiving module 41K, a first secret calculation processing module 43K, a ciphertext conversion processing module 45K, a second secret calculation processing module 47K in place of the receiving module 41I, the first secret calculation processing module 43I, the ciphertext conversion processing module 45I, the second secret calculation processing module 47I. Moreover, the secret calculation device 4K further includes the encryption key storage unit 51 and the conversion key storage unit 52. Other than that, the secret calculation device 4K is identical to the secret calculation device 4I according to the third embodiment described earlier. The encryption key storage unit 51 and the conversion key storage unit 52 are identical to the encryption key storage unit 51 and the conversion key storage unit 52 of the secret calculation device 4C according to the second modification example of the first embodiment described earlier.

The receiving module 41K receives the second encryption key $pk_{LWE'}$ and the conversion key $sk_{LWEtoLWE'}$ from the first terminal device 1K; stores the second encryption key in the encryption key storage unit 51; and stores the conversion key in the conversion key storage unit 52.

The ciphertext conversion processing module 45K uses the ciphertext conversion $Extract_{RLWEtoLWE}$ and $Convert_{LWEtoLWE'}$ and, without decrypting the second ciphertexts $ct_{a+}$, $ct_{n1+}$, and $ct_{n2\_+}$, converts the second ciphertexts $ct_{a+}$, $ct_{n1+}$, and $ct_{n2\_+}$ into the third ciphertext $ct_a$ of the first scalar value "a", the third ciphertext $ct_{n1}$ of the second scalar value n1, and the third ciphertext $ct_{n2\_}$ of the third scalar value n2_, respectively. Then, the ciphertext conversion processing module 45K stores the third ciphertexts in the third data storage unit 46.

At the time of performing ciphertext conversion, the ciphertext conversion processing module 45K uses the second encryption key $pk_{LWE'}$, which is stored in the encryption key storage unit 51, and the conversion key $ksk_{LWEtoLWE'}$, Which is stored in the conversion key storage unit 52.

The second secret calculation processing module 47K performs the second secret calculation operation with respect to the third ciphertexts $ct_a$, $ct_{n1}$, and $ct_{n2\_}$ and the scalar value "n", which is double the vector length "l", using homomorphic multiplication $EvalMult_{LWE'}$, homomorphic addition $EvalAdd_{LWE'}$, and homomorphic subtraction $EvalSub_{LWE'}$. The homomorphic subtraction $EvalSub_{LWE'}$ can be defined from the homomorphic addition $EvalAdd_{LWE'}$.

As a result of performing the second secret calculation operation, the second secret calculation processing module 47K calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47K stores the fourth ciphertexts in the fourth data storage unit 48.

Meanwhile, the first terminal device 1K and the second terminal device 6K have an identical hardware configuration to the first terminal device 1 according to the first embodiment described earlier (see FIG. 5), and the secret calculation device 4K has an identical hardware configuration to the secret calculation device 4 according to the first embodiment described earlier (see FIG. 5).

Explanation about Flow

Given below is the explanation of an exemplary flow of information processing performed in the first terminal device 1K, the second terminal device 6K, and the secret calculation device 4K according to the second modification example.

Figure 12:
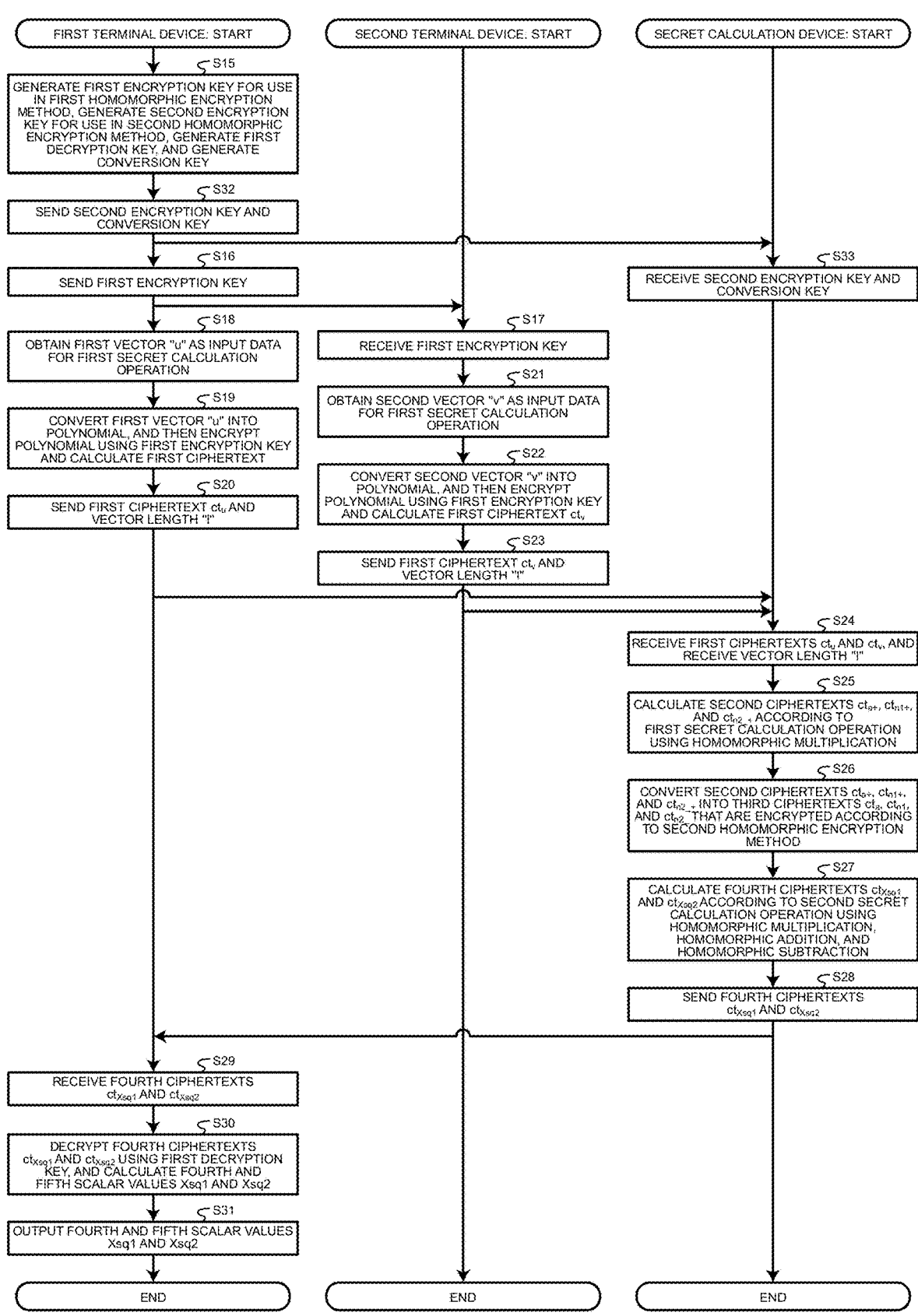
FIG. 12 is a flowchart illustrating an exemplary flow of information processing performed in the first terminal device, the second terminal device, and the secret calculation device.

FIG. 12 is a flowchart illustrating an exemplary flow of information processing performed in the first terminal device 1K, the second terminal device 6k, and the secret calculation device 4K according to the second modification example. In the second modification example, the operations from Step S15 to Step S31 are performed in an identical manner to the operations performed in the first terminal device 1I, the second terminal device 6I, and the secret calculation device 4I according to the third embodiment described earlier. Moreover, in the second modification example, Steps S32 and S33 are added in between Step S15 and Step S16.

In the second modification example, at Step S15, the key generation processing module 11K of the first terminal device 1K generates the public key $pk_{RLWE}$ and the secret key $sk_{RLWE}$ to be used in the first homomorphic encryption method. Moreover, the key generation processing module 11K generates the public key $pk_{LWE'}$ and the secret key $sk_{LWE'}$ to be used in the second homomorphic encryption method. When $sk_{RLWE}=sk_0+sk_1x+\ldots+sk_{n-1}x^{n-1}$ represents the secret key to be used in the first homomorphic encryption method, the conversion key $ksk_{LWEtoLWE'}$ is set to the ciphertext $ksk_{LWEtoLWE'}=Enc_{LWE'}(sk_{LWE})$ of the secret key $sk_{LWE}$ encrypted by the second homomorphic encryption method.

The key generation processing module 11K treats the public key $pk_{RLWE}$, which is to be used in the first homomorphic encryption method in the first terminal device 1K, as the first encryption key, and treats the secret key $sk_{LWE'}$, which is to be used in the second homomorphic encryption method, as the first decryption key. Alternatively, the secret key $sk_{RLWE}$ that is to be used in the first homomorphic encryption method can be used as the first encryption key. Moreover, the public key $pk_{LWE'}$ to be used in the second homomorphic encryption method in the secret calculation device 4K is treated as the second encryption key. Then, the key generation processing module 11K stores the first encryption key and the second encryption key in the encryption key storage unit 12; stores the first decryption key in the decryption key storage unit 13; and stores the conversion key in the conversion key storage unit 14.

At Step S32, the sending module 25K of the first terminal device 1K sends the second encryption key $pk_{LWE'}$, which is stored in the encryption key storage unit 12, and the conversion key $ksk_{LWEtoLWE'}$, which is stored in the conversion key storage unit 14, to the secret calculation device 4K.

At Step S33, the receiving module 41K of the secret calculation device 4K receives the second encryption key $pk_{LWE'}$ and the conversion key $sk_{LWEtoLWE'}$ from the first terminal device 1K. Then, the receiving module 41K stores the second encryption key in the encryption key storage unit 51; and stores the conversion key in the conversion key storage unit 52.

At Step S26, the ciphertext conversion processing module 45K of the secret calculation device 4K uses the ciphertext conversion $\text{Extract}_{RLWEtoLWE}$ and $\text{Convert}_{LWEtoLWE'}$ and, without decrypting the second ciphertexts $ct_{a+}$, $ct_{n1+}$, and $ct_{n2\_+}$, converts the second ciphertexts $ct_{a+}$, $ct_{n1+}$, and $ct_{n2\_+}$ into the third ciphertext $ct_a$ of the first scalar value "a", the third ciphertext $ct_{n1}$ of the second scalar value n1, and the third ciphertext $ct_{n2\_}$ of the third scalar value n2_, respectively. Then, the ciphertext conversion processing module 45K stores the third ciphertexts in the third data storage unit 46. At the time of performing ciphertext conversion, the ciphertext conversion processing module 45K uses the second encryption key $pk_{LWE'}$, which is stored in the encryption key storage unit 51, and the conversion key $ksk_{LWEtoLWE'}$, Which is stored in the conversion key storage unit 52.

At Step S27, the second secret calculation processing module 47K of the secret calculation device 4K performs the second secret calculation operation with respect to the third ciphertexts $ct_a$, $ct_{n1}$, and $ct_{n2\_}$ using the homomorphic multiplication $\text{EvalMult}_{LWE'}$, the homomorphic addition $\text{EvalAdd}_{LWE'}$, and the homomorphic subtraction $\text{EvalSub}_{LWE'}$. As a result of performing the second secret calculation operation, the second secret calculation processing module 47K calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47K stores the fourth ciphertexts in the fourth data storage unit 48.

At Step S30, the decryption processing module 33K of the first terminal device 1K decrypts the fourth ciphertexts $ct_{Xsq1}$ and $ct_{Xsq2}$ using the first decryption key $sk_{LWE'}$ that is stored in the decryption key storage unit 13, and calculates the fourth scalar values Xsq1 and the fifth scalar values Xsq2. Then, the decryption processing module 33K stores the fourth scalar value and the fifth scalar value in the fourth data storage unit 34.

As explained above, in an identical manner to the ciphertext conversion processing module 45 according to the first embodiment described earlier, the ciphertext conversion processing module 45K of the secret calculation device 4K according to the second modification example of the third embodiment implements the ciphertext conversion method that is defined between the first homomorphic encryption method and the second homomorphic encryption method; and, without decrypting the second ciphertexts, converts the second ciphertexts into third ciphertexts that are obtained as a result of performing encryption according to the second homomorphic encryption method. Thus, in the secret calculation device 4K and the secret calculation system 100K according to the second modification example, it becomes possible to achieve enhancement in the secret in an identical manner to the first embodiment described earlier.

Moreover, in the secret calculation device 4K and the secret calculation system 100K according to the second modification example, the ciphertexts of the first scalar value "a", the second scalar value n1, and the third scalar value n2_ representing the output data for the first secret calculation operation in the GWAS can be calculated without having to decrypt the ciphertexts. A cross-tabulation table such as an allele frequency table can be directly calculated from at least one of the first scalar value "a", the second scalar value n1, and the third scalar value n2_. Since those scalar values are kept confidential, it is believed that a contribution can be made toward keeping the cross-tabulation table confidential.

Meanwhile, in the secret calculation device 4K and the secret calculation system 100K according to the second modification example, it is possible to implement a homomorphic encryption method in which Ring-LWE is adapted, and it is possible to implement a homomorphic encryption method in which LWE not dependent on the ring dimensionality is adapted.

Third Modification Example of Third Embodiment

In a third modification example of the third embodiment, the explanation is given about an example in which the first homomorphic encryption method is a homomorphic encryption method in which Module-LWE is adapted, and the second homomorphic encryption method is a homomorphic encryption method in which LWE not dependent on the ring dimensionality of Module-LWE is adapted.

FIG. 9 is a schematic diagram illustrating an example of a secret calculation system 100L according to the third modification example.

The secret calculation system 100L includes a first terminal device 1L, a second terminal device 6L, and a secret calculation device 4L. The first terminal device 1L, the second terminal device 6L, and the secret calculation device 4L are communicably connected to each other via the network 5.

Explanation about Details of Secret Calculation Operations

Firstly, the explanation is given about the details of secret calculation operations including the first secret calculation operation and the second secret calculation operation according to the first modification example.

In the secret calculation system 100L according to the third modification example, in an identical manner to the third embodiment, the first vector $u=(u_0, u_1, \ldots, u_{l-1})$, which has the length "l" and which represents the SNP data, and the second vector $v=(v_0, v_1, \ldots, v_{l-1})$, which has the length "l" and which represents the trait data indicating the presence or absence or a particular disorder, are treated as the input data. Then, in the secret calculation device 4L, in an identical manner to the secret calculation device 4I according to the third embodiment, in the first secret calculation operation, the first scalar value "a", the second scalar value n1, and the third scalar value n2_ are output from the input data. Moreover, in the secret calculation device 4L, in the second secret calculation operation, the first scalar value "a", the second scalar value n1, and the third scalar value n2_ are treated as the input; and the fourth scalar value Xsq1 and the fifth scalar value Xsq2 are output that represent the chi-square statistics indicating the relationship between the SNP data and the trait data. Meanwhile, in the secret calculation device 4L according to the third modification example, the data to be input to the first secret calculation operation and the second secret calculation operation is calculated in the confidential state, that is, in the form of ciphertexts.

In the third modification example, although the fourth scalar value Xsq1 and the fifth scalar value Xsq2 are calculated, it is alternatively possible to calculate the scalar value Xsq=Xsq1/Xsq2. Moreover, in the third modification example, as a result of performing calculation such as a comparison operation in which the fourth scalar value Xsq1 and the fifth scalar value Xsq2 are treated as the input, a binary value can be output that indicates the presence or absence of the relationship between the SNP data and the trait data. Furthermore, in the third modification example, although the scalar value "n" that is double the vector length "l" is calculated in a disclosed manner, it can alternatively be calculated in a confidential manner. Meanwhile, in the third modification example, chi-square testing is performed as an example. However, as other types of evaluation, for example, the Fisher's exact test can also be performed.

Explanation about Homomorphic Encryption Method and Ciphertext Conversion Method In the secret calculation device 4L according to the third modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4L according to the third modification example, the first homomorphic encryption method is a homomorphic encryption method in which Module-LWE having the ring dimensionality equal to "n" ($\neq 1$) and having the vector dimensionality equal to "k" is adapted. Moreover, in the secret calculation device 4L according to the third modification example, the second homomorphic encryption method is a homomorphic encryption method in which LWE having the vector dimensionality equal to d' is adapted. Furthermore, in the secret calculation device 4L, a ciphertext conversion method is implemented that is defined between a homomorphic encryption method in which Module-LWE having the ring dimensionality equal to "n" is adapted and a homomorphic encryption method in which LWE having the vector dimensionality equal to d' is adapted.

Explanation about Secret Calculation Method

In the secret calculation system 100L according to the third modification example, using the first ciphertext encryption method, the second ciphertext encryption method, and ciphertext conversion; secret calculation is performed in the first secret calculation operation and the second secret calculation operation according to the following sequence.

In the first terminal device 1L, the secret key $sk_{MLWE}$ and the public key $pk_{MLWE}$ are generated for use in the first homomorphic encryption method. The secret key to be used in the first homomorphic encryption method is set to $sk_{MLWE}=(sk_0, sk_1, \ldots, sk_{k-1})$. When $sk_i=sk_{i,0}+sk_{i,1}x+\ldots+sk_{i,n-1}x^{n-1}$ holds true, the conversion key $ksk_{LWEtoLWE'}$ becomes equal to the ciphertext $ksk_{LWEtoLWE'}=Enc_{LWE'}(sk_{LWE})$ of the secret key $sk_{LWE}=(sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$ encrypted by the second homomorphic encryption method.

In the first terminal device 1L, the public key $pk_{MLWE}$ to be used in the first homomorphic encryption method is treated as the first encryption key, and the secret key $sk_{LWE'}$ to be used in the second homomorphic encryption method is treated as the first decryption key. Alternatively, the secret key $sk_{MLWE}$ that is to be used in the first homomorphic encryption method can be used as the first encryption key. Moreover, in the first terminal device 1L, the public key $pk_{LWE'}$ to be used in the second homomorphic encryption method is treated as the second encryption key.

In the first terminal device 1L and the second terminal device 6L, using the first homomorphic encryption method, the first vector $u=(u_0, u_1, \ldots, u_{l-1})$ and the second vector $v=(v_0, v_1, \ldots, v_{l-1})$, which have the length "l", are converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1L and the second terminal device 6L, the abovementioned polynomials are encrypted using the first encryption key $pk_{MLWE}$, and the two first ciphertexts $ct_u$ and $ct_v$ are calculated.

In the secret calculation device 4L, the first ciphertexts $ct_u$ and $ct_v$ are subjected to the first secret calculation operation in which the homomorphic multiplication $EvalMult_{MLWE}$ is performed as given in Equation (8), and the following ciphertexts are calculated: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term.

In the secret calculation device 4J, the ciphertext conversion $Extract_{MLWEtoLWE}$ and $Convert_{LWEtoLWE'}$, the conversion key $ksk_{LWEtoLWE'}$, and the second encryption key $pk_{LWE'}$ are used; and, without decrypting the second ciphertexts $ct_{a+}$, $ct_{n1+}$, and $ct_{n2\_+}$, the second ciphertexts $ct_{a+}$, $ct_{n1+}$, and $ct_{n2\_+}$ are converted into the third ciphertext $ct_a$ of the first scalar value "a", the third ciphertext $ct_{n1}$ of the second scalar value n1, and the third ciphertext $ct_{n2\_}$ of the third scalar value n2_, respectively, as given in Equation (9).

In the secret calculation device 4L, the three third ciphertexts and the scalar value "n", which is double the vector length "l", are subjected to the second secret calculation operation using the homomorphic multiplication $EvalMult_{LWE'}$, the homomorphic addition $EvalAdd_{LWE'}$, and the homomorphic subtraction $EvalSub_{LWE'}$ as given in Equation (10). As a result of performing the second secret calculation operation, in the secret calculation device 4L, the fourth ciphertext $ct_{Xsq1}$ of the fourth scalar value Xsq1 and the fourth ciphertext $ct_{Xsq2}$ of the fifth scalar value Xsq2 are calculated.

In the first terminal device 1L, the fourth ciphertext $ct_{Xsq1}$ of the fourth scalar value Xsq1 and the fourth ciphertext $ct_{Xsq2}$ of the fifth scalar value Xsq2 are decrypted using the first decryption key $sk_{LWE'}$, and the fourth scalar value Xsq1 and the fifth scalar value Xsq2 are calculated.

In the case in which homomorphic division is definable in the second homomorphic encryption method, in the secret calculation device 4L, the fourth ciphertext of the sixth scalar value Xsq=Xsq1/Xsq2 can be output as the output of the second secret calculation operation. Moreover, in the case in which homomorphic comparison is definable in the second homomorphic encryption method, in the secret calculation device 4L, a binary fourth ciphertext that indicates the presence or absence of the relationship between the SNP data and the trait data can be output as the output of the second secret calculation operation.

Explanation about System Configuration/Functions

Given below is the specific explanation about the secret calculation system 100L according to the second modification example.

FIG. 6 is a functional block diagram illustrating an example of the first terminal device 1L according to the third modification example. The first terminal device 1L includes a key generation processing module 11L, a sending module 25L, and a decryption processing module 33L in place of the key generation processing module 11, the sending module 25, and the decryption processing module 33. Moreover, the first terminal device 1L further includes the conversion key storage unit 14. Other than that, the first terminal device 1L is identical to the first terminal device 1I according to the third embodiment described earlier. Moreover, the conversion key storage unit 14 is identical to the conversion key storage unit 14 in the first terminal device 1C according to the second modification example of the first embodiment.

The key generation processing module 11L generates the public key $pk_{MLWE}$ and the secret key $sk_{MLWE}$ to be used in the first homomorphic key encryption key. Moreover, the key generation processing module 11L generates the public key $pk_{LWE'}$ and the secret key $sk_{LWE'}$ to be used in the second homomorphic key encryption key. The secret key to be used in the first homomorphic encryption method is set to $sk_{MLWE}=(sk_0, sk_1, \ldots, sk_{k-1})$. When $sk_i=sk_{i, 0}+sk_{i, 1}x+ \ldots +sk_{i, n-1}x^{n-1}$ holds true, the conversion key $ksk_{LWEtoLWE'}$ becomes equal to the ciphertext $ksk_{LWEtoLWE'}=Enc_{LWE'}$ $(sk_{LWE})$ of the secret key $sk_{LWE}=(sk_{0, 0}, sk_{0, 1}, \ldots, sk_{0, n-1}, sk_{1, 0}, sk_{1, 1}, \ldots, sk_{1, n-1}, \ldots, sk_{k-1, 0}, sk_{k-1, 1}, \ldots, sk_{k-1, n-1})$ encrypted by the second homomorphic encryption method.

The key generation processing module 11L treats the public key $pk_{MLWE}$, which is to be used in the first homomorphic encryption method, as the first encryption key and treats the secret key $sk_{LWE'}$, which is to be used in the second homomorphic encryption method, as the first decryption key. Alternatively, the secret key $sk_{MLWE}$ that is to be used in the first homomorphic encryption method can be used as the first encryption key. Moreover, the public key $pk_{LWE'}$, which is to be used in the second homomorphic key encryption key, as the second encryption key for use in the secret calculation device 4L. Then, the key generation processing module 11L stores the first encryption key and the second encryption key in the encryption key storage unit 12; stores the first decryption key in the decryption key storage unit 13; and stores the conversion key in the conversion key storage unit 14.

The sending module 25L sends the second encryption key $pk_{LWE'}$, which is stored in the encryption key storage unit 12, and the conversion key $ksk_{LWEtoLWE'}$, Which is stored in the conversion key storage unit 14, to the secret calculation device 4L.

Moreover, the sending module 25L sends the first encryption key $pk_{MLWE}$, which is stored in the encryption key storage unit 12, to the second terminal device 6L.

The encryption processing module 23L converts the first vector "u" and the second vector "v", which are stored in the first data storage unit 22, into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, according to the first conversion function fw and the second conversion function bw, respectively. Then, the encryption processing module 23L encrypts the abovementioned polynomials using the first encryption key $pk_{MLWE}$ stored in the encryption key storage unit 12, and calculates the two first ciphertexts $ct_u$ and $ct_v$ obtained as a result of performing encryption according to the first homomorphic encryption method. Subsequently, the encryption processing module 23L stores the first ciphertexts in the second data storage unit 24.

The decryption processing module 33L decrypts the fourth ciphertexts $ct_{Xsq1}$ and $ct_{Xsq2}$, which are stored in the third data storage unit 32, using the first decryption key $sk_{LWE'}$ that is stored in the decryption key storage unit 13, and calculates the fourth scalar value Xsq1 and the fifth scalar value Xsq2. Then, the decryption processing module 33L stores the fourth scalar value and the fifth scalar value in the fourth data storage unit 34.

Meanwhile, the input module 21 can obtain the polynomial fw(u) from the computer connected to the first terminal device 1L, and store the polynomial fw(u) in the first data storage unit 22. The encryption key processing unit 23L can encrypt the polynomial fw(u), which is stored in the first data storage unit 22, using the first encryption key $pk_{MLWE}$ stored in the encryption key storage unit 12. Then, the encryption processing module 23L calculates the first ciphertext $ct_u$ by performing encryption, and stores first ciphertext $ct_u$ in the second data storage unit 24.

FIG. 10 is a functional block diagram illustrating an example of the second terminal device 6L according to the third modification example. The second terminal device 6L includes a receiving module 31L and an encryption processing module 23L in place of the receiving module 31I and the encryption processing module 23I. Other than that, the second terminal device 6L is identical to the second terminal device 6I according to the third embodiment described earlier.

The receiving module 31L receives the first encryption key $pk_{MLWE}$ from the first terminal device 1L and stores it in the encryption key storage unit 12.

The encryption processing module 23L converts the second vector "v", which is stored in the first data storage unit 22, into the polynomial $bw(v)=v_0-v_1x^{n-1}-v_2x^{n-2}- \ldots -v_{l-1}x^{n-(l-1)}$ using the second conversion function bw. Then, the encryption processing module 23L encrypts the polynomial bw(v) using the first encryption key $pk_{MLWE}$ that is stored in the encryption key storage unit 12, and calculates the first ciphertext $ct_v$. Then, the encryption key processing unit 23L stores the first ciphertext in the second data storage unit 24.

Meanwhile, the input module 21L can obtain the polynomial bw(v) from the computer connected to the first terminal device 1L, and store the polynomial bw(v) in the first data storage unit 22. Moreover, the encryption processing module 23L can calculate the first ciphertext $ct_v$ by encrypting the polynomial bw(v), which is stored in the first data storage unit 22, using the first encryption key $pk_{MLWE}$ stored in the encryption key storage unit 12; and can store the ciphertext $ct_v$ in the second data storage unit 24.

FIG. 7 is a functional block diagram illustrating an example of the secret calculation device 4L according to the third modification example.

The secret calculation device 4L includes a receiving module 41L, a first secret calculation processing module 43L, a ciphertext conversion processing module 45L, and a second secret calculation processing module 47L in place of the receiving module 41I, the first secret calculation processing module 43I, the ciphertext conversion processing module 45I, and the second secret calculation processing module 47I. Moreover, the secret calculation device 4L further includes the encryption key storage unit 51 and the conversion key storage unit 52. Other than that, the secret calculation device 4L is identical to the secret calculation device 4I according to the third embodiment described earlier. The encryption key storage unit 51 and the conversion key storage unit 52 are identical to the encryption key storage unit 51 and the conversion key storage unit 52 of the secret calculation device 4C according to the second modification example of the first embodiment described earlier.

The receiving module 41L receives the second encryption key $pk_{LWE'}$ and the conversion key $sk_{LWEtoLWE'}$ from the first terminal device 1L. Then, the receiving module 41L stores the second encryption key in the encryption key storage unit 51, and stores the conversion key in the conversion key storage unit 52.

The first secret calculation processing module 43L performs the first secret calculation operation with respect to the first ciphertexts $ct_u$ and $ct_v$ using the homomorphic multiplication $EvalMult_{RLWE}$ according to the first homomorphic encryption method. As a result of performing the first secret calculation operation, the first secret calculation processing module 43L calculates the following ciphertexts: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term. Then, the first secret calculation processing module 43L stores the second ciphertexts in the second data storage unit 44.

The ciphertext conversion processing module 45L uses the ciphertext conversion Extract RLWEtoLWE and Convert$_{LWEtoLWE'}$ and, without decrypting the second ciphertexts ct$_{a+}$, ct$_{n1+}$, and ct$_{n2\_+}$, converts the second ciphertexts ct$_{a+}$, ct$_{n1+}$, and ct$_{n2\_+}$ into the third ciphertext ct$_a$ of the first scalar value "a", the third ciphertext ct$_{n1}$ of the second scalar value n1, and the third ciphertext ct$_{n2\_}$ of the third scalar value n2_, respectively. Then, the ciphertext conversion processing module 45L stores the third ciphertexts in the third data storage unit 46. At the time of performing ciphertext conversion, the ciphertext conversion processing module 45L uses the second encryption key pk$_{LWE'}$, which is stored in the encryption key storage unit 51, and the conversion key ksk$_{LWEtoLWE'}$, which is stored in the conversion key storage unit 52.

The second secret calculation processing module 47L performs the second secret calculation operation with respect to the third ciphertexts ct$_a$, ct$_{n1}$, and ct$_{n2\_}$ and the scalar value "n", which is double the vector length "l", using the homomorphic multiplication EvalMult$_{LWE'}$, the homomorphic addition EvalAdd$_{LWE'}$, and the homomorphic subtraction EvalSub$_{LWE'}$. As a result of performing the second secret calculation operation, the second secret calculation processing module 47L calculates the fourth ciphertext ct$_{Xsq1}$ of the fourth scalar value Xsq1 and the fourth ciphertext ct$_{Xsq2}$ of the fifth scalar value Xsq2. Then, the second secret calculation processing module 47L stores the fourth ciphertexts in the fourth data storage unit 48.

Meanwhile, the first terminal device 1L and the second terminal device 6L have an identical hardware configuration to the first terminal device 1 according to the first embodiment described earlier (see FIG. 5), and the secret calculation device 4L has an identical hardware configuration to the secret calculation device 4 according to the first embodiment described earlier (see FIG. 5).

Explanation about Flow

Given below is the explanation of an exemplary flow of information processing performed in the first terminal device 1L, the second terminal device 6L, and the secret calculation device 4L according to the third modification example.

FIG. 12 is a flowchart illustrating an exemplary flow of information processing performed in the first terminal device 1L, the second terminal device 6L, and the secret calculation device 4L according to the third modification example. In the third modification example, the operations from Step S15 to Step S31 are performed in an identical manner to the operations performed in the first terminal device 1I, the second terminal device 6I, and the secret calculation device 4I according to the third embodiment described earlier. Moreover, in the third modification example, Steps S32 and S33 are added in between Step S15 and Step S16. The operations performed at Steps S32 and S33 are identical to the operations explained in the second modification example of the third embodiment.

In the third modification example, at Step S15, in the first terminal device 1L, the public key pk$_{MLWE}$ and the secret key sk$_{MLWE}$ are generated for use in the first homomorphic encryption method. Moreover, in the first terminal device 1L, the public key pk$_{LWE'}$ and the secret key sk$_{LWE'}$ are generated for use in the second homomorphic encryption method. The secret key sk$_{MLWE}$, which is to be used in the first homomorphic encryption method, is set to sk$_{MLWE}$=(sk$_0$, sk$_1$, . . . , sk$_{k-1}$). When sk$_i$=sk$_{i,\,0}$+sk$_{i,\,1}$x+ . . . +sk$_{i,\,n-1}$x$^{n-1}$ holds true, the conversion key ksk$_{LWEtoLWE'}$ becomes equal to the ciphertext ksk$_{LWEtoLWE'}$=Enc$_{LWE'}$(sk$_{LWE}$) of the secret key sk$_{LWE}$=(sk$_{0,\,0}$, sk$_{0,\,1}$, . . . , sk$_{0,\,n-1}$, sk$_{1,\,0}$, sk$_{1,\,1}$, . . . , sk$_{1,\,n-1}$, . . . , sk$_{k-1,\,0}$, sk$_{k-1,\,1}$, . . . , sk$_{k-1,\,n-1}$) encrypted by the second homomorphic encryption method.

The key generation processing module 11L of the first terminal device 1L treats the public key pk$_{MLWE}$, which is to be used in the first homomorphic encryption method, as the first encryption key and treats the secret key sk$_{LWE'}$, which to be used in the second homomorphic encryption method, as the first decryption key. Alternatively, the secret key sk$_{MLWE}$ that is to be used in the first homomorphic encryption method can be used as the first encryption key. Moreover, the key generation processing module 11L treats the public key pk$_{LWE'}$, which is to be used in the second homomorphic encryption method, as the second encryption key for use in the secret calculation device 4L. Then, the key generation processing module 11L stores the first encryption key and the second encryption key in the encryption key storage unit 12; stores the first decryption key in the decryption key storage unit 13; and stores the conversion key in the conversion key storage unit 14.

At Step S32, the sending module 25L of the first terminal device 1L sends the first encryption key pk$_{MLWE}$, which is stored in the encryption key storage unit 12, to the second terminal device 6L.

At Step S33, the receiving module 41L of the secret calculation device 4L receives the second encryption key pk$_{LWE'}$ and the conversion key sk$_{LWEtoLWE'}$ from the first terminal device 1L. Then, the receiving module 41L stores the second encryption key in the encryption key storage unit 51; and stores the conversion key in the conversion key storage unit 52.

At Step S16, the sending module 25L of the first terminal device 1L sends the first encryption key pk$_{MLWE}$, which is stored in the encryption key storage unit 12, to the second terminal device 6L.

At Step S17, the receiving module 31L of the second terminal device 6L receives the first encryption key pk$_{MLWE}$ from the first terminal device 1L, and stores the first encryption key pk$_{MLWE}$ in the encryption key storage unit 12.

At Step S19, the encryption processing module 23L of the first terminal device 1L converts the first vector "u", which is stored in the first data storage unit 22, into the polynomial fw(u)=u$_0$+u$_1$x+ . . . +u$_{l-1}$x$^{l-1}$ according to the first conversion function fw. Then, the encryption processing module 23L encrypts the polynomial fw(u) using the first encryption key pk$_{MLWE}$ and calculates the first ciphertext ct$_u$ encrypted by the first homomorphic encryption method. Subsequently, the encryption processing module 23L stores the first ciphertext in the second data storage unit 24.

At Step S22, the encryption processing module 23L of the second terminal device 6L converts the second vector "v", which is stored in the first data storage unit 22, into the polynomial bw(v)=v$_0$−v$_1$x$^{n-1}$−v$_2$x$^{n-2}$− . . . −v$_{l-1}$x$^{n-(l-1)}$ using the second conversion function bw. Then, the encryption processing module 23L encrypts the polynomial bw(v) using the first encryption key pk$_{MLWE}$ that is stored in the encryption key storage unit 12, and calculates the first ciphertext ct$_v$ encrypted by the first homomorphic encryption method. Subsequently, the encryption processing module 23L stores the first ciphertext in the second data storage unit 24.

At Step S25, the first secret calculation processing module 43L of the secret calculation device 4L performs the first secret calculation operation with respect to the first ciphertexts ct$_u$ and ct$_v$ using the homomorphic multiplication EvalMult$_{MLWE}$ according to the first homomorphic encryption method; and calculates the following ciphertexts: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term. Then, the first secret calculation processing module 43L stores the second ciphertexts in the second data storage unit 44.

At Step S26, the ciphertext conversion processing module 45L of the secret calculation device 4L uses the ciphertext conversion $Extract_{MLWEtoLWE}$ and $Convert_{LWEtoLWE'}$ and, without decrypting the second ciphertexts $ct_{a+}$, $ct_{n1+}$, and $ct_{n2\_+}$, converts the second ciphertexts $ct_{a+}$, $ct_{n1+}$, and $ct_{n2\_+}$ into the third ciphertext $ct_a$ of the first scalar value "a", the third ciphertext $ct_{n1}$ of the second scalar value n1, and the third ciphertext $ct_{n2\_}$ of the third scalar value n2_, respectively. Then, the ciphertext conversion processing module 45L stores the third ciphertexts in the third data storage unit 46. At the time of performing ciphertext conversion, the ciphertext conversion processing module 45L uses the second encryption key $pk_{LWE'}$, which is stored in the encryption key storage unit 51, and the conversion key $ksk_{LWEtoLWE'}$, which is stored in the conversion key storage unit 52.

At Step S27, the second secret calculation processing module 47L of the secret calculation device 4L performs the second secret calculation operation with respect to the third ciphertexts $ct_a$, $ct_{n1}$, and $ct_{n2\_}$, which are stored in the third data storage unit 46, using the homomorphic multiplication $EvalMult_{LWE'}$, the homomorphic addition $EvalAdd_{LWE'}$, and the homomorphic subtraction $EvalSub_{LWE'}$. As a result of performing the second secret calculation operation, the second secret calculation processing module 47L calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47L stores the fourth ciphertexts in the fourth data storage unit 48.

At Step S30, the decryption processing module 33L of the first terminal device 1L decrypts the fourth ciphertexts $ct_{Xsq1}$ and $ct_{Xsq2}$ using the first decryption key $sk_{LWE'}$ that is stored in the decryption key storage unit 13, and obtains the fourth scalar values Xsq1 and the fifth scalar values Xsq2. Then, the decryption processing module 33L stores the fourth scalar value and the fifth scalar value in the fourth data storage unit 48.

As explained above, according to the third embodiment, in an identical manner to the ciphertext conversion processing module 45 according to the first embodiment described earlier, the ciphertext conversion processing module 45L of the secret calculation device 4L according to the third modification example implements the ciphertext conversion method that is defined between the first homomorphic encryption method and the second homomorphic encryption method; and, without decrypting the second ciphertexts, converts the second ciphertexts into third ciphertexts that are obtained as a result of performing encryption according to the second homomorphic encryption method. Thus, in the secret calculation device 4L and the secret calculation system 100L according to the second modification example, it becomes possible to achieve enhancement in the secret in an identical manner to the first embodiment described earlier.

Moreover, in the secret calculation device 4L and the secret calculation system 100L according to the third modification example, the ciphertexts of the first scalar value "a", the second scalar value n1, and the third scalar value n2_ representing the output for the first secret calculation operation in the GWAS can be calculated without having to decrypt the ciphertexts.

Moreover, in the secret calculation device 4L and the secret calculation system 100L according to the third modification example, it is possible to implement a homomorphic encryption method in which Module-LWE having a high level of security is adapted, and it is possible to implement a homomorphic encryption method in which LWE not dependent on the ring dimensionality "n" of Module-LWE is adapted.

Fourth Embodiment

In a fourth embodiment, as a more specific calculation operation, the explanation is given about a secret calculation system in which secret calculation for GWAS is performed in a smaller operation count than the operation count in the secret calculation system 100I according to the third embodiment. The following explanation is given mainly about the differences with the secret calculation system 100I according to the third embodiment.

FIG. 9 is a schematic diagram illustrating an example of a secret calculation system 100M according to the fourth embodiment.

The secret calculation system 100M includes a first terminal device 1M, a second terminal device 6M, and a secret calculation device 4M. The first terminal device 1M, the second terminal device 6M, and the secret calculation device 4M are communicably connected to each other via the network 5. Regarding each device, the detailed explanation is given later.

Explanation about Calculation Details of GWAS

In the GWAS calculated in the secret calculation system 100M according to the third modification example, at the step for evaluating the allele frequency table, chi-square testing is performed using the scalar values "a", "b", "c," "d", n1, n2, n3, n4, and "n", and the scalar value sq representing the statistics is output.

The scalar value Xsq can be calculated as given below in Equation (11).

$$Xsq = (a+b+c+d) \times ((a+b+c+d) \times a - (a+b) \times (a+c))^2 / \tag{11}$$

$$((a+b) \times (a+c) \times (b+d) \times (c+d)) = n \times (n \times a - n1 \times n2)^2 /$$

$$(n1 \times n2 \times n3 \times n4)$$

Equation (11) is equivalent to Equation (B) according to the application concerned.

When Equation (11) is applied, it becomes possible to calculate a scalar value that is identical to the scalar value Xsq calculatable according to Equation (7) applied in the secret calculation system 100I according to the third embodiment.

In comparison with the method implemented in the secret calculation system 100I according to the third embodiment, in the fourth embodiment, the number of times of performing the subtraction operation can be reduced by at least three and the number of times of performing the multiplication operation can be reduced by one. When the scalar value "n", which is double the vector length "l", is disclosed, one more instance of performing the multiplication operation can be substituted with performing constant multiplication. In the following explanation, Xsq1 represents the scalar value indicating the numerator of the scalar value Xsq, and Xsq2 represents the scalar value indicating the denominator of the scalar value Xsq.

In the secret calculation system 100M according to the fourth embodiment, the first vector $u=(u_0, u_1, \ldots, u_{l-1})$ that has the length "l" and that is the SNP data, the second vector $v=(v_0, v_1, \ldots, v_{l-1})$ that has the length "l" and that represents the trait data indicating the presence or absence or a particular disorder, and the scalar value "n" that is double the vector length "l" are treated as the input data. Then, in the secret calculation system 100M, the following scalar values are output in the first secret calculation operation: the scalar value "a", the scalar value n1, and the scalar value n2_ that is half of the scalar value n2. Moreover, in the secret calculation system 100M, in the second secret calculation operation, the scalar values "a", n1, and n2_ are treated as the input, and the scalar values Xsq1 and Xsq2 are output. In the secret calculation system 100M, the data to be input to the first secret calculation operation and the second secret calculation operation is calculated in the confidential state. In the following explanation, the scalar value "a" is referred to as the first scalar value, the scalar value n1 is referred to as the second scalar value, the scalar value n2_ is referred to as the third scalar value, the scalar value Xsq1 is referred to as the fourth scalar value, and the scalar value Xsq2 is referred to as the fifth scalar value.

Explanation about Details of Secret Calculation Operations

In the secret calculation system 100M according to the fourth embodiment, in an identical manner to the secret calculation system 100I according to the third embodiment, in order to calculate the input data of the first secret calculation operation and the second secret calculation operation in the confidential state; the first secret calculation operation, the second secret calculation operation, and the ciphertext conversion defined between the first secret calculation operation and the second secret calculation operation are used. Herein, the first homomorphic encryption method is a homomorphic encryption method in which Ring-LWE is adapted, and the second homomorphic encryption method is a homomorphic encryption method in which LWE is adapted. Moreover, such ciphertext conversion is implemented which is used in the homomorphic encryption method in which Ring-LWE is adapted, and which is used in the homomorphic encryption method in which LWE is adapted.

Explanation about Calculation Details of GWAS

In the GWAS calculated in the secret calculation system 100M according to the fourth embodiment, using the first ciphertext encryption method, the second ciphertext encryption method, and ciphertext conversion; secret calculation is performed in the first secret calculation operation and the second secret calculation operation according to the following sequence.

In the secret calculation system 100M according to the fourth embodiment, as the preparation for homomorphic encryption, in the first terminal device 1M, the secret key $sk_{RLWE}$ and the public key $pK_{RLWE}$ are generated for use in the first homomorphic encryption method. Moreover, in the first terminal device 1M, when the secret key to be used in the first homomorphic encryption method is set to $sk_{RLWE}=sk_0+sk_1x+ \ldots +sk_{n-1}x^{n-1}$, the secret key to be used in the second homomorphic encryption method is set to $sk_{LWE}=(sk_0, sk_1, \ldots, sk_{n-1})$. The public key $pK_{RLWE}$ to be used in the first homomorphic encryption method is treated as the first encryption key, and the secret key $sk_{LWE}$ to be used in the second homomorphic encryption method is treated as the first decryption key.

In the first terminal device 1M and the second terminal device 6M, the first vector $u=(u_0, u_1, \ldots, u_{l-1})$ and the second vector $v=(v_0, v_1, \ldots, v_{l-1})$, which have the length "l", are converted into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively. Alternatively, at the time of conversion, the functions $fw(v)$ and $bw(u)$ can also be used. Then, in the first terminal device 1M and the second terminal device 6M, the abovementioned polynomials are encrypted using the first encryption key $pk_{RLWE}$, and the two first ciphertexts $ct_u$ and $ct_v$ are calculated.

In the secret calculation device 4M, the first ciphertexts $ct_u$ and $ct_v$, which are obtained as a result of performing encryption according to the first homomorphic encryption method, are subjected to the first secret calculation operation in which the homomorphic multiplication $EvalMult_{RLWE}$ is performed as given in Equation (8). As a result of the first secret calculation operation, in the secret calculation device 4M, the following ciphertexts are calculated: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term.

In the secret calculation device 4M, the ciphertext conversion Extract RLWEtoLWE is used and, without decrypting the second ciphertexts $ct_{a+}$, $ct_{n1+}$, and $ct_{n2\_+}$, the second ciphertexts cat, $ct_{n1+}$, and $ct_{n2\_+}$ are converted into the third ciphertext $ct_a$ of the first scalar value "a", the third ciphertext $ct_{n1}$ of the second scalar value n1, and the third ciphertext $ct_{n2\_}$ of the third scalar value n2_, respectively, as given in Equation (9).

In the secret calculation device 4M, the three third ciphertexts and the scalar value "n", which is double the vector length "l", are subjected to the second secret calculation operation using the homomorphic multiplication $EvalMult_{LWE}$, the homomorphic addition $EvalAdd_{LWE}$, and homomorphic subtraction $EvalSub_{LWE}$ as given below in Equation (12). As a result of performing the second secret calculation operation, in the secret calculation device 4J, the fourth ciphertext $ct_{Xsq1}$ of the fourth scalar value Xsq1 and the fourth ciphertext $ct_{Xsq2}$ of the fifth scalar value Xsq2 are calculated.

$$ct_{n2} = EvalAdd_{LWE}(ct_{n2\_}, ct_{n2\_}) \qquad (12)$$
$$ct_{n3} = EvalSub_{LWE}(n, ct_{n2})$$
$$ct_{n4} = EvalSub_{LWE}(n, ct_{n1})$$
$$ct_{tmp1} = EvalMult_{LWE}(ct_{n1}, ct_{n2})$$
$$ct_{tmp2} = EvalMult_{LWE}(n, ct_a)$$
$$ct_{tmp3} = EvalSub_{LWE}(ct_{tmp2}, ct_{tmp1})$$
$$ct_{tmp4} = EvalMult_{LWE}(ct_{tmp3}, ct_{tmp3})$$
$$ct_{Xsq1} = EvalMult_{LWE}(n, ct_{tmp4})$$
$$ct_{tmp5} = EvalMult_{LWE}(ct_{n3}, ct_{n4})$$
$$ct_{Xsq2} = EvalMult_{LWE}(ct_{tmp1}, ct_{tmp5})$$

In the first terminal device 1M, the fourth ciphertext $ct_{Xsq1}$ of the fourth scalar value Xsq1 and the fourth ciphertext $ct_{Xsq2}$ of the fifth scalar value Xsq2 are decrypted using the first decryption key $sk_{LWE}$, and the fourth scalar value Xsq1 and the fifth scalar value Xsq2 are calculated.

In the case in which homomorphic division is definable in the second homomorphic encryption method, in the secret calculation device 4M, the fourth ciphertext of the sixth scalar value Xsq=Xsq1/Xsq2 can be output as the output of the second secret calculation operation. Moreover, in the case in which homomorphic comparison is definable in the second homomorphic encryption method, in the secret calculation device 4M, a binary fourth ciphertext that indicates the presence or absence of the relationship between the SNP data and the trait data can be output as the output of the second secret calculation operation.

In comparison with the method implemented in the secret calculation system 100I according to the third embodiment, in the secret calculation system 100M according to the fourth embodiment, the number of times of performing the homomorphic subtraction $EvalSub_{LWE}$ can be reduced by at least three and the number of times of performing the homomorphic multiplication $EvalMult_{LWE}$ can be reduced by one. Moreover, in the secret calculation system 100M according to the fourth embodiment, when the scalar value "n", which is double the vector length "l", is disclosed; in one more instance of performing the homomorphic multiplication $EvalMult_{LWE}$, one of the sets of input data can be used in the plaintext form instead of the ciphertext form.

Explanation about System Configuration/Functions

Given below is the specific explanation about the secret calculation system 100M according to the fourth embodiment.

FIG. 2 is a functional block diagram illustrating an example of the first terminal device 1M according to the fourth embodiment. The first terminal device 1M has an identical functional configuration to the first terminal device 1I according to the third embodiment.

FIG. 10 is a functional block diagram illustrating an example of the second terminal device 6M according to the fourth embodiment. The second terminal device 6M has an identical functional configuration to the second terminal device 6I according to the third embodiment.

FIG. 3 is a functional block diagram illustrating an example of the secret calculation device 4M according to the fourth embodiment.

The secret calculation device 4M includes a second secret calculation processing module 47M in place of the second secret calculation processing module 47. Other than that, the secret calculation device 4M is identical to the secret calculation device 4I according to the third embodiment described earlier.

The second secret calculation processing module 47M performs the second secret calculation operation with respect to the third ciphertexts $ct_a$, $ct_{n1}$, and $ct_{n2}$, which are stored in the third data storage unit 46, and with respect to the scalar value "n", which is double the vector length "l", using the homomorphic multiplication $EvalMult_{LWE}$, the homomorphic addition $EvalAdd_{LWE}$, and the homomorphic subtraction $EvalSub_{LWE}$. As a result of performing the second secret calculation operation, the second secret calculation processing module 47M obtains the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47M stores the fourth ciphertexts in the fourth data storage unit 48. Herein, the second secret calculation processing module 47M performs the second secret calculation operation using Equation (12) given earlier.

Meanwhile, the first terminal device 1M and the second terminal device 6M have an identical hardware configuration to the first terminal device 1 according to the first embodiment described earlier (see FIG. 5), and the secret calculation device 4M has an identical hardware configuration to the secret calculation device 4 according to the first embodiment described earlier (see FIG. 5).

Explanation about Flow

Given below is the explanation of an exemplary flow of information processing performed in the first terminal device 1M, the second terminal device 6M, and the secret calculation device 4M according to the fourth embodiment.

FIG. 11 is a flowchart illustrating an exemplary flow of information processing performed in the first terminal device 1M, the second terminal device 6M, and the secret calculation device 4M according to the fourth embodiment. In the fourth embodiment, the operations from S15 to Step S31 are performed in an identical manner to the operations performed in the third embodiment.

At Step S27, the second secret calculation processing module 47M of the secret calculation device 4M performs the second secret calculation operation with respect to the third ciphertexts $ct_a$, $ct_{n1}$, and $ct_{n2}$, which are stored in the third data storage unit 46, and with respect to the scalar value "n", which is double the vector length "l", using the homomorphic multiplication $EvalMult_{LWE}$, the homomorphic addition $EvalAdd_{LWE}$, and the homomorphic subtraction $EvalSub_{LWE}$. As a result of performing the second secret calculation operation, the second secret calculation processing module 47M calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47M stores the fourth ciphertexts in the fourth data storage unit 48. Herein, the second secret calculation processing module 47M performs the second secret calculation operation using Equation (12) given earlier.

As explained above, in the secret calculation device 4M according to the fourth embodiment, in an identical manner to the embodiments described earlier, the ciphertext conversion method that is defined between the first homomorphic encryption method and the second homomorphic encryption method is implemented; and, without decrypting the second ciphertexts, the second ciphertexts are converted into third ciphertexts that are obtained as a result of performing encryption according to the second homomorphic encryption method. Thus, in the secret calculation device 4M and the secret calculation system 100M according to the fourth embodiment, it becomes possible to achieve enhancement in the secret in an identical manner to the first embodiment described earlier.

Moreover, in the secret calculation device 4M and the secret calculation system 100M according to the fourth embodiment, as compared to the third embodiment described earlier, it becomes possible to reduce the number of times of performing the homomorphic multiplication required in the second secret calculation operation.

First Modification Example of Fourth Embodiment

In a first modification example of the fourth embodiment, the explanation is given about an example in which the first homomorphic encryption method is a homomorphic encryption method in which Module-LWE is adapted, and the second homomorphic encryption method is a homomorphic encryption method in which LWE is adapted.

FIG. 9 is a schematic diagram illustrating an example of a secret calculation system 100N according to the first modification example.

The secret calculation system 100N includes a first terminal device 1N, a second terminal device 6N, and a secret calculation device 4N. The first terminal device 1N, the second terminal device 6N, and the secret calculation device 4N are communicably connected to each other via the network 5.

Explanation about Details of Secret Calculation Operations

Firstly, the explanation is given about the details of secret calculation operations including the first secret calculation operation and the second secret calculation operation according to the first modification example.

In the secret calculation system 100N according to the first modification example, in an identical manner to the secret calculation system 100M according to fourth embodiment, the first vector $u=(u_0, u_1, \ldots, u_{l-1})$, which has the length "l" and which represents the SNP data; the second vector $v=(v_0, v_1, \ldots, v_{l-1})$, which has the length "l" and which represents the trait data indicating the presence or absence or a particular disorder; and the scalar value "n", which is double the vector length "l", are treated as the input data. Then, in the secret calculation device 4N, the first scalar value "a", the second scalar value n1, and the third scalar value n2_ are output in the first secret calculation operation. Moreover, in the secret calculation device 4N, in the second secret calculation operation, the scalar values "a", n1, n2_, and "n" are treated as the input; and the fourth scalar value Xsq1 and the fifth scalar value Xsq2 are output. Meanwhile, in the secret calculation device 4N, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4N according to the first modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4N according to the first modification example, the first homomorphic encryption method is a homomorphic encryption method in which Module-LWE is adapted. Moreover, in the secret calculation device 4N according to the first modification example, the second homomorphic encryption method is a homomorphic encryption method in which LWE is adapted. Furthermore, in the secret calculation device 4N, such ciphertext conversion is implemented which is used in the homomorphic encryption method in which Module-LWE is adapted, and which is used in the homomorphic encryption method in which LWE is adapted.

Explanation about Secret Calculation Method

In the secret calculation system N according to the first modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1N, the secret key $sk_{MLWE}$ and the public key $pk_{MLWE}$ are generated for use in the first homomorphic encryption method. Moreover, in the first terminal device 1N, the secret key to be used in the first homomorphic encryption method is set to $sk_{MLWE}=(sk_0, sk_1, \ldots, sk_{k-1})$. When $sk_i=sk_{i,0}+sk_{i,1}x+\ldots+sk_{i,n-1}x^{n-1}$ holds true, the secret key to be used in the second homomorphic encryption method becomes equal to $sk_{LWE}=(sk_{0,0}, sk_{0,1}, \ldots, sk_{0,n-1}, sk_{1,0}, sk_{1,1}, \ldots, sk_{1,n-1}, \ldots, sk_{k-1,0}, sk_{k-1,1}, \ldots, sk_{k-1,n-1})$.

In the first terminal device 1N, the public key $pk_{MLWE}$ to be used in the first homomorphic encryption method is treated as the first encryption key, and the secret key $sk_{LWE}$ to be used in the second homomorphic encryption method is treated as the first decryption key. Alternatively, the secret key $sk_{MLWE}$ that is to be used in the first homomorphic encryption method can be used as the first encryption key.

In the first terminal device 1N and the second terminal device 6N, the input data containing the first vector $u=(u_0, u_1, \ldots, u_{l-1})$ and the second vector $v=(v_0, v_1, \ldots, v_{l-1})$, which have the length "l", is converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1N and the second terminal device 6N, the abovementioned polynomials are encrypted using the first encryption key $pk_{MLWE}$, and the two first ciphertexts $ct_u$ and $ct_v$ are generated.

In the secret calculation device 4N, the first ciphertexts $ct_u$ and $ct_v$ are subjected to the first secret calculation operation in which the homomorphic multiplication $EvalMult_{MLWE}$ is performed as given in Equation (8). Then, in the secret calculation device 4N, as a result of performing the calculation operations, the following ciphertexts are calculated: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term.

In the secret calculation device 4N, the ciphertext conversion $Extract_{MLWEtoLWE}$ is used and, without decrypting the second ciphertexts $ct_{a+}$, $ct_{n1+}$, and $ct_{n2\_+}$, the second ciphertexts $ct_{a+}$, $ct_{n1+}$, and $ct_{n2\_+}$ are converted into the third ciphertext $ct_a$ of the first scalar value "a", the third ciphertext $ct_{n1}$ of the second scalar value n1, and the third ciphertext $ct_{n2\_}$ of the third scalar value n2_, respectively, as given in Equation (9).

Subsequently, in the secret calculation device 4I, the three third ciphertexts and the scalar value "n", which is double the vector length "l", are subjected to the second secret calculation operation using the homomorphic multiplication $EvalMult_{LWE}$, the homomorphic addition $EvalAdd_{LWE}$, and homomorphic subtraction $EvalSub_{LWE}$ as given in Equation (12). As a result of performing the second secret calculation operation, in the secret calculation device 4N, the fourth ciphertext $ct_{Xsq1}$ of the fourth scalar value Xsq1 and the fourth ciphertext $ct_{Xsq2}$ of the fifth scalar value Xsq2 are calculated.

In the first terminal device 1N, the fourth ciphertext $ct_{Xsq1}$ of the fourth scalar value Xsq1 and the fourth ciphertext $ct_{Xsq2}$ of the fifth scalar value Xsq2 are decrypted using the first decryption key $sk_{LWE}$, and the fourth scalar value Xsq1 and the fifth scalar value Xsq2 are calculated.

In the case in which homomorphic division is definable in the second homomorphic encryption method, in the secret calculation device 4N, the fourth ciphertext of the sixth scalar value Xsq=Xsq1/Xsq2 can be output as the output of the second secret calculation operation. Moreover, in the case in which homomorphic comparison is definable in the second homomorphic encryption method, in the secret calculation device 4N, a binary fourth ciphertext that indicates the presence or absence of the relationship between the SNP data and the trait data can be output as the output of the second secret calculation operation.

Explanation about System Configuration/Functions

Given below is the specific explanation about the secret calculation system 100N according to the first modification example.

FIG. 2 is a functional block diagram illustrating an example of the first terminal device 1N according to the first modification example. The first terminal device 1N has an identical functional configuration to the first terminal device 1I according to the third embodiment.

FIG. 10 is a functional block diagram illustrating an example of the second terminal device 6N according to the first modification example. The second terminal device 6N has an identical functional configuration to the second terminal device 6I according to the third embodiment.

FIG. 3 is a functional block diagram illustrating an example of the secret calculation device 4N according to the first modification example.

The secret calculation device 4N includes a second secret calculation processing module 47I in place of the second secret calculation processing module 47. Other than that, the secret calculation device 4N is identical to the secret calculation device 4I according to the third embodiment.

A second secret calculation processing module 47N performs the second secret calculation operation with respect to the third ciphertexts $ct_a$, $ct_{n1}$, and $ct_{n2\_}$, which are stored in the third data storage unit 46, and with respect to the scalar value "n", which is double the vector length "l", using the homomorphic multiplication $EvalMult_{LWE}$, the homomorphic addition $EvalAdd_{LWE}$, and the homomorphic subtraction $EvalSub_{LWE}$. As a result of performing the second secret calculation operation, the second secret calculation processing module 47N obtains the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47N stores the fourth ciphertexts in the fourth data storage unit 48. Herein, the second secret calculation processing module 47N performs the second secret calculation operation using Equation (12).

Meanwhile, the first terminal device 1N and the second terminal device 6N have an identical hardware configuration to the first terminal device 1 according to the first embodiment described earlier (see FIG. 5), and the secret calculation device 4N has an identical hardware configuration to the secret calculation device 4 according to the first embodiment described earlier (see FIG. 5).

Explanation about Flow

Given below is the explanation of an exemplary flow of information processing performed in the first terminal device 1N, the second terminal device 6N, and the secret calculation device 4N according to the first modification example.

FIG. 11 is a flowchart illustrating an exemplary flow of information processing performed in the first terminal device 1N, the second terminal device 6N, and the secret calculation device 4N according to the first modification example. In the first terminal device 1N, the second terminal device 6N, and the secret calculation device 4N according to the first modification example, the operations from S15 to Step S31 are performed in an identical manner to the operations performed in the third embodiment.

At Step S27, the second secret calculation processing module 47N of the secret calculation device 4N performs the second secret calculation operation with respect to the third ciphertexts $ct_a$, $ct_{n1}$, and $ct_{n2\_}$, which are stored in the third data storage unit 46, and with respect to the scalar value "n", which is double the vector length "l", using the homomorphic multiplication $EvalMult_{LWE}$, the homomorphic addition $EvalAdd_{LWE}$, and the homomorphic subtraction $EvalSub_{LWE}$. As a result of performing the second secret calculation operation, the second secret calculation processing module 47N calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47N stores the fourth ciphertexts in the fourth data storage unit 48. Herein, the second secret calculation processing module 47N performs the second secret calculation operation using Equation (12).

As explained above, in an identical manner to the embodiments described earlier, in the secret calculation device 4N according to the first modification example implements the ciphertext conversion method that is defined between the first homomorphic encryption method and the second homomorphic encryption method; and, without decrypting the second ciphertexts, converts the second ciphertexts into third ciphertexts that are obtained as a result of performing encryption according to the second homomorphic encryption method. Hence, in the secret calculation device 4N and the secret calculation system 100N according to the first modification example, it becomes possible to achieve enhancement in the secret in an identical manner to the first embodiment described earlier.

Moreover, in the secret calculation device 4N and the secret calculation system 100N according to the first modification example, as compared to the third embodiment described earlier, it becomes possible to reduce the number of times of performing the homomorphic multiplication required in the second secret calculation operation.

Furthermore, in the secret calculation device 4N and the secret calculation system 100N according to the first modification example, a homomorphic encryption method in which Module-LWE is adapted can be implemented that has a higher level of security as compared to a homomorphic encryption method in which Ring-LWE is adapted.

Second Modification Example of Fourth Embodiment

In a second modification example of the fourth embodiment, the explanation is given about an example in which the first homomorphic encryption method is a homomorphic encryption method in which Ring-LWE is adapted, and the second homomorphic encryption method is a homomorphic encryption method in which LWE not dependent on the ring dimensionality of Ring-LWE is adapted.

FIG. 9 is a schematic diagram illustrating an example of a secret calculation system 100O according to the second modification example.

The secret calculation system 100O includes a first terminal device 1O, a second terminal device 6O, and a secret calculation device 4O. The first terminal device 1O, the second terminal device 6O, and the secret calculation device 4O are communicably connected to each other via the network 5.

Explanation about Details of Secret Calculation Operations

Firstly, the explanation is given about the details of secret calculation operations including the first secret calculation operation and the second secret calculation operation according to the first modification example.

In the secret calculation system 100N according to the first modification example, in an identical manner to the secret calculation system 100M according to fourth embodiment, the first vector $u=(u_0, u_1, \ldots, u_{l-1})$, which has the length "l" and which represents the SNP data; the second vector $v=(v_0, v_1, \ldots, v_{l-1})$, which has the length "l" and which represents the trait data indicating the presence or absence or a particular disorder; and the scalar value "n", which is double the vector length "l", are treated as the input data. Then, in the secret calculation device 4O, the first scalar value "a", the second scalar value n1, and the third scalar value n2_ are output in the first secret calculation operation. Moreover, in the secret calculation device 4O, in the second secret calculation operation, the scalar values "a", n1, n2_, and "n" are treated as the input; and the fourth scalar value Xsq1 and the fifth scalar value Xsq2 are output. Meanwhile, in the secret calculation device 4O, the data to be input to the first secret calculation operation and the second secret calculation operation is calculated in the confidential state, that is, in the form of ciphertexts.

Explanation about Homomorphic Encryption Method and Ciphertext Conversion Method In the secret calculation device 4O according to the second modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4O according to the second modification example, the first homomorphic encryption method is a homomorphic encryption method in which Ring-LWE having the ring dimensionality equal to "n" is adapted. Moreover, in the secret calculation device 4O, the second homomorphic encryption method is a homomorphic encryption method in which LWE having the vector dimensionality equal to d' ($\neq$n) is adapted. Furthermore, in the secret calculation device 4O, a ciphertext conversion method is implemented that is defined between a homomorphic encryption method in which Ring-LWE having the ring dimensionality equal to "n" is adapted and a homomorphic encryption method in which LWE having the vector dimensionality equal to d' is adapted.

Explanation about Secret Calculation Method

In the secret calculation system 100O according to the second modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1O, the secret key $sk_{RLWE}$ and the public key $pK_{RLWE}$ are generated for use in the first homomorphic encryption method. Moreover, in the first terminal device 1O, the secret key $sk_{LWE'}$ and the public key $pk_{LWE'}$ are generated for use in the second homomorphic encryption method. Furthermore, when the secret key to be used in the first homomorphic encryption method is set to $sk_{RLWE}=sk_0+sk_1x+ \ldots +sk_{n-1}x^{n-1}$, the conversion key $ksk_{LWEtoLWE'}$ IS treated as the ciphertext $ksk_{LWEtoLWE'}=Enc_{LWE'} (sk_{LWE})$ of the secret key $sk_{LWE}=(sk_0, sk_1, \ldots, sk_{n-1})$ encrypted by the second homomorphic encryption method.

In the first terminal device 1O, the public key $pK_{RLWE}$ to be used in the first homomorphic encryption method is treated as a first encryption key, and the secret key $sk_{LWE'}$ to be used in the second homomorphic encryption method is treated as a first decryption key.

Alternatively, the secret key $sk_{RLWE}$ that is to be used in the first homomorphic encryption method can be used as the first encryption key. Moreover, the public key $pk_{LWE'}$ to be used in the second homomorphic encryption method is treated as the second encryption key.

In the first terminal device 1O and the second terminal device 6O, the first vector $u=(u_0, u_1, \ldots, u_{l-1})$ and the second vector $v=(v_0, v_1, \ldots, v_{l-1})$, which have the length "l", are converted into the polynomials $fw(u)=u_0+u_1x+ \ldots +u_{l-1}x^{l-1}$ and $bw(v)=v_0-v_1x^{n-1}-v_2x^{n-2}- \ldots -v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1O and the second terminal device 6O, the abovementioned polynomials are encrypted using the first encryption key $pk_{RLWE}$, and the two first ciphertexts $ct_u$ and $ct_v$ are calculated.

In the secret calculation device 4O, the first ciphertexts $ct_u$ and $ct_v$ are subjected to the first secret calculation operation in which the homomorphic multiplication $EvalMult_{RLWE}$ is performed; and the polynomial second ciphertext $ct_{s1+}=EvalMult_{RLWE} (ct_u, ct_v)$ is calculated in which the first scalar value s1=<u, v> represents the constant term.

Subsequently, in the secret calculation device 4O, the ciphertext conversion $Extract_{RLWEtoLWE}$ and $Convert_{LWEtoLWE'}$, the conversion key $ksk_{LWEtoLWE'}$, and the second encryption key $pk_{LWE'}$ are used; and, without decrypting the second ciphertext $ct_{s1+}$, the second ciphertext $ct_{s1+}$ is converted into the third ciphertext $ct_a$ of the first scalar value "a", the third ciphertext $ct_{n1}$ of the second scalar value n1, and the third ciphertext $ct_{n2_{-}}$ of the third scalar value n2_, respectively, as given in Equation (9).

Subsequently, in the secret calculation device 4O, the three third ciphertexts and the scalar value "n", which is double the vector length "l", are subjected to the second secret calculation operation using the homomorphic multiplication $EvalMult_{LWE'}$, the homomorphic addition $EvalAdd_{LWE'}$, and homomorphic subtraction $EvalSub_{LWE'}$, as given in Equation (12). As a result of performing the second secret calculation operation, in the secret calculation device 4O, the fourth ciphertext $ct_{Xsq1}$ of the fourth scalar value Xsq1 and the fourth ciphertext $ct_{Xsq2}$ of the fifth scalar value Xsq2 are calculated.

In the first terminal device 1O, the fourth ciphertext $ct_{Xsq1}$ of the fourth scalar value Xsq1 and the fourth ciphertext $ct_{Xsq2}$ of the fifth scalar value Xsq2 are decrypted using the first decryption key $sk_{LWE'}$, and the fourth scalar value Xsq1 and the fifth scalar value Xsq2 are calculated.

In the case in which homomorphic division is definable in the second homomorphic encryption method, in the secret calculation device 4O, the fourth ciphertext of the sixth scalar value Xsq=Xsq1/Xsq2 can be output as the output of the second secret calculation operation. Moreover, in the case in which homomorphic comparison is definable in the second homomorphic encryption method, in the secret calculation device 4O, a binary fourth ciphertext that indicates the presence or absence of the relationship between the SNP data and the trait data can be output as the output of the second secret calculation operation.

Explanation about System Configuration/Functions

Given below is the specific explanation about the secret calculation system 100O according to the second modification example.

FIG. 6 is a functional block diagram illustrating an example of the first terminal device 1O according to the second modification example. The first terminal device 1O has an identical functional configuration to the first terminal device 1K according to the second modification example of the third embodiment.

FIG. 10 is a functional block diagram illustrating an example of the second terminal device 6O according to the second modification example. The second terminal device 6O has an identical functional configuration to the second terminal device 6K according to the second modification example of the third embodiment.

FIG. 7 is a functional block diagram illustrating an example of the secret calculation device 4O according to the second modification example.

The secret calculation device 4O includes a second secret calculation processing module 47O in place of the second secret calculation processing module 47K. Other than that, the secret calculation device 4O is identical to the secret calculation device 4K according to the second modification example of the third embodiment described earlier.

The second secret calculation processing module 47O performs the second secret calculation operation with respect to the third ciphertexts $ct_a$, $ct_{n1}$, and $ct_{n2\_}$, which are stored in the third data storage unit 46, and with respect to the scalar value "n", which is double the vector length "l", using the homomorphic multiplication $EvalMult_{LWE'}$, the homomorphic addition $EvalAdd_{LWE'}$, and the homomorphic subtraction $EvalSub_{LWE'}$. As a result of performing the second secret calculation operation, the second secret calculation processing module 47O calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47O stores the fourth ciphertexts in the fourth data storage unit 48. Herein, the second secret calculation processing module 47O performs the second secret calculation operation using Equation (12).

Meanwhile, the first terminal device 1O and the second terminal device 6O have an identical hardware configuration to the first terminal device 1 according to the first embodiment described earlier (see FIG. 5), and the secret calculation device 4O has an identical hardware configuration to the secret calculation device 4 according to the first embodiment described earlier (see FIG. 5).

Explanation about Flow

Given below is the explanation of an exemplary flow of information processing performed in the first terminal device 1O, the second terminal device 6O, and the secret calculation device 4O according to the second modification example.

FIG. 12 is a flowchart illustrating an exemplary flow of information processing performed in the first terminal device 1O, the second terminal device 6O, and the secret calculation device 4O according to the second modification example. In the first terminal device 1O, the second terminal device 6O, and the secret calculation device 4O according to the second modification example, the operations from Step S15 to Step S31 are performed in an identical manner to the operations performed in the second modification example of the third embodiment.

At Step S27, the second secret calculation processing module 47O of the secret calculation device 4O performs the second secret calculation operation with respect to the third ciphertexts $ct_a$, $ct_{n1}$, and $ct_{n2\_}$, which are stored in the third data storage unit 46, and with respect to the scalar value "n", which is double the vector length "l", using the homomorphic multiplication $EvalMult_{LWE'}$, the homomorphic addition $EvalAdd_{LWE'}$, and the homomorphic subtraction Eval-$Sub_{LWE'}$. As a result of performing the second secret calculation operation, the second secret calculation processing module 47O calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47O stores the fourth ciphertexts in the fourth data storage unit 48. Herein, the second secret calculation processing module 47O performs the second secret calculation operation using Equation (12).

As explained above, in an identical manner to the ciphertext conversion processing module 45 according to the first embodiment described earlier, the ciphertext conversion processing module 45O of the secret calculation device 4O according to the second modification example implements the ciphertext conversion method that is defined between the first homomorphic encryption method and the second homomorphic encryption method; and, without decrypting the second ciphertexts, converts the second ciphertexts into third ciphertexts that are obtained as a result of performing encryption according to the second homomorphic encryption method. Thus, in the secret calculation device 4O and the secret calculation system 100O according to the second modification example, it becomes possible to achieve enhancement in the secret in an identical manner to the first embodiment described earlier.

Moreover, in the secret calculation device 4O and the secret calculation system 100O according to the second modification example, as compared to the third embodiment described earlier, it becomes possible to reduce the number of times of performing the homomorphic multiplication required in the second secret calculation operation.

Meanwhile, in the secret calculation device 4O and the secret calculation system 100O according to the second modification example, it is possible to implement a homomorphic encryption method in which Ring-LWE is adapted, and it is possible to implement a homomorphic encryption method in which LWE not dependent on the ring dimensionality is adapted.

Third Modification Example of Fourth Embodiment

In a third modification example of the fourth embodiment described earlier, the explanation is given about an example in which the first homomorphic encryption method is a homomorphic encryption method in which Module-LWE is adapted, and the second homomorphic encryption method is a homomorphic encryption method in which LWE not dependent on the ring dimensionality of Module-LWE is adapted.

FIG. 9 is a schematic diagram illustrating an example of a secret calculation system 100P according to the third modification example of the fourth embodiment.

The secret calculation system 100P includes a first terminal device 1P, a second terminal device 6P, and a secret calculation device 4P. The first terminal device 1P, the second terminal device 6P, and the secret calculation device 4P are communicably connected to each other via the network 5.

Explanation about Details of Secret Calculation Operations

Firstly, the explanation is given about the details of secret calculation operations including the first secret calculation operation and the second secret calculation operation according to the third modification example.

In the secret calculation system 100P according to the third modification example, in an identical manner to the fourth embodiment, the first vector $u=(u_0, u_1, \ldots, u_{l-1})$ that has the length "l" and that is the SNP data, the second vector $v=(v_0, v_1, \ldots, v_{l-1})$ that has the length "l" and that represents the trait data indicating the presence or absence or a particular disorder, and the scalar value "n" that is double the vector length "l" are treated as the input data. Then, in the secret calculation system 100P, the following scalar values are output in the first secret calculation operation: the scalar value "a", the scalar value n1, and the scalar value n2_. Moreover, in the secret calculation system 100P, in the second secret calculation operation, the scalar values "a", n1, and n2_ are treated as the input, and the fourth scalar value Xsq1 and the fifth scalar value Xsq2 are output. In the secret calculation device 4P, the data to be input to the first secret calculation operation and the second secret calculation operation is calculated in the confidential state, that is, in the form of ciphertexts.

In the third modification example, although the fourth scalar value Xsq1 and the fifth scalar value Xsq2 are calculated, it is alternatively possible to calculate the scalar value Xsq=Xsq1/Xsq2. Moreover, as a result of performing calculation such as a comparison operation in which the fourth scalar value Xsq1 and the fifth scalar value Xsq2 are treated as the input, a binary value can be output that indicates the presence or absence of the relationship between the SNP data and the trait data. Furthermore, in the third modification example, although the scalar value "n" that is double the vector length "l" is calculated in a disclosed manner, it can alternatively be calculated in a confidential manner.

Explanation about Homomorphic Encryption Method and Ciphertext Conversion Method In the secret calculation device 4P according to the third modification example, in order to enable input and output of confidential data between the first secret calculation operation and the second secret calculation operation, a ciphertext conversion method defined between the first secret calculation operation and the second secret calculation operation is implemented for the purpose of ciphertext conversion.

In the secret calculation device 4P according to the third modification example, the first homomorphic encryption method is a homomorphic encryption method in which Module-LWE having the ring dimensionality equal to "n" ($\ne 1$) and having the vector dimensionality equal to "k" is adapted. Moreover, in the secret calculation device 4P according to the third modification example, the second homomorphic encryption method is a homomorphic encryption method in which LWE having the vector dimensionality equal to d' is adapted. Furthermore, in the secret calculation device 4P, a ciphertext conversion method is implemented that is defined between a homomorphic encryption method in which Module-LWE having the ring dimensionality equal to "n" is adapted and a homomorphic encryption method in which LWE having the vector dimensionality equal to d' is adapted.

Explanation about Secret Calculation Method

In the secret calculation system 100P according to the third modification example, using the first ciphertext encryption method, the second ciphertext encryption method, and ciphertext conversion; secret calculation is performed in the first secret calculation operation and the second secret calculation operation according to the following sequence.

As the preparation for homomorphic encryption, in the first terminal device 1P according to the third modification example, the secret key $sk_{MLWE}$ and the public key $pk_{MLWE}$ are generated for use in the first homomorphic encryption method. Moreover, in the first terminal device 1P, the secret key $sk_{LWE'}$ is generated for use in the second homomorphic encryption method. In the first terminal device 1P, the secret key to be used in the first homomorphic encryption method is set to $sk_{MLWE}=(sk_0, sk_1, \ldots, sk_{k-1})$. When $sk_i=sk_{i,\,0}+sk_{i,\,1}x+\ldots+sk_{i,\,n-1}x^{n-1}$ holds true, the conversion key $ksk_{LWEtoLWE'}$ becomes equal to the ciphertext $ksk_{LWEtoLWE'}=Enc_{LWE'}(sk_{LWE})$ of the secret key $sk_{LWE}=(sk_{0,\,0}, sk_{0,\,1}, \ldots, sk_{0,\,n-1}, sk_{1,\,0}, sk_{1,\,1}, \ldots, sk_{1,\,n-1}, \ldots, sk_{k-1,\,0}, sk_{k-1,\,1}, \ldots, sk_{k-1,\,n-1})$ encrypted by the second homomorphic encryption method.

In the first terminal device 1P, the public key $pk_{MLWE}$ to be used in the first homomorphic encryption method is treated as the first encryption key, and the secret key $sk_{LWE'}$ to be used in the second homomorphic encryption method is treated as the first decryption key. Alternatively, the secret key $sk_{MLWE}$ that is to be used in the first homomorphic encryption method can be used as the first encryption key. Moreover, in the first terminal device 1P, the public key $pk_{LWE'}$ to be used in the second homomorphic encryption method is treated as the second encryption key.

In the first terminal device 1P and the second terminal device 6P, the first vector $u=(u_0, u_1, \ldots, u_{l-1})$ and the second vector $v=(v_0, v_1, \ldots, v_{l-1})$, which have the length "l", are converted into the polynomials $fw(u)=u_0+u_1x+\ldots+u_{l-1}x^{l-1}$ and $bw(v)=v_0-v_1x^{n-1}-v_2x^{n-2}-\ldots-v_{l-1}x^{n-(l-1)}$, respectively, according to the first conversion function fw and the second conversion function bw, respectively. Alternatively, at the time of conversion, the functions fw(v) and bw(u) can also be used. Then, in the first terminal device 1P and the second terminal device 6P, the abovementioned polynomials are encrypted using the first encryption key $pk_{MLWE}$, and the two first ciphertexts $ct_u$ and $ct_v$ are calculated.

In the secret calculation device 4P, the first ciphertexts $ct_u$ and $ct_v$ are subjected to the first secret calculation operation in which the homomorphic multiplication $EvalMult_{MLWE}$ is performed as given in Equation (8). Then, in the secret calculation device 4P, as a result of performing the calculation operations, the following ciphertexts are calculated: the polynomial second ciphertext $ct_{a+}$ having the first scalar value "a" as the constant term, the polynomial second ciphertext $ct_{n1+}$ having the second scalar value n1 as the constant term, and the polynomial second ciphertext $ct_{n2\_+}$ having the third scalar value n2_ as the constant term.

In the secret calculation device 4P, the ciphertext conversion $Extract_{MLWEtoLWE}$ and $Convert_{LWEtoLWE'}$, the conversion key $ksk_{LWEtoLWE'}$, and the second encryption key $pk_{LWE'}$ are used; and, without decrypting the second ciphertexts $ct_{a+}$, $ct_{n1+}$, and $ct_{n2\_+}$, the second ciphertexts $ct_{a+}$, $ct_{n1+}$, and $ct_{n2\_+}$ are converted into the third ciphertext $ct_a$ of the first scalar value "a", the third ciphertext $ct_{n1}$ of the second scalar value n1, and the third ciphertext $ct_{n2\_}$ of the third scalar value n2, respectively, as given in Equation (9).

In the secret calculation device 4P, the three third ciphertexts and the scalar value "n", which is double the vector length "l", are subjected to the second secret calculation operation using the homomorphic multiplication $EvalMult_{LWE'}$, the homomorphic addition $EvalAdd_{LWE'}$, and the homomorphic subtraction $EvalSub_{LWE'}$ as given in Equation (10). As a result of performing the second secret calculation operation, in the secret calculation device 4P, the fourth ciphertext $ct_{Xsq1}$ of the fourth scalar value Xsq1 and the fourth ciphertext $ct_{Xsq2}$ of the fifth scalar value Xsq2 are calculated.

In the first terminal device 1L, the fourth ciphertext $ct_{Xsq1}$ of the fourth scalar value Xsq1 and the fourth ciphertext $ct_{Xsq2}$ of the fifth scalar value Xsq2 are decrypted using the first decryption key $sk_{LWE'}$, and the fourth scalar value Xsq1 and the fifth scalar value Xsq2 are calculated.

In the case in which homomorphic division is definable in the second homomorphic encryption method, in the secret calculation device 4P, the fourth ciphertext of the sixth scalar value Xsq=Xsq1/Xsq2 can be output as the output of the second secret calculation operation. Moreover, in the case in which homomorphic comparison is definable in the second homomorphic encryption method, in the secret calculation device 4P, a binary fourth ciphertext that indicates the presence or absence of the relationship between the SNP data and the trait data can be output as the output data of the second secret calculation operation.

Explanation about System Configuration/Functions

Given below is the specific explanation about the secret calculation system 100P according to the third modification example.

FIG. 6 is a functional block diagram illustrating an example of the first terminal device 1P according to the third modification example. The first terminal device 1P has an identical functional configuration to the first terminal device 1L according to the third modification example of the third embodiment.

FIG. 10 is a functional block diagram illustrating an example of the second terminal device 6P according to the third modification example. The second terminal device 6P has an identical functional configuration to the second terminal device 6L according to the third modification example of the third embodiment.

FIG. 7 is a functional block diagram illustrating an example of the secret calculation device 4P according to the third modification example.

The secret calculation device 4P includes a second secret calculation processing module 47P in place of the second secret calculation processing module 47L. Other than that, the secret calculation device 4P is identical to the secret calculation device 4L according to the third modification example of the third embodiment described earlier.

The second secret calculation processing module 47P performs the second secret calculation operation with respect to the third ciphertexts $ct_a$, $ct_{n1}$, and $ct_{n2\_}$, which are stored in the third data storage unit 46, and with respect to the scalar value "n", which is double the vector length "l", using the homomorphic multiplication $EvalMult_{LWE'}$, the homomorphic addition $EvalAdd_{LWE'}$, and the homomorphic subtraction $EvalSub_{LWE'}$. As a result of performing the second secret calculation operation, in the secret calculation device 4P, the fourth ciphertext $ct_{Xsq1}$ of the fourth scalar value Xsq1 and the fourth ciphertext $ct_{Xsq2}$ of the fifth scalar value Xsq2 are calculated. Then, the second secret calculation processing module 47P stores the fourth ciphertexts in the fourth data storage unit 48. Herein, the second secret calculation processing module 47P performs the second secret calculation operation using Equation (12).

Explanation about Flow

Given below is the explanation of an exemplary flow of information processing performed in the first terminal device 1P, the second terminal device 6P, and the secret calculation device 4P according to the third modification example.

FIG. 12 is a flowchart illustrating an exemplary flow of information processing performed in the first terminal device 1P, the second terminal device 6P, and the secret calculation device 4P according to the third modification example. In the first terminal device 1P, the second terminal device 6P, and the secret calculation device 4P according to the third modification example, the operations from Step S15 to Step S31 are performed in an identical manner to the operations performed in the third modification example of the third embodiment.

At Step S27, the second secret calculation processing module 47P of the secret calculation device 4P performs the second secret calculation operation with respect to the third ciphertexts $ct_a$, $ct_{n1}$, and $ct_{n2\_}$, which are stored in the third data storage unit 46, and with respect to the scalar value "n", which is double the vector length "l", using the homomorphic multiplication $EvalMult_{LWE'}$, the homomorphic addition $EvalAdd_{LWE'}$, and the homomorphic subtraction $EvalSub_{LWE'}$. As a result of performing the second secret calculation operation, the second secret calculation processing module 47P calculates the fourth ciphertext $ct_{Xsq1}$ of the fourth scalar value Xsq1 and the fourth ciphertext $ct_{Xsq2}$ of the fifth scalar value Xsq2. Then, the second secret calculation processing module 47P stores the fourth ciphertexts in the fourth data storage unit 48. Herein, the second secret calculation processing module 47P performs the second secret calculation operation using Equation (12).

As explained above, in an identical manner to the ciphertext conversion processing module 45 according to the first embodiment described earlier, the ciphertext conversion processing module 45P of the secret calculation device 4P according to the third modification example implements the ciphertext conversion method that is defined between the first homomorphic encryption method and the second homomorphic encryption method; and, without decrypting the second ciphertexts, converts the second ciphertexts into third ciphertexts that are obtained as a result of performing encryption according to the second homomorphic encryption method. Thus, in the secret calculation device 4P and the secret calculation system 100P according to the third modification example, it becomes possible to achieve enhancement in the secret in an identical manner to the first embodiment described earlier.

Moreover, in the secret calculation device 4P and the secret calculation system 100P according to the third modification example, as compared to the third embodiment described earlier, it becomes possible to reduce the number of times of performing the homomorphic multiplication required in the second secret calculation operation.

Meanwhile, in the secret calculation device 4P and the secret calculation system 100P according to the third modification example, it is possible to implement a homomorphic encryption method in which Module-LWE having a high level of security is adapted, and it is possible to implement a homomorphic encryption method in which LWE not dependent on the ring dimensionality "n" of Module-LWE is adapted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secret calculation method implemented in a secret calculation device, the method comprising:

performing a first secret calculation operation on a first ciphertext obtained by encrypting input data according to a first homomorphic encryption method by using first homomorphic computation based on a first homomorphic encryption method to calculate a second ciphertext;

converting, by using a ciphertext conversion method defined between the first homomorphic encryption method and a second homomorphic encryption method, the second ciphertext into a third ciphertext encrypted by the second homomorphic encryption method without decrypting the second ciphertext; and performing a second secret calculation operation on the third ciphertext by using second homomorphic computation based on the second homomorphic encryption method to calculate a fourth ciphertext, wherein the input data contains two polynomials in which coefficients represent vector elements, the secret calculation method further comprises:

performing the first secret calculation operation, in which homomorphic inner product computation is used as the first homomorphic computation based on the first homomorphic encryption method, on two first ciphertexts obtained by encrypting the two polynomials included in the input data to calculate the second ciphertext of a polynomial plaintext in which a scalar value of inner product result is stored in a constant term;

converting, without decrypting the second ciphertext, the second ciphertext into the third ciphertext in which a plaintext of a scalar value of a constant term of a polynomial encrypted by the second homomorphic encryption method is encrypted; and performing the second secret calculation operation, in which the second homomorphic computation including at least one homomorphic multiplication and at least one homomorphic addition is performed, on the third ciphertext to calculate the fourth ciphertext, and the first homomorphic encryption method includes a homomorphic encryption method in which Ring-LWE is adapted or a homomorphic encryption method in which Module-LWE is adapted, the second homomorphic encryption method includes a homomorphic encryption method in which either LWE is adapted or LWE not dependent on ring dimensionality of the first homomorphic encryption method is adapted, the ciphertext conversion method includes a ciphertext conversion method defined between: the second ciphertext encrypted by the first homomorphic encryption method in which Ring-LWE or Module-LWE is adapted; and the third ciphertext encrypted by the second homomorphic encryption method in which either LWE is adapted or LWE not dependent on ring dimensionality of the first homomorphic encryption method is adapted, and the secret calculation method further comprises:

performing an extraction operation of extracting some of numerical values constituting the second ciphertext representing a polynomial, or, in addition to performing the extraction operation, performing a calculation operation using an encryption key or a conversion key, and converting, without decrypting the second ciphertext, the second ciphertext into the third ciphertext in which the plaintext of the scalar value of the constant term of the polynomial is encrypted.

2. The secret calculation method according to claim 1, wherein the first homomorphic encryption method includes a homomorphic encryption method in which Ring-LWE is adapted, the second homomorphic encryption method includes a homomorphic encryption method in which LWE is adapted, and the ciphertext conversion method includes a ciphertext conversion method defined between: the second ciphertext encrypted by the first homomorphic encryption method in which Ring-LWE is adapted; and the third ciphertext encrypted by the second homomorphic encryption method in which LWE is adapted.

3. The secret calculation method according to claim 1, wherein the first homomorphic encryption method includes a homomorphic encryption method in which Module-LWE is adapted, the second homomorphic encryption method includes a homomorphic encryption method in which LWE is adapted, and the ciphertext conversion method includes a ciphertext conversion method defined between: the second ciphertext encrypted by the first homomorphic encryption method in which Module-LWE is adapted; and the third ciphertext encrypted by the second homomorphic encryption method in which LWE is adapted.

4. The secret calculation method according to claim 1, wherein the first homomorphic encryption method includes a homomorphic encryption method in which Ring-LWE is adapted, the second homomorphic encryption method includes a homomorphic encryption method in which LWE not dependent on ring dimensionality of the first homomorphic encryption method is adapted, and the ciphertext conversion method includes a ciphertext conversion method defined between: the second ciphertext encrypted by the first homomorphic encryption method in which Ring-LWE is adapted; and the third ciphertext encrypted by the second homomorphic encryption method in which LWE not dependent on ring dimensionality of the first homomorphic encryption method is adapted.

5. The secret calculation method according to claim 1, wherein the first homomorphic encryption method includes a homomorphic encryption method in which Module-LWE is adapted, the second homomorphic encryption method includes a homomorphic encryption method in which LWE not dependent on ring dimensionality of the first homomorphic encryption method is adapted, and the ciphertext conversion method includes a ciphertext conversion method defined between: the second ciphertext encrypted by the first homomorphic encryption method in which Module-LWE is adapted; and the third ciphertext encrypted by the second homomorphic encryption method in which LWE not dependent on ring dimensionality of the first homomorphic encryption method is adapted.

6. The secret calculation method according to claim 1, wherein the ciphertext conversion method includes a ciphertext conversion method defined between: the second ciphertext encrypted by the first homomorphic encryption method in which Ring-LWE or Module-LWE is adapted; and the third ciphertext encrypted by the second homomorphic encryption method in which LWE not dependent on ring dimensionality of the first homomorphic encryption method is adapted, and the one or more processors are configured to convert, without decrypting the second ciphertext, the second ciphertext into the third ciphertext by using an encryption key generated for use in the second homomorphic encryption method and a conversion key generated for use in ciphertext conversion.

7. A computer program product comprising a computer-readable medium including programmed instructions, the instructions causing a computer to execute:

performing a first secret calculation operation on a first ciphertext obtained by encrypting input data according to a first homomorphic encryption method by using first homomorphic computation based on a first homomorphic encryption method to calculate a second ciphertext;

converting, by using a ciphertext conversion method defined between the first homomorphic encryption method and a second homomorphic encryption method, the second ciphertext into a third ciphertext encrypted by the second homomorphic encryption method without decrypting the second ciphertext; and performing a second secret calculation operation on the third ciphertext by using second homomorphic computation based on the second homomorphic encryption method to calculate a fourth ciphertext, wherein the input data contains two polynomials in which coefficients represent vector elements, the instructions causing the computer to further execute:

performing the first secret calculation operation, in which homomorphic inner product computation is used as the first homomorphic computation based on the first homomorphic encryption method, on two first ciphertexts obtained by encrypting the two polynomials included in the input data to calculate the second ciphertext of a polynomial plaintext in which a scalar value of inner product result is stored in a constant term;

converting, without decrypting the second ciphertext, the second ciphertext into the third ciphertext in which a plaintext of a scalar value of a constant term of a polynomial encrypted by the second homomorphic encryption method is encrypted; and performing the second secret calculation operation, in which the second homomorphic computation including at least one homomorphic multiplication and at least one homomorphic addition is performed, on the third ciphertext to calculate the fourth ciphertext, and the first homomorphic encryption method includes a homomorphic encryption method in which Ring-LWE is adapted or a homomorphic encryption method in which Module-LWE is adapted, the second homomorphic encryption method includes a homomorphic encryption method in which either LWE is adapted or LWE not dependent on ring dimensionality of the first homomorphic encryption method is adapted, the ciphertext conversion method includes a ciphertext conversion method defined between: the second ciphertext encrypted by the first homomorphic encryption method in which Ring-LWE or Module-LWE is adapted; and the third ciphertext encrypted by the second homomorphic encryption method in which either LWE is adapted or LWE not dependent on ring dimensionality of the first homomorphic encryption method is adapted, and the instructions causing the computer to further execute:

performing an extraction operation of extracting some of numerical values constituting the second ciphertext representing a polynomial, or, in addition to performing the extraction operation, performing a calculation operation using an encryption key or a conversion key, and converting, without decrypting the second ciphertext, the second ciphertext into the third ciphertext in which the plaintext of the scalar value of the constant term of the polynomial is encrypted.

8. The computer program product according to claim 7, wherein the first homomorphic encryption method includes a homomorphic encryption method in which Ring-LWE is adapted, the second homomorphic encryption method includes a homomorphic encryption method in which LWE is adapted, and the ciphertext conversion method includes a ciphertext conversion method defined between: the second ciphertext encrypted by the first homomorphic encryption method in which Ring-LWE is adapted; and the third ciphertext encrypted by the second homomorphic encryption method in which LWE is adapted.

9. The computer program product according to claim 7, wherein the first homomorphic encryption method includes a homomorphic encryption method in which Module-LWE is adapted, the second homomorphic encryption method includes a homomorphic encryption method in which LWE is adapted, and the ciphertext conversion method includes a ciphertext conversion method defined between: the second ciphertext encrypted by the first homomorphic encryption method in which Module-LWE is adapted; and the third ciphertext encrypted by the second homomorphic encryption method in which LWE is adapted.

10. The computer program product according to claim 7, wherein the first homomorphic encryption method includes a homomorphic encryption method in which Ring-LWE is adapted, the second homomorphic encryption method includes a homomorphic encryption method in which LWE not dependent on ring dimensionality of the first homomorphic encryption method is adapted, and the ciphertext conversion method includes a ciphertext conversion method defined between: the second ciphertext encrypted by the first homomorphic encryption method in which Ring-LWE is adapted; and the third ciphertext encrypted by the second homomorphic encryption method in which LWE not dependent on ring dimensionality of the first homomorphic encryption method is adapted.

11. The computer program product according to claim 7, wherein the first homomorphic encryption method includes a homomorphic encryption method in which Module-LWE is adapted, the second homomorphic encryption method includes a homomorphic encryption method in which LWE not dependent on ring dimensionality of the first homomorphic encryption method is adapted, and the ciphertext conversion method includes a ciphertext conversion method defined between: the second ciphertext encrypted by the first homomorphic encryption method in which Module-LWE is adapted; and the third ciphertext encrypted by the second homomorphic encryption method in which LWE not dependent on ring dimensionality of the first homomorphic encryption method is adapted.

12. The computer program product according to claim 7, wherein the ciphertext conversion method includes a ciphertext conversion method defined between: the second ciphertext encrypted by the first homomorphic encryption method in which Ring-LWE or Module-LWE is adapted; and the third ciphertext encrypted by the second homomorphic encryption method in which LWE not dependent on ring dimensionality of the first homomorphic encryption method is adapted, and the one or more processors are configured to convert, without decrypting the second ciphertext, the second ciphertext into the third ciphertext by using an encryption key generated for use in the second homomorphic encryption method and a conversion key generated for use in ciphertext conversion.

13. A secret calculation system comprising:

the secret calculation device that implements the secret calculation method according to claim 1; and a first terminal device that communicates with the secret calculation device, the first terminal device comprising one or more processors configured to execute at least one of:

key generation processing of generating an encryption key for use in the first homomorphic encryption method and a decryption key for use in the second homomorphic encryption method;

encryption processing of calculating the first ciphertext in which the input data is encrypted using the encryption key; and decryption processing of calculating output data in which the fourth ciphertext received from the secret calculation device is decrypted using the decryption key.

14. The system according to claim 13, wherein the key generation processing includes further generating a conversion key for use in ciphertext conversion.

15. The system according to claim 13, further comprising a second terminal device that communicates with the secret calculation device and the first terminal device, wherein the one or more processors of the first terminal device are configured to:

generate an encryption key for use in the first homomorphic encryption method and a decryption key for use in the second homomorphic encryption method;

obtain input data;

calculate the first ciphertext in which the input data is encrypted using the encryption key;

send the first ciphertext to the secret calculation device;

calculate output data in which the fourth ciphertext received from the secret calculation device is decrypted using the decryption key; and output the output data, and the second terminal device comprising one or more processors configured to send the first ciphertext, in which the input data is encrypted using the encryption key, to the secret calculation device.

\* \* \* \* \*